United States Patent
Kirino et al.

(10) Patent No.: US 10,559,890 B2
(45) Date of Patent: Feb. 11, 2020

(54) WAVEGUIDE DEVICE, AND ANTENNA DEVICE INCLUDING THE WAVEGUIDE DEVICE

(71) Applicants: Nidec Corporation, Minami-ku, Kyoto (JP); WGR Co., Ltd., Shimogyo-ku, Kyoto, Kyoto (JP)

(72) Inventors: Hideki Kirino, Kyoto (JP); Hiroyuki Kamo, Kyoto (JP)

(73) Assignees: NIDEC CORPORATION, Kyoto (JP); WGR CO., LTD., 8E10 ADV. SCI., TECH. & MGMT., Kyoto (JP)

( * ) Notice: Subject to any disclaimer, the term of this patent is extended or adjusted under 35 U.S.C. 154(b) by 0 days.

(21) Appl. No.: 16/047,060

(22) Filed: Jul. 27, 2018

(65) Prior Publication Data

US 2018/0375219 A1      Dec. 27, 2018

Related U.S. Application Data

(63) Continuation of application No. PCT/JP2017/002769, filed on Jan. 26, 2017.

(30) Foreign Application Priority Data

Jan. 29, 2016   (JP) ................................ 2016-015329

(51) Int. Cl.
  *H01Q 21/06*      (2006.01)
  *H01P 3/12*       (2006.01)
  (Continued)

(52) U.S. Cl.
  CPC .......... *H01Q 21/064* (2013.01); *H01P 3/123* (2013.01); *H01Q 13/065* (2013.01)

(58) Field of Classification Search
  CPC . G01S 7/03; H01P 1/182; H01P 3/123; H01P 5/12; H01Q 1/32; H01Q 1/38;
  (Continued)

(56) References Cited

U.S. PATENT DOCUMENTS 4,017,864 A *  4/1977  Proctor ................. H01Q 13/18
                                                    343/767
4,389,650 A *  6/1983  Stern ...................... H01Q 3/443
                                                    343/768
(Continued)

FOREIGN PATENT DOCUMENTS

CN      103187631 A       7/2013
CN      105144481 A      12/2015
(Continued)

OTHER PUBLICATIONS

Kirino et al., "A 76 GHz Multi-Layered Phased Array Antenna Using a Non-Metal Contact Metamaterial Waveguide", IEEE Transactions on Antennas and Propagation, vol. 60, No. 2, Feb. 2012, pp. 840-853.

(Continued)

*Primary Examiner* — Tho G Phan
(74) *Attorney, Agent, or Firm* — Keating & Bennett

(57) ABSTRACT

A waveguide device for use in propagating an electromagnetic wave of a band having a shortest wavelength λm in free space includes: a first electrically conductive member having an electrically conductive surface and a first throughhole; a second electrically conductive member including a plurality of electrically conductive rods each having a leading end opposing the electrically conductive surface, the second electrically conductive member having a second throughhole which overlaps the first throughhole as viewed along an axial direction of the first throughhole; and an electrically-conductive waveguiding wall at least partially surrounding a space between the first throughhole and the second throughhole and being surrounded by the plurality of electrically conductive rods, the waveguiding wall allowing the electromagnetic wave to propagate between the first throughhole and the second throughhole. The height of the waveguiding wall is less than λm/2. The distance between (Continued)

an electrically conductive rod among the plurality of electrically conductive rods that is adjacent to the waveguiding wall and the outer periphery of the waveguiding wall is less than λm/2.

39 Claims, 34 Drawing Sheets

(51) Int. Cl.
*H01P 3/123* (2006.01)
*H01Q 13/06* (2006.01)

(58) Field of Classification Search
CPC ...... H01Q 13/06; H01Q 13/065; H01Q 21/06; H01Q 21/064
See application file for complete search history.

(56) References Cited

U.S. PATENT DOCUMENTS

| | | | | |
|---|---|---|---|---|
| 5,384,557 | A | * | 1/1995 | Yoshida ............ H01P 5/107 |
| | | | | 333/21 A |
| 5,550,553 | A | * | 8/1996 | Yamaki ............ H01Q 13/24 |
| | | | | 333/24.3 |
| 6,191,704 | B1 | | 2/2001 | Takenaga et al. |
| 6,297,715 | B1 | * | 10/2001 | Fiedziuszko ......... H01P 1/2086 |
| | | | | 333/202 |
| 6,339,395 | B1 | | 1/2002 | Hazumi et al. |
| 6,403,942 | B1 | | 6/2002 | Stam |
| 6,611,610 | B1 | | 8/2003 | Stam et al. |
| 6,628,299 | B2 | | 9/2003 | Kitayama |
| 6,661,367 | B2 | | 12/2003 | Sugiyama et al. |
| 6,703,967 | B1 | | 3/2004 | Kuroda et al. |
| 6,903,677 | B2 | | 6/2005 | Takashima et al. |
| 6,943,726 | B2 | | 9/2005 | Schneider |
| 7,161,561 | B2 | | 1/2007 | Kitayama |
| 7,355,524 | B2 | | 4/2008 | Schofield |
| 7,358,889 | B2 | | 4/2008 | Abe et al. |
| 7,417,580 | B2 | | 8/2008 | Abe et al. |
| 7,420,159 | B2 | | 9/2008 | Heslin et al. |
| 7,425,983 | B2 | | 9/2008 | Izumi et al. |
| 7,570,198 | B2 | | 8/2009 | Tokoro |
| 7,978,122 | B2 | | 7/2011 | Schmidlin |
| 8,068,134 | B2 | | 11/2011 | Yoshizawa |
| 8,446,312 | B2 | | 5/2013 | Kanamoto et al. |
| 8,543,277 | B2 | | 9/2013 | Higgins-Luthman |
| 8,593,521 | B2 | | 11/2013 | Schofield et al. |
| 8,604,968 | B2 | | 12/2013 | Alland et al. |
| 8,610,620 | B2 | | 12/2013 | Katoh |
| 8,614,640 | B2 | | 12/2013 | Lynam |
| 8,636,393 | B2 | | 1/2014 | Schofield |
| 8,730,096 | B2 | | 5/2014 | Kanamoto et al. |
| 8,730,099 | B2 | | 5/2014 | Kanamoto et al. |
| 8,803,638 | B2 | | 8/2014 | Kildal |
| 8,861,842 | B2 | | 10/2014 | Jung et al. |
| 9,286,524 | B1 | | 3/2016 | Mei et al. |
| 10,003,117 | B2 | * | 6/2018 | Natsuhara ............ H01P 5/107 |
| 10,103,448 | B1 | * | 10/2018 | Izadian ............ H01Q 13/10 |
| 10,224,617 | B2 | * | 3/2019 | Chen ............ H01Q 1/3233 |
| 2002/0126062 | A1 | | 9/2002 | Matthews |
| 2007/0229388 | A1 | | 10/2007 | Lynch et al. |
| 2011/0187614 | A1 | | 8/2011 | Kirino et al. |
| 2012/0092224 | A1 | | 4/2012 | Sauleau et al. |
| 2013/0033404 | A1 | | 2/2013 | Abe |
| 2013/0082800 | A1 | | 4/2013 | Rofougaran et al. |
| 2013/0194145 | A1 | | 8/2013 | Sano et al. |
| 2014/0097995 | A1 | | 4/2014 | McKinzie, III |
| 2015/0222021 | A1 | | 8/2015 | Stevenson et al. |
| 2015/0264230 | A1 | | 9/2015 | Takeda |
| 2016/0126636 | A1 | | 5/2016 | Uemichi |
| 2016/0126637 | A1 | | 5/2016 | Uemichi |
| 2016/0140424 | A1 | | 5/2016 | Wang et al. |
| 2016/0264065 | A1 | | 9/2016 | Takeda |
| 2018/0375219 | A1 | | 12/2018 | Kirino et al. |

FOREIGN PATENT DOCUMENTS

| | | | |
|---|---|---|---|
| CN | 206602168 | U | 10/2017 |
| EP | 1 331 688 | A1 | 7/2003 |
| JP | 2001-267838 | A | 9/2001 |
| JP | 2004-257848 | A | 9/2004 |
| JP | 2007-259047 | A | 10/2007 |
| JP | 2010-021828 | A | 1/2010 |
| JP | 2012-004700 | A | 1/2012 |
| JP | 2012-523149 | A | 9/2012 |
| JP | 2013-032979 | A | 2/2013 |
| WO | 01/67540 | A1 | 9/2001 |
| WO | 2008/081807 | A1 | 7/2008 |
| WO | 2010/003808 | A2 | 1/2010 |
| WO | 2010/050122 | A1 | 5/2010 |
| WO | 2015/172948 | A2 | 11/2015 |
| WO | 2016/163932 | A1 | 10/2016 |

OTHER PUBLICATIONS

Zaman et al., "Ku Band Linear Slot-Array in Ridge Gapwaveguide Technolgy", 7th European Conference on Antennas and Propagation (EUCAP 2013)—Convened Sessions, 2013, pp. 2968-2971.
Kildal et al., "Local Metamaterial-Based Waveguides in Gaps Between Parallel Metal Plates", IEEE Antennas and Wireless Propagation Letters, vol. 8, 2009, pp. 84-87.
Pucci et al., "Design of a Dual-Mode Horn Element for Microstrip Gap Waveguide Fed Array", 7th European Conference on Antennas and Propagation (EUCAP 2013)—Convened Sessions, 2013, pp. 2976-2979.
Kildal, "Metasurfing Since 1987—A Personal Story Involving Soft and Hard Surfaces, EBG Surfaces, Cloaking, Gap Waveguides and Mass Production", 2014 IEEE Antennas and Propagation Society International Symposium, 2014, pp. 529-530.
Sehm et al., "A High-Gain 58-GHz Box-Horn Array Antenna with Suppressed Grating Lobes", IEEE Transactions on Antennas and Propagation, vol. 47, No. 7, Jul. 1999, pp. 1125-1130.
Official Communication issued in International Patent Application No. PCT/JP2016/083622, dated Dec. 6, 2016.
Ahmadi et al., "Direct Coupled Resonator Filters Realized by Gap Waveguide Technology", IEEE Transactions on Microwave Theory and Techniques, vol. 63, No. 10, Oct. 2015, pp. 3445-3452.
Official Communication issued in International Patent Application No. PCT/JP2017/002769, dated Apr. 18, 2017.

\* cited by examiner

[Fig. 1]
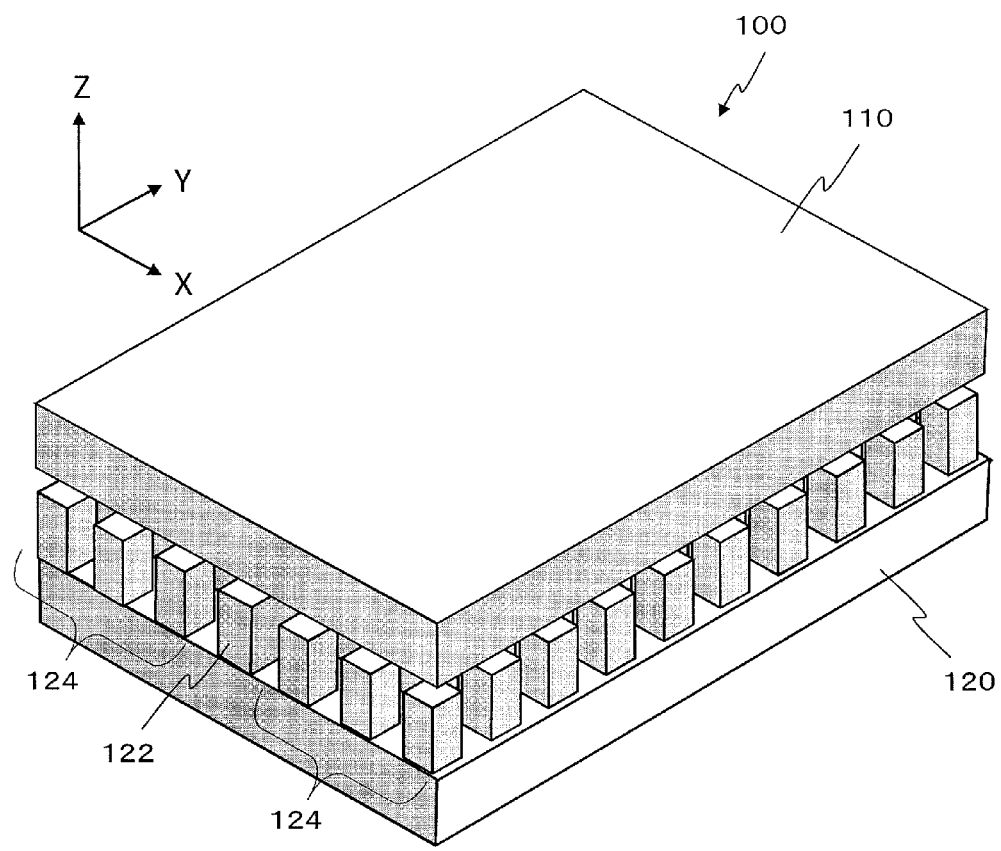
[Fig. 2A]
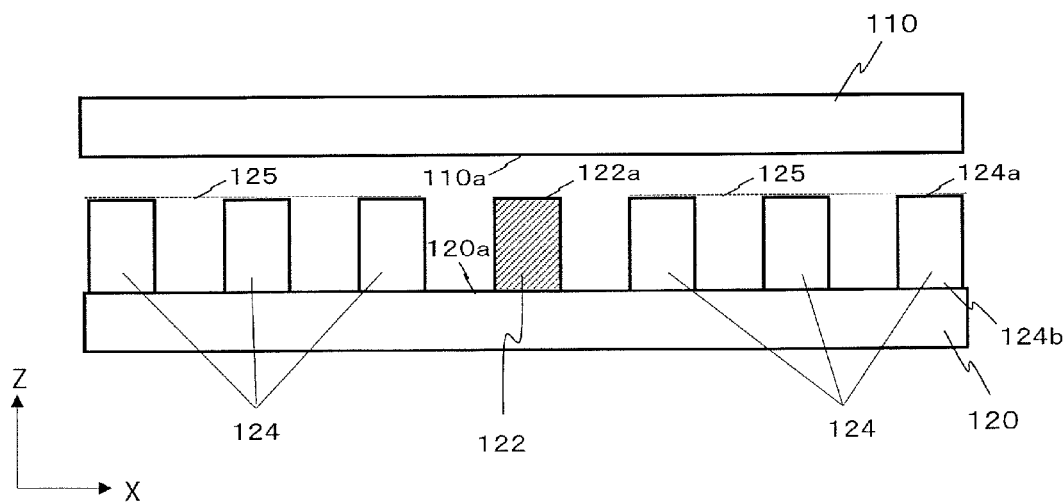

[Fig. 2B]
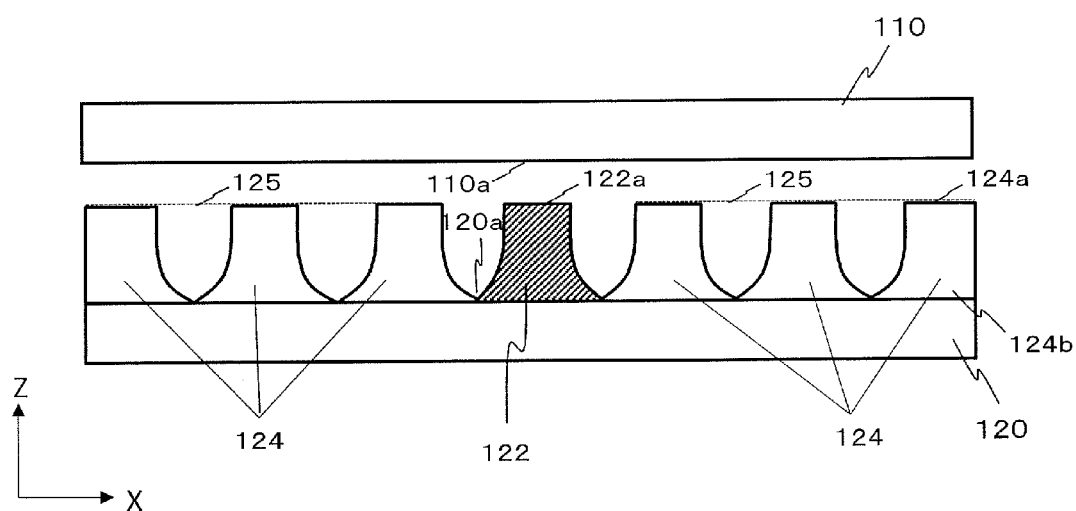

[Fig. 3]
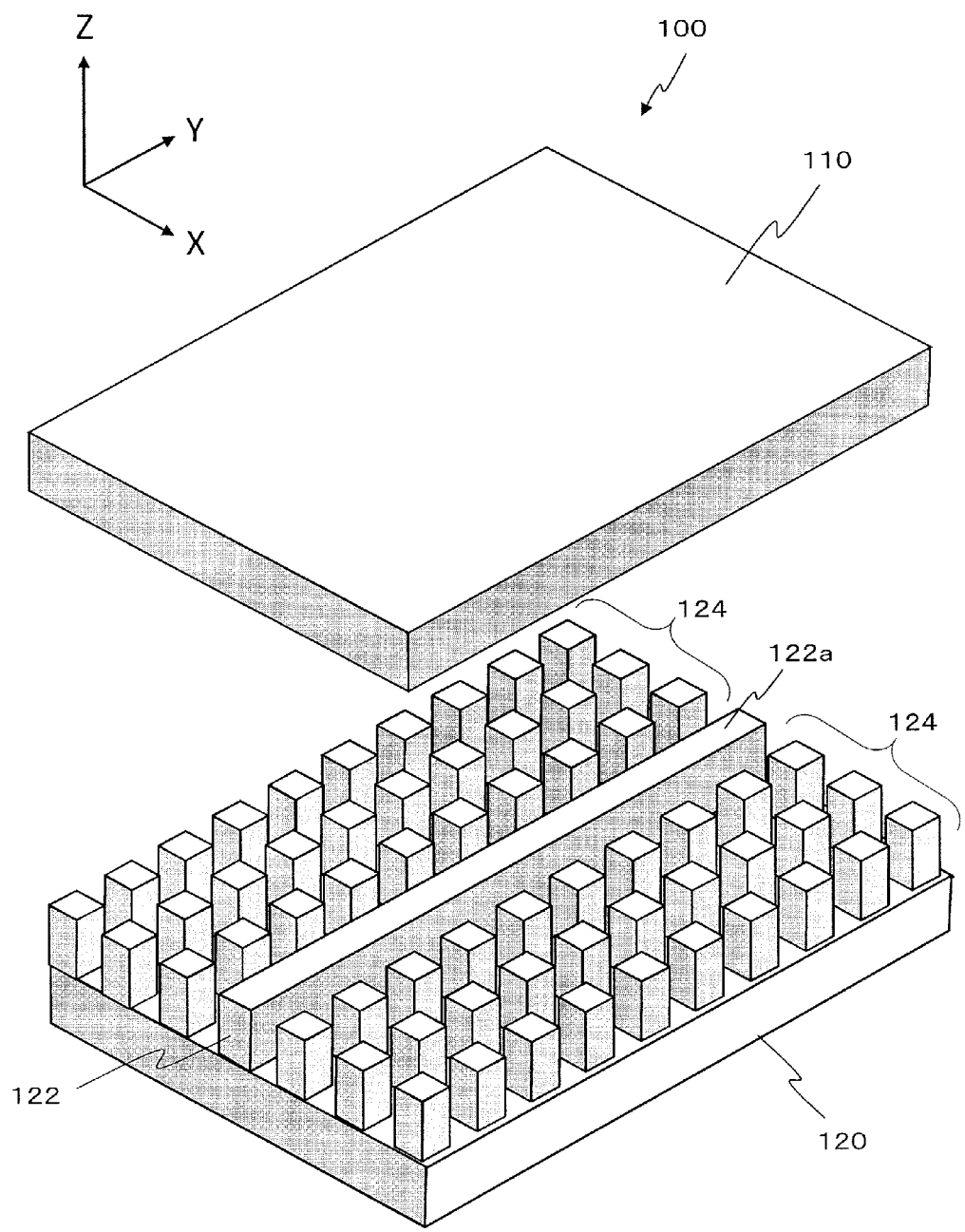

[Fig. 4]
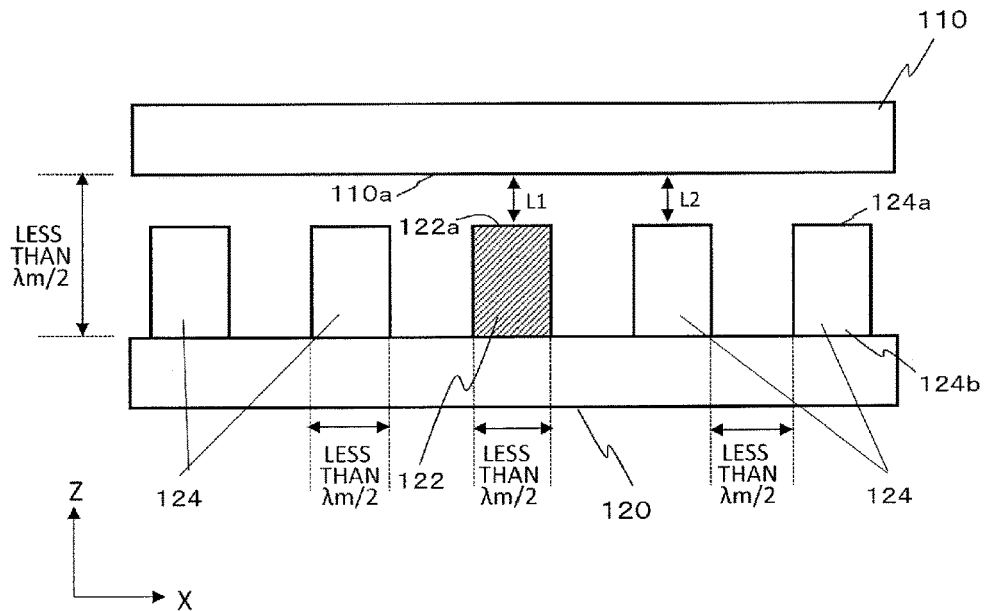
[Fig. 5A]
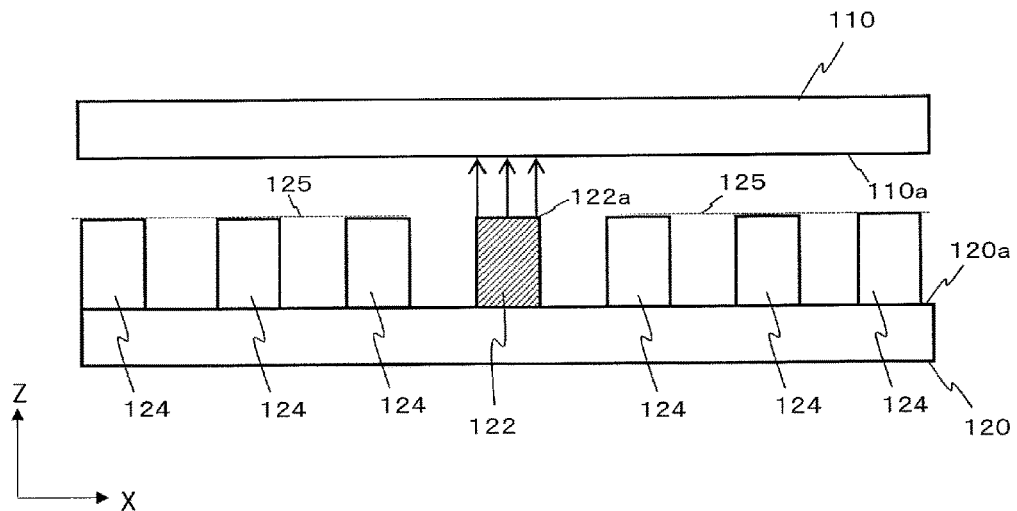
[Fig. 5B]
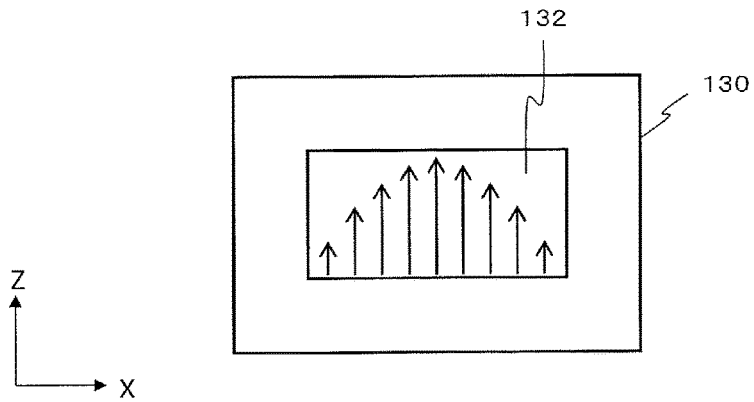

[Fig. 5C]
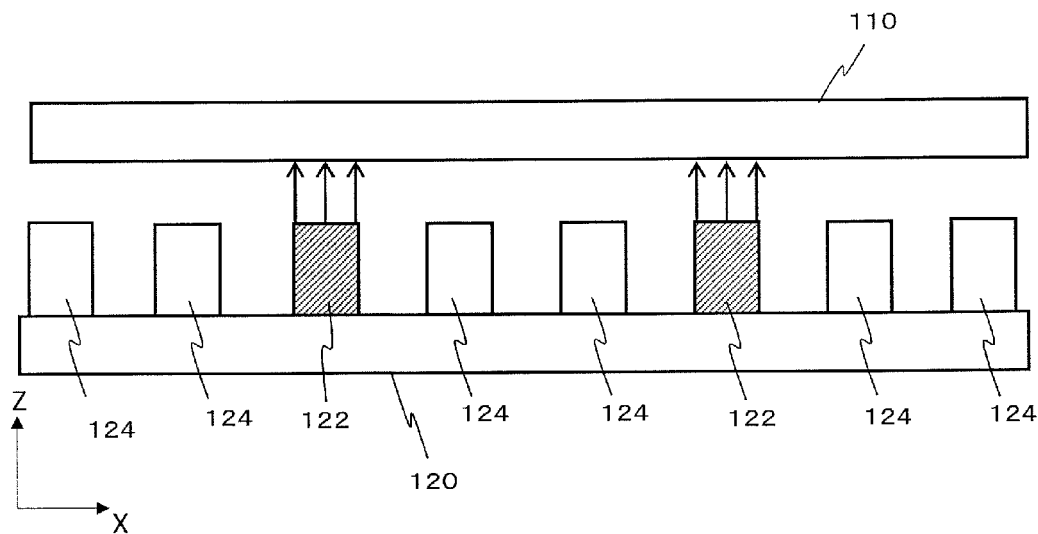
[Fig. 5D]
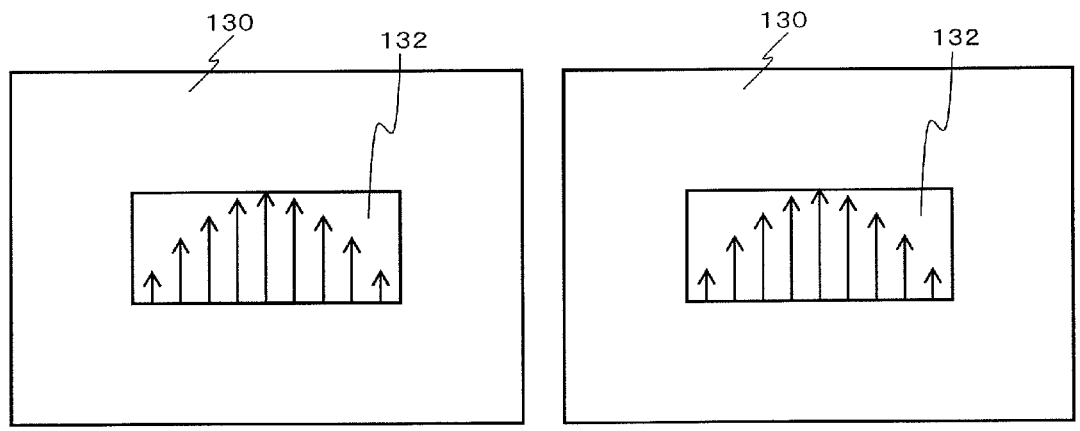

[Fig. 6A]
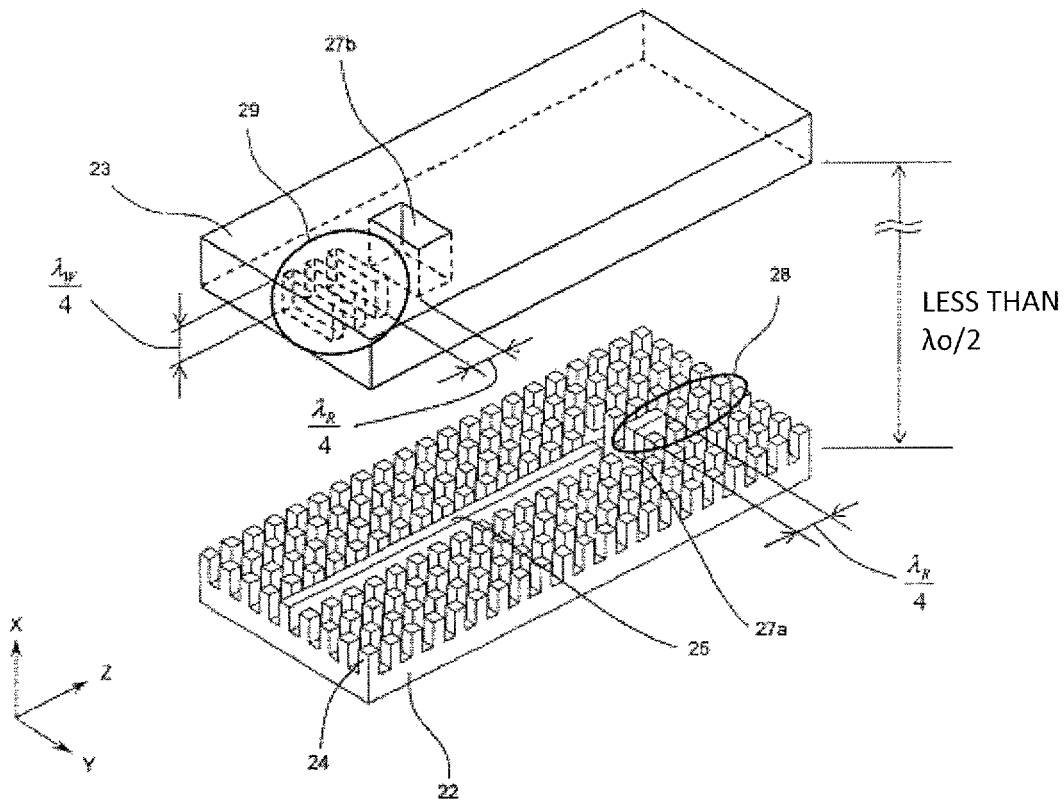
[Fig. 6B]
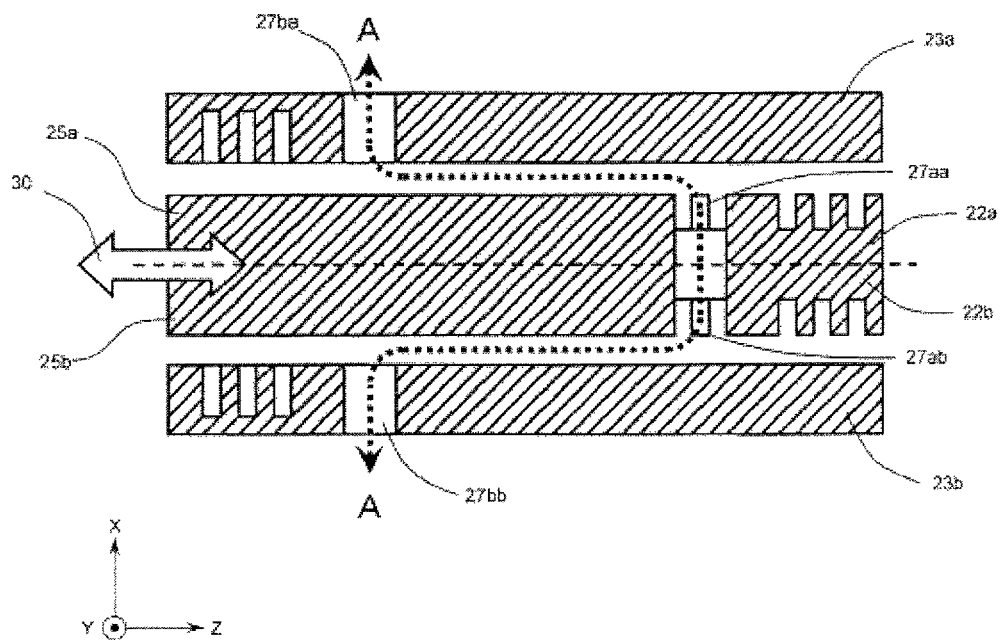

[Fig. 7A]
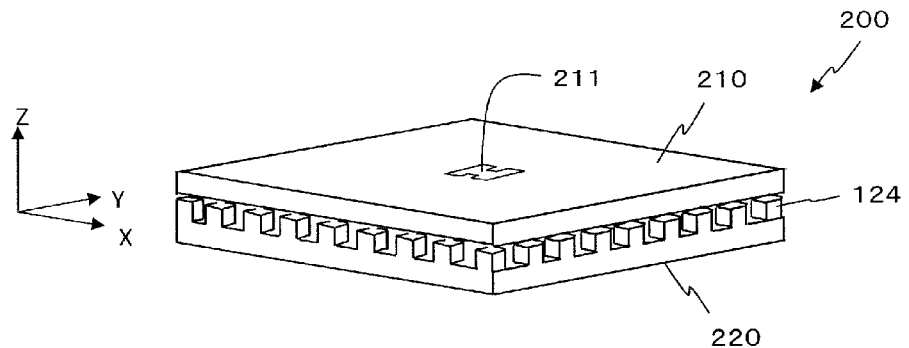
[Fig. 7B]
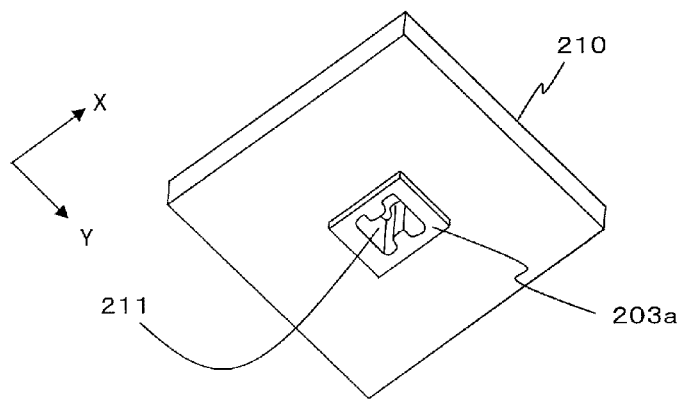
[Fig. 7C]
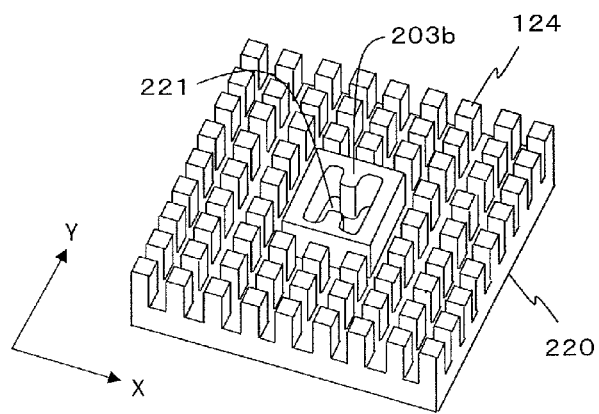

[Fig. 7D]
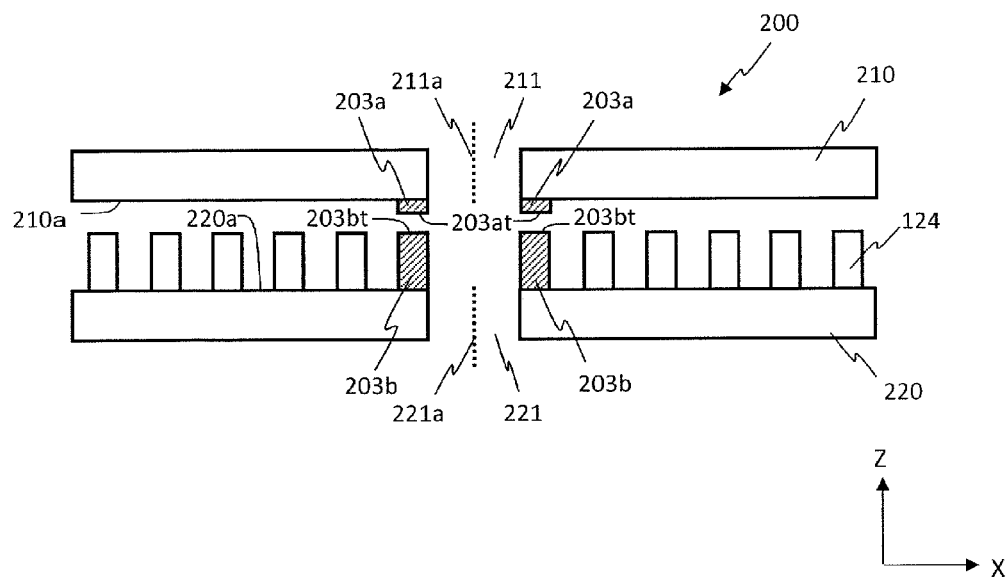
[Fig. 8A]
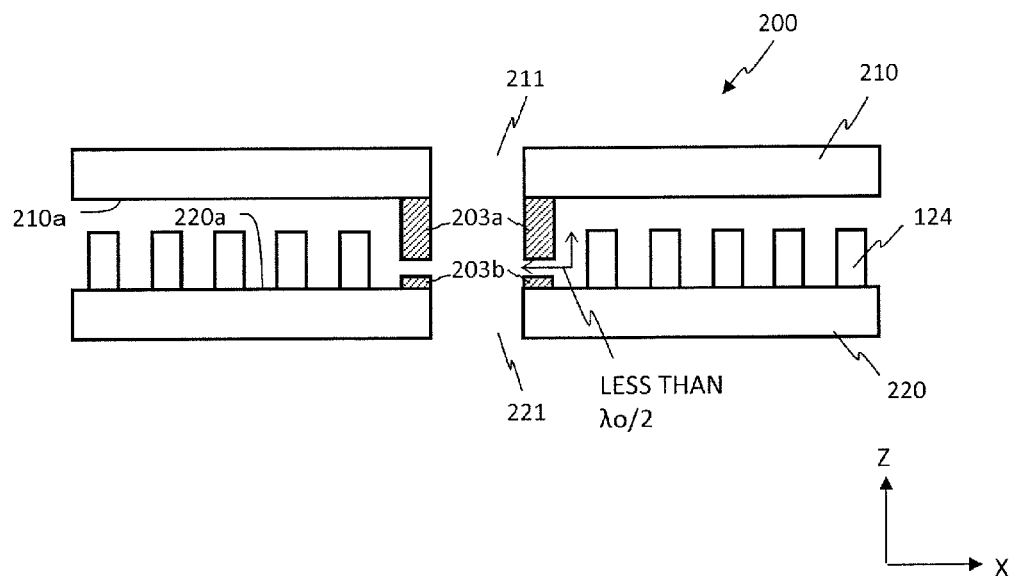

[Fig. 8B]
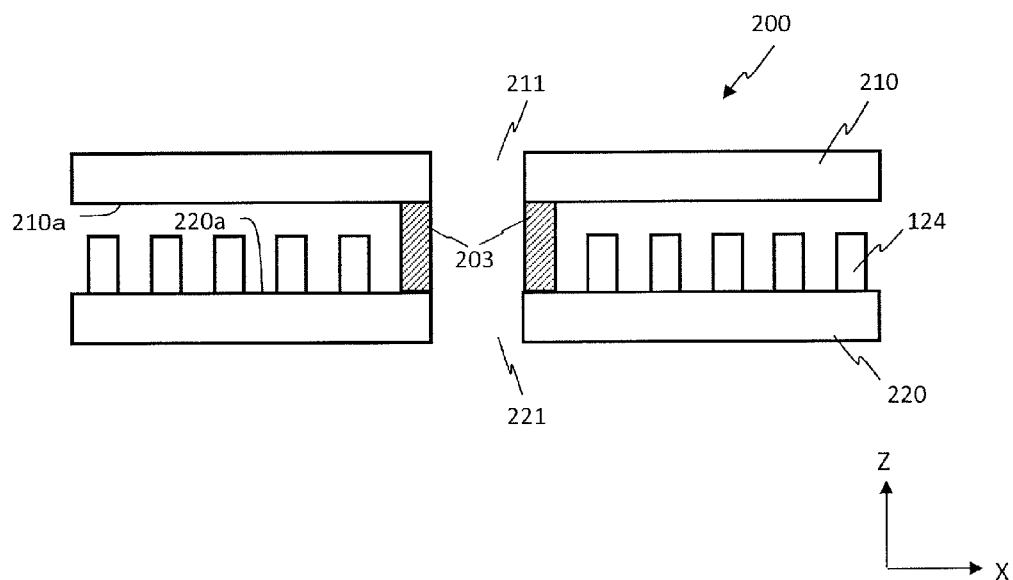
[Fig. 8C]
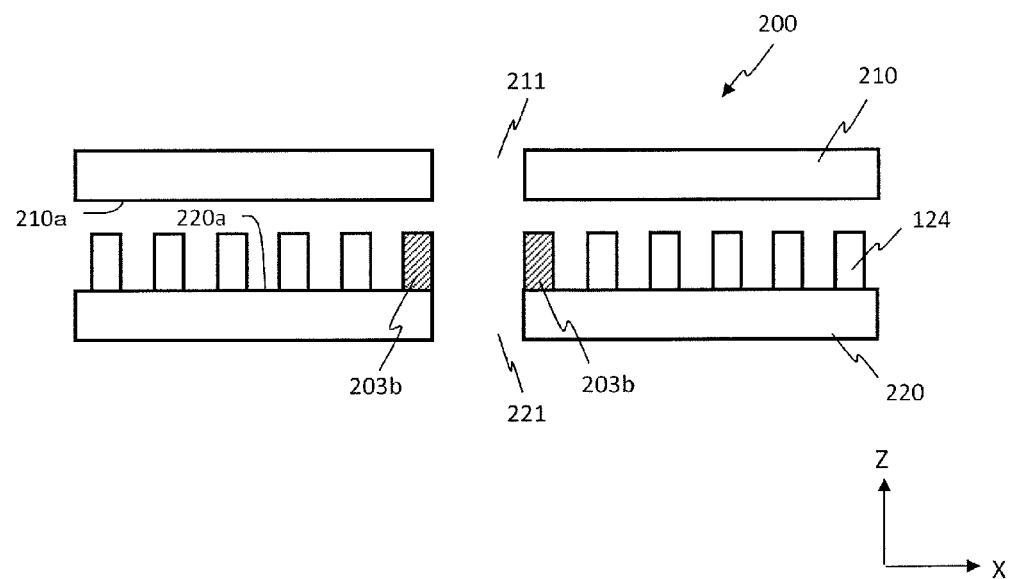

[Fig. 8D]
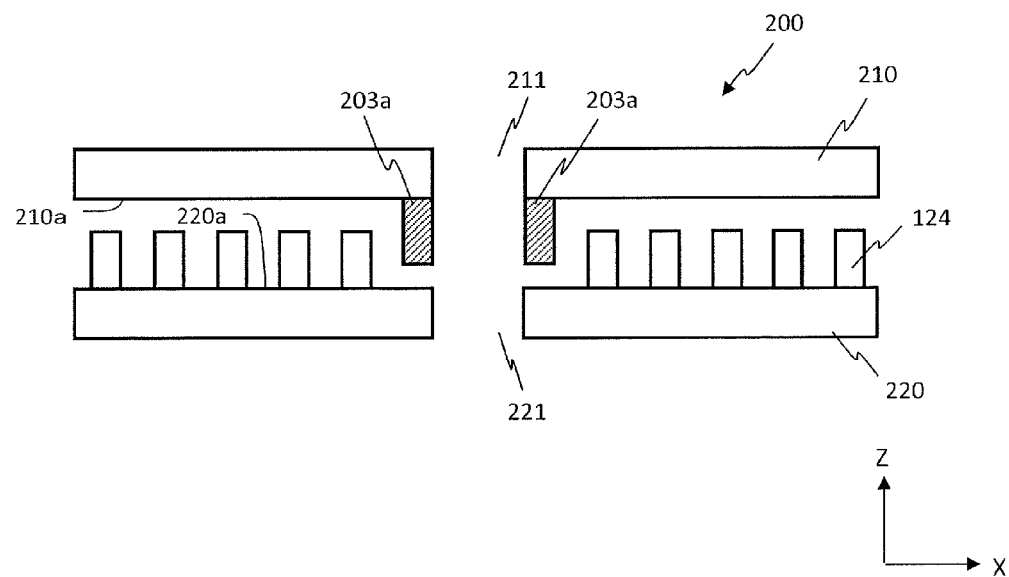
[Fig. 8E]
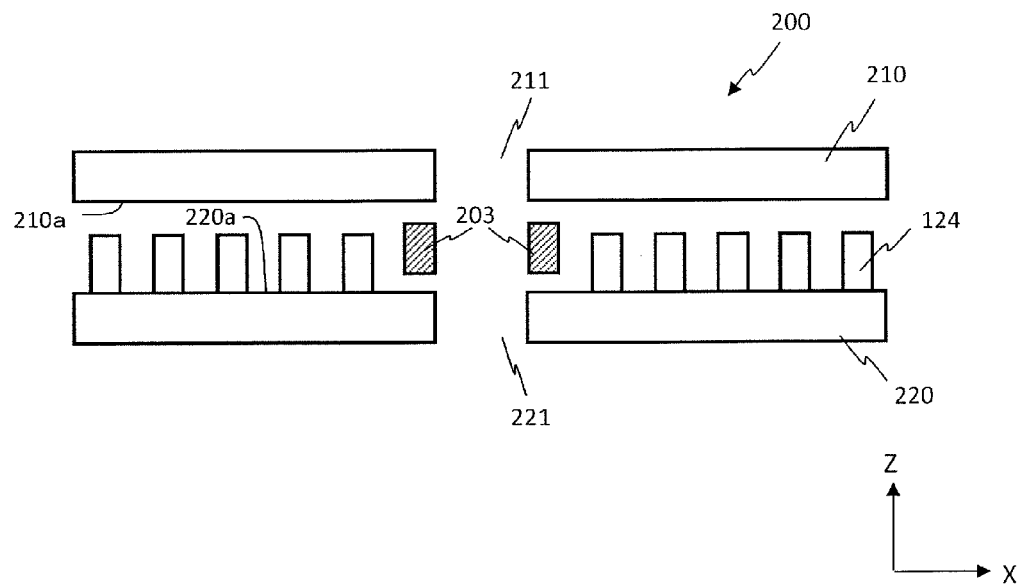

[Fig. 9A]
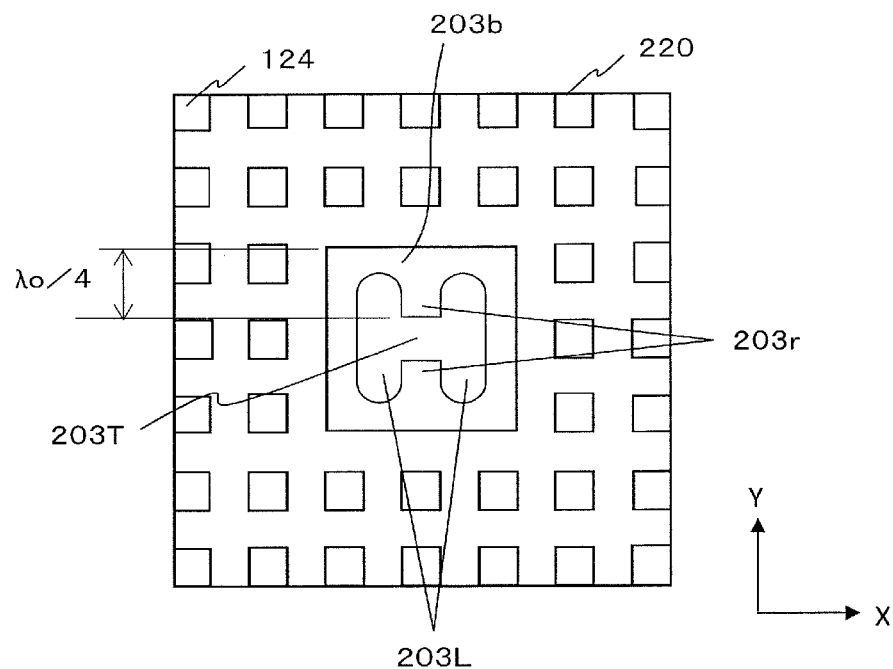
[Fig. 9B]
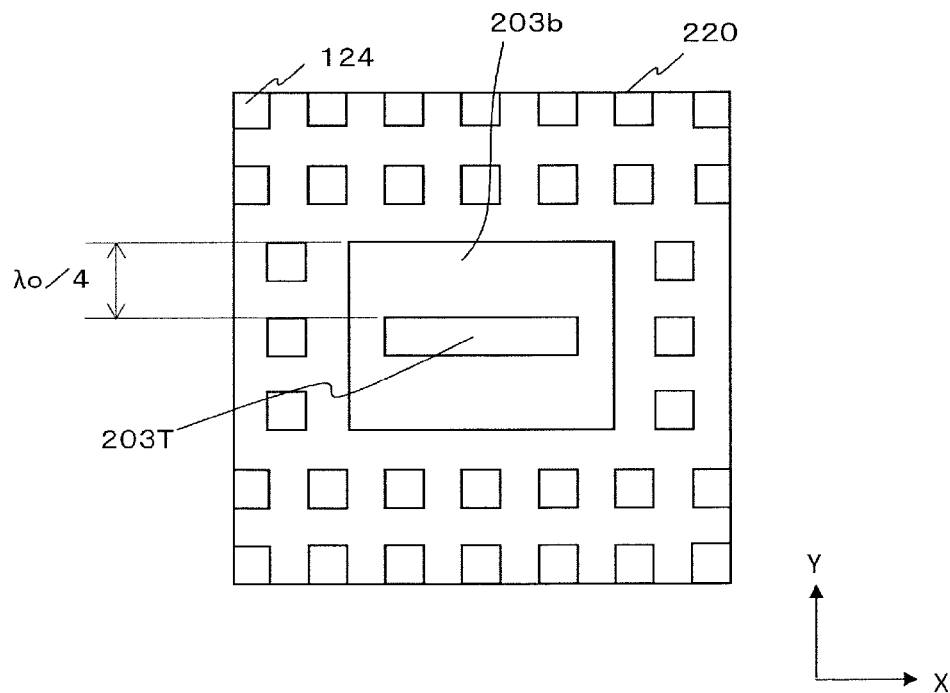

[Fig. 9C]
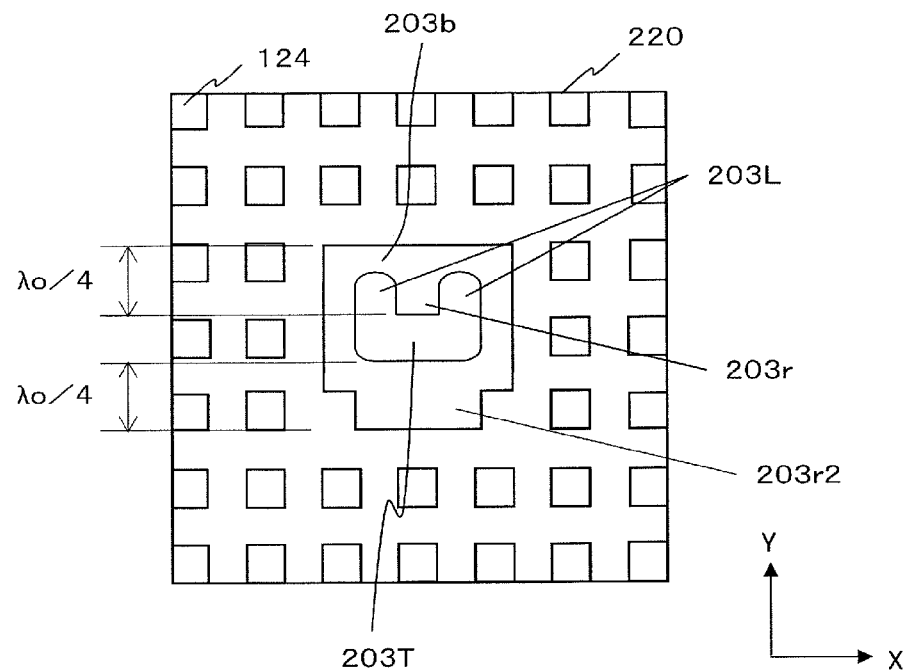
[Fig. 9D]
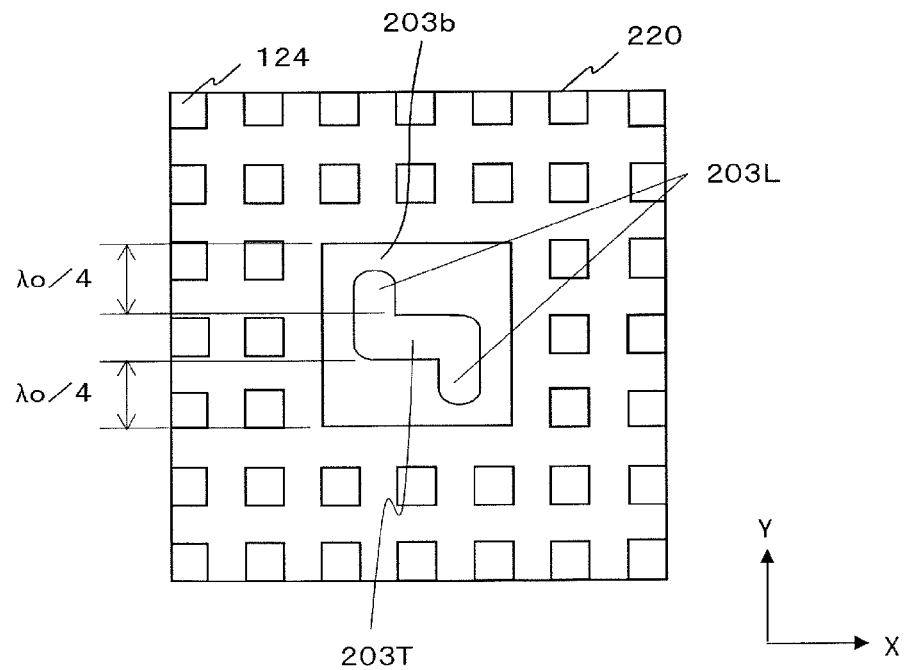

[Fig. 10]
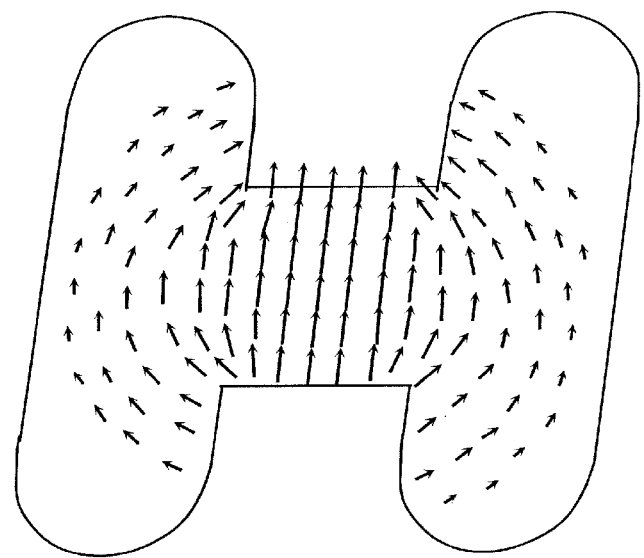
[Fig. 11]
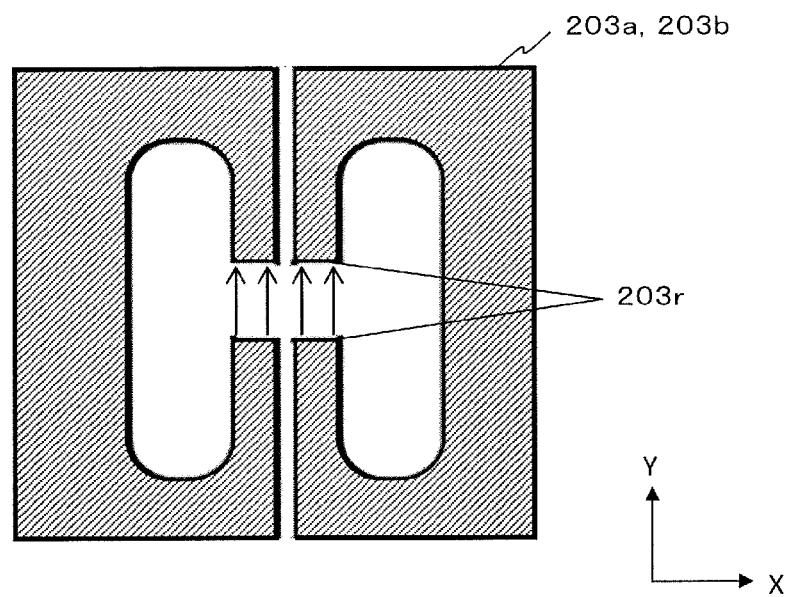

[Fig. 12A]
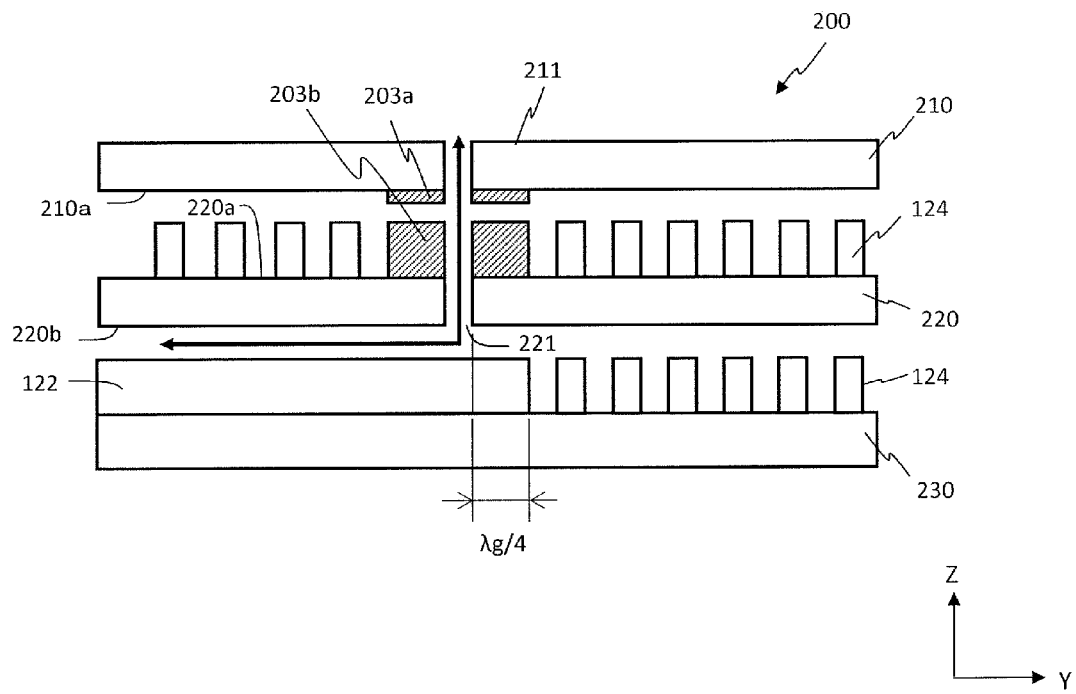
[Fig. 12B]
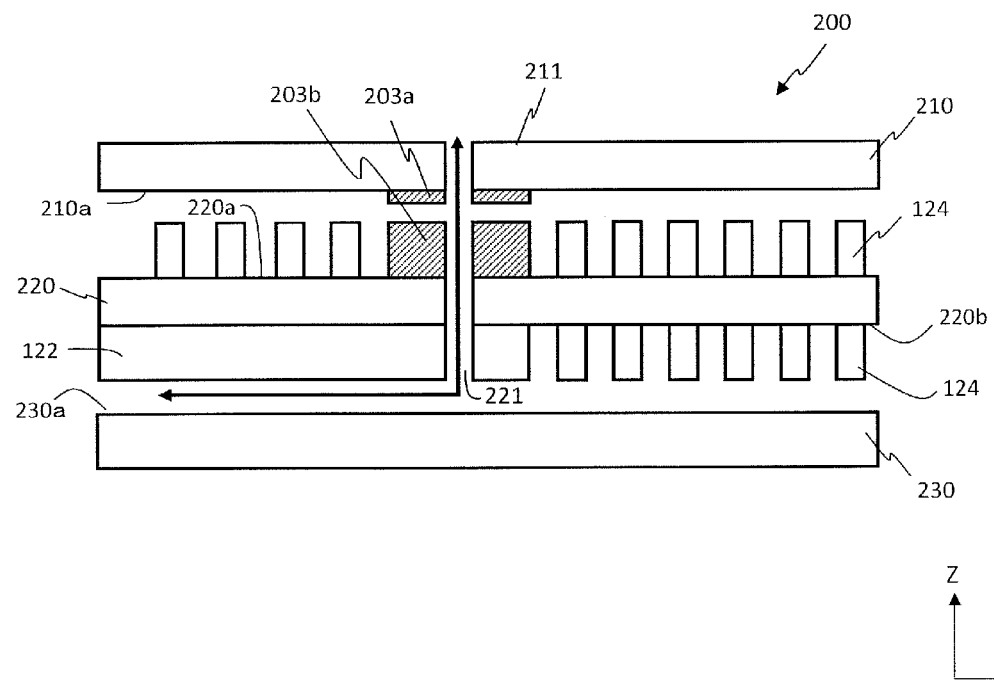

[Fig. 13]
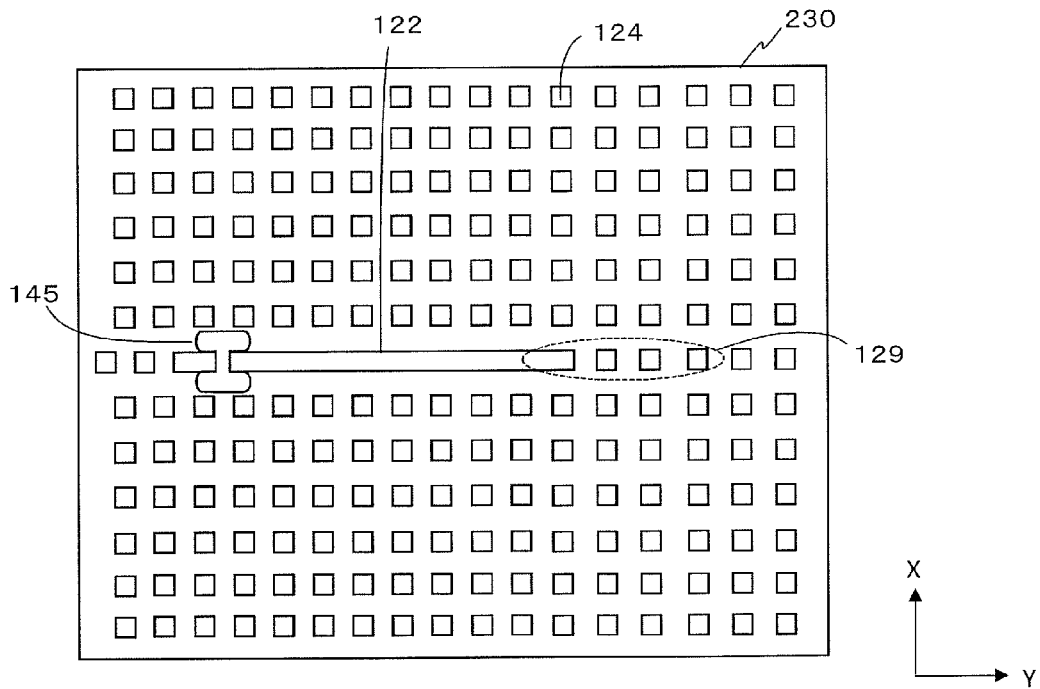
[Fig. 14]
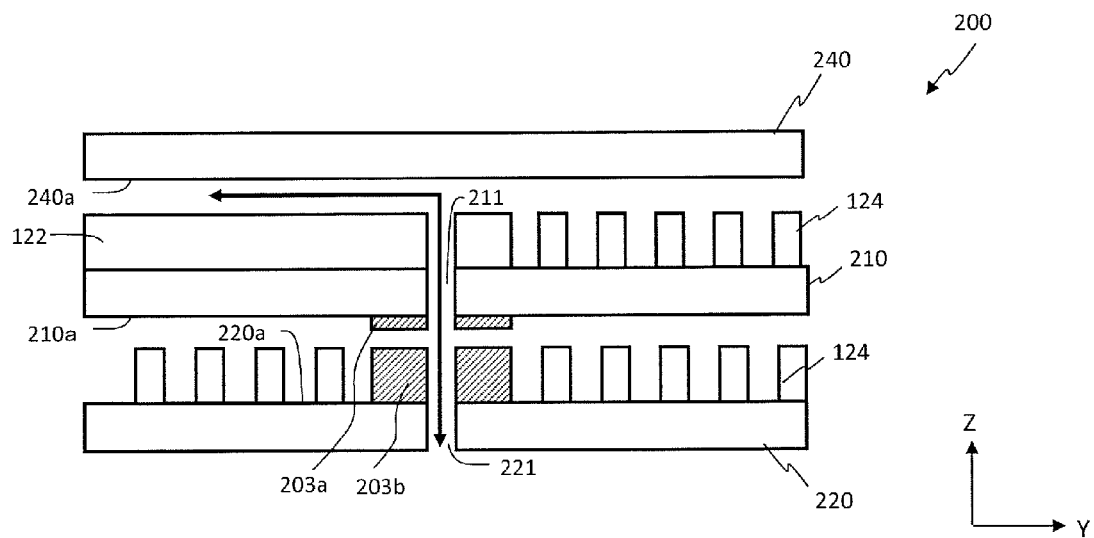

[Fig. 15]
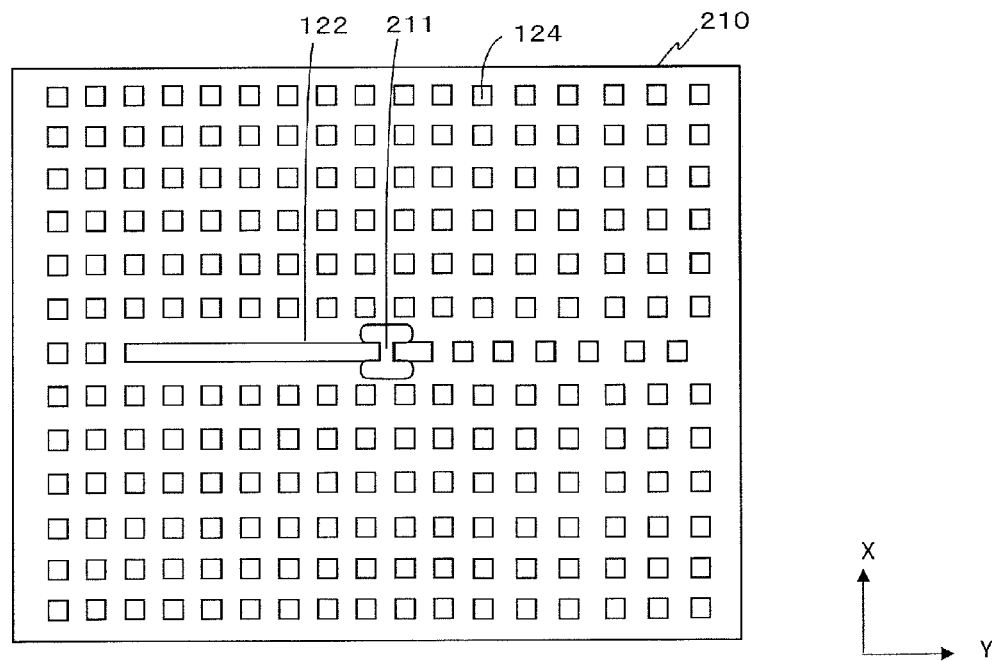
[Fig. 16]
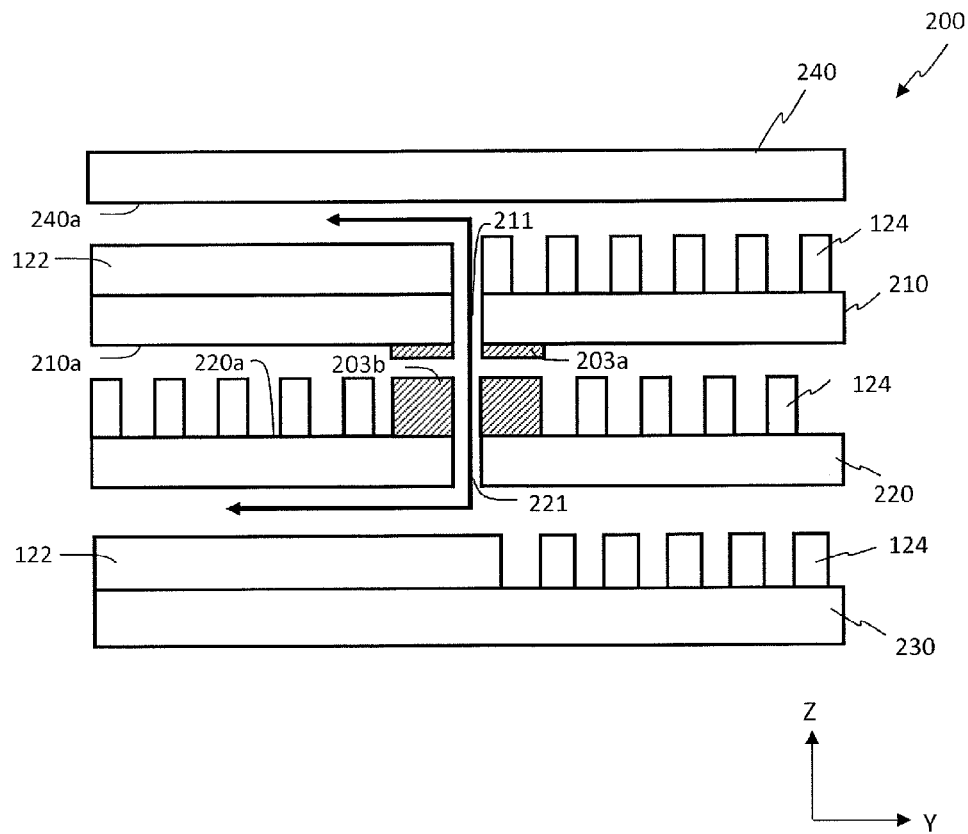

[Fig. 17]
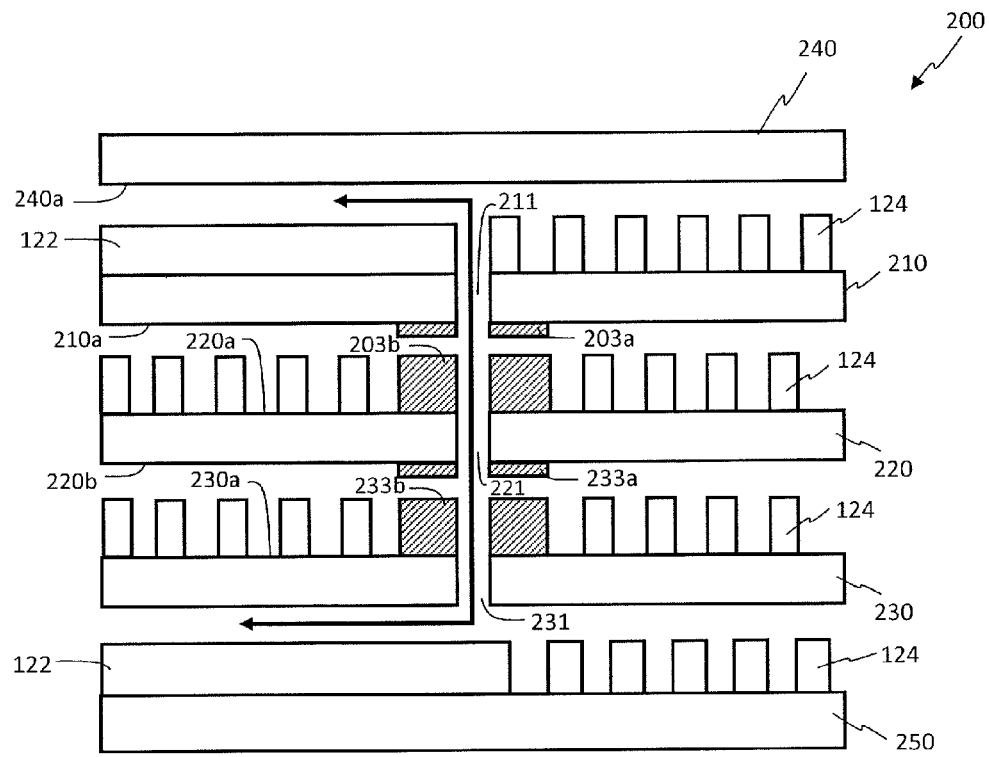
[Fig. 18]
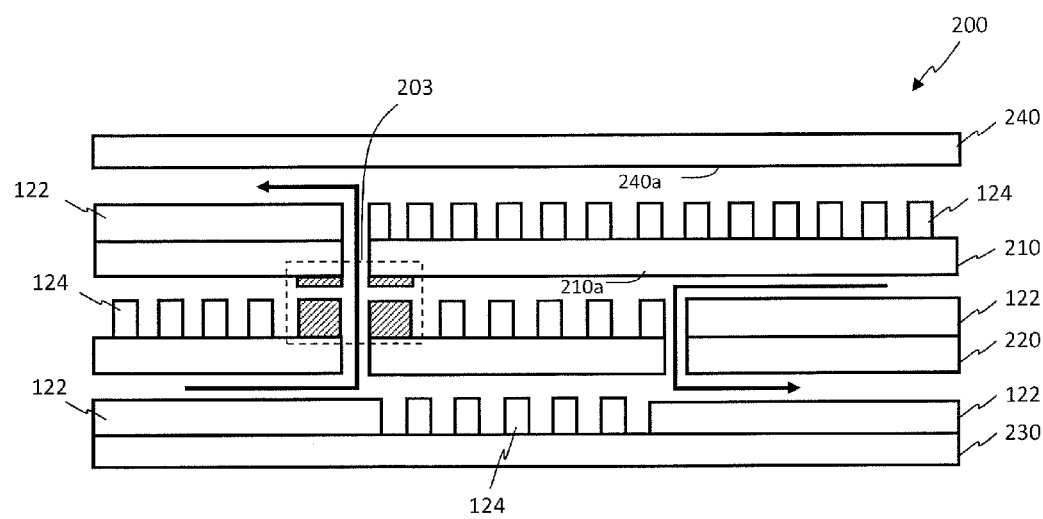

[Fig. 19]
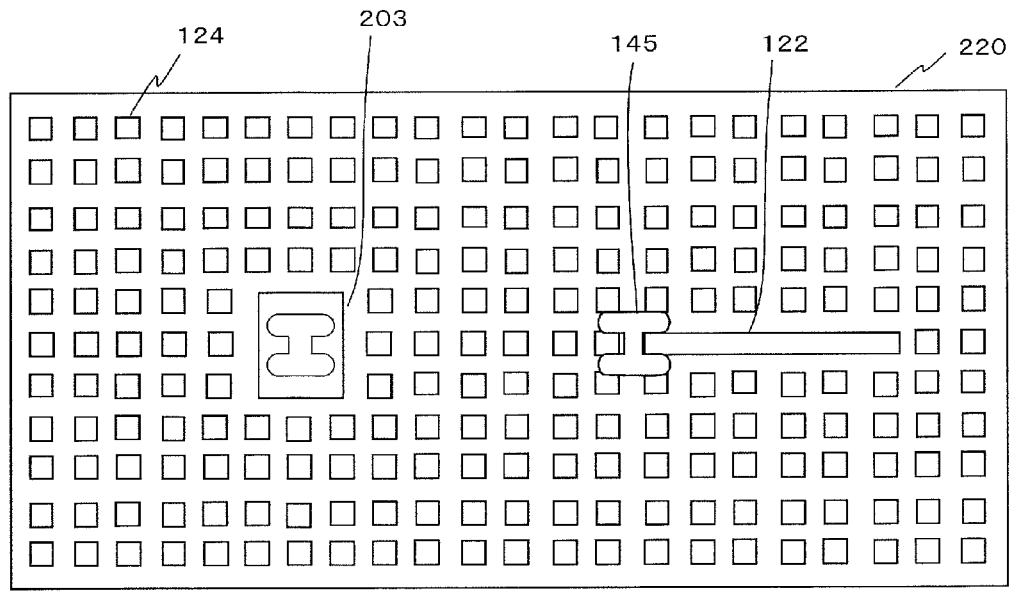
[Fig. 20A]
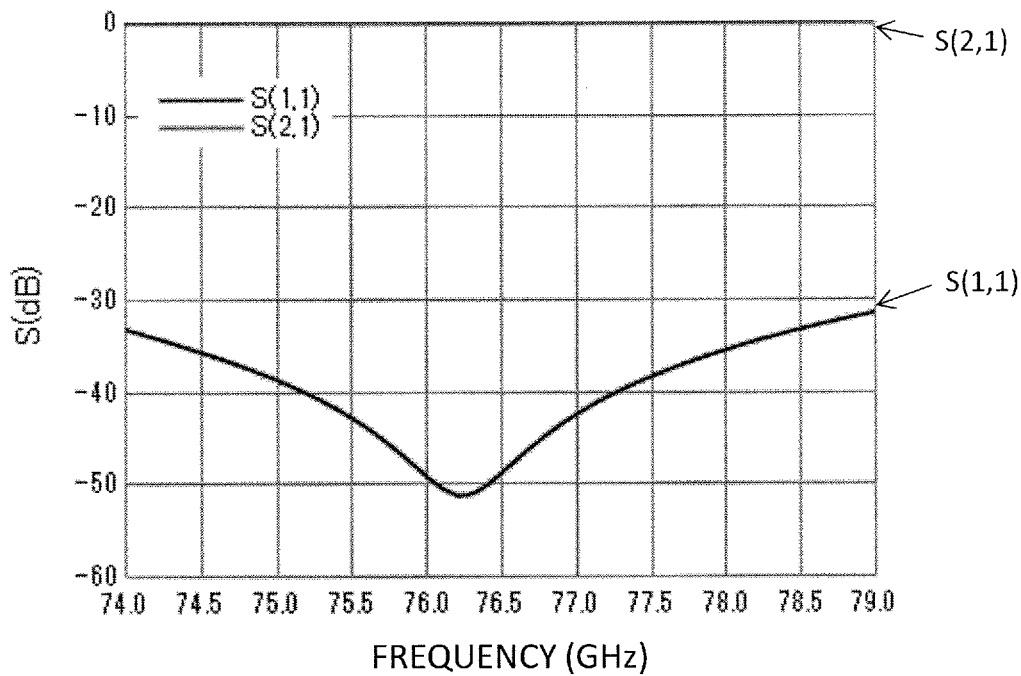

[Fig. 20B]
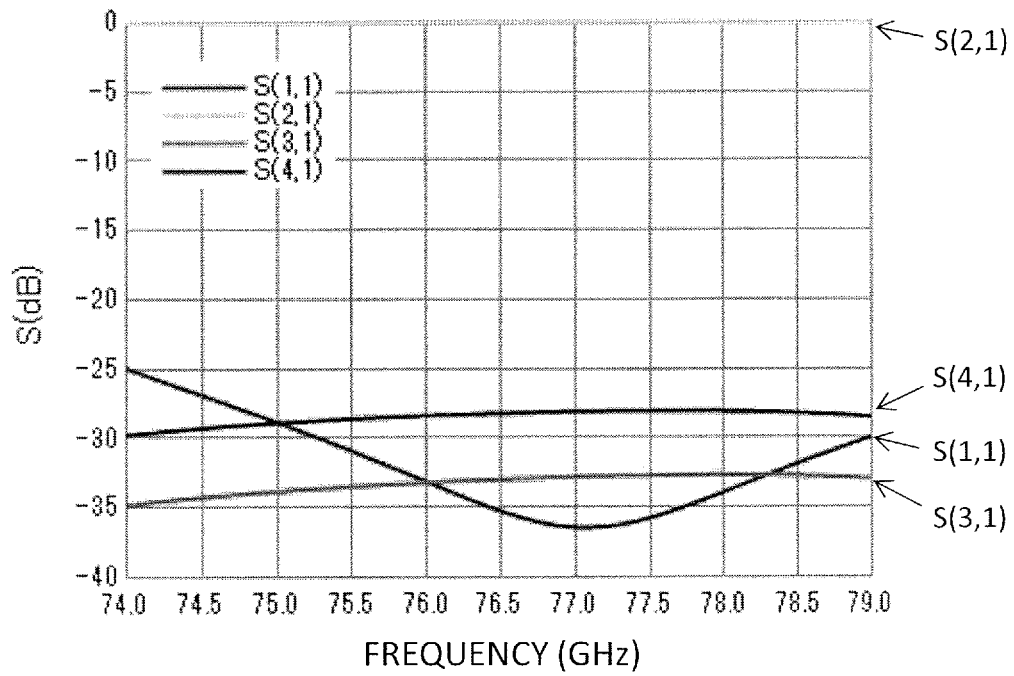
[Fig. 21A]
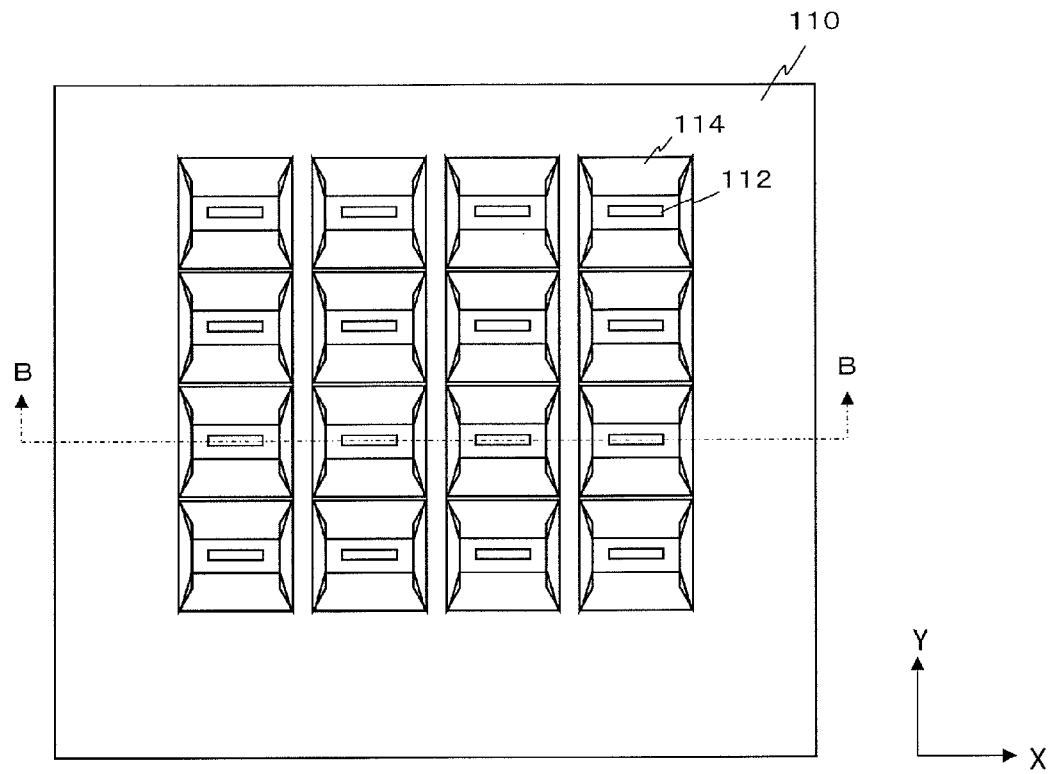

[Fig. 21B]
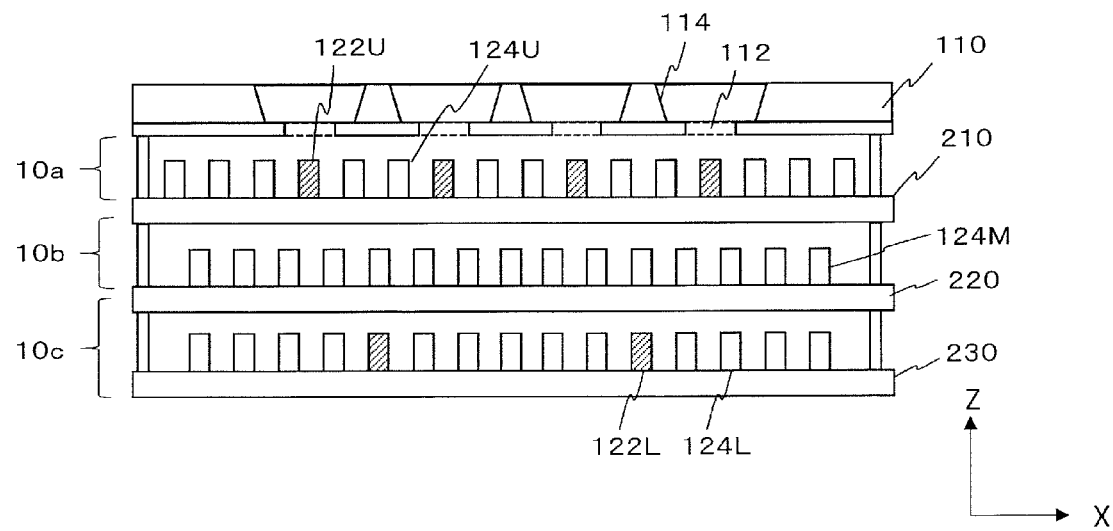
[Fig. 22A]
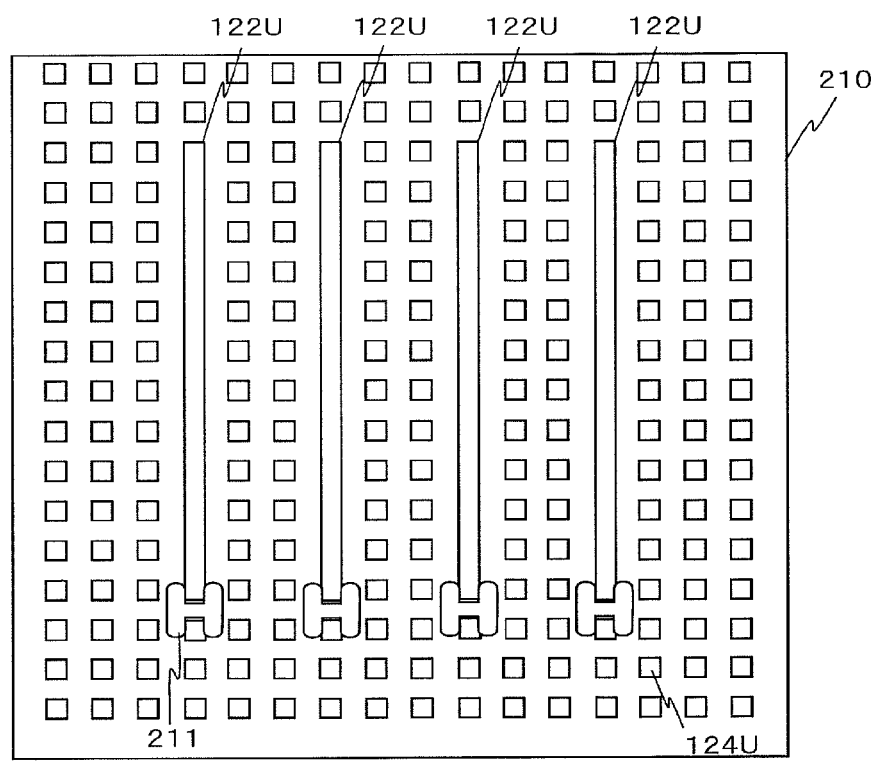

[Fig. 22B]
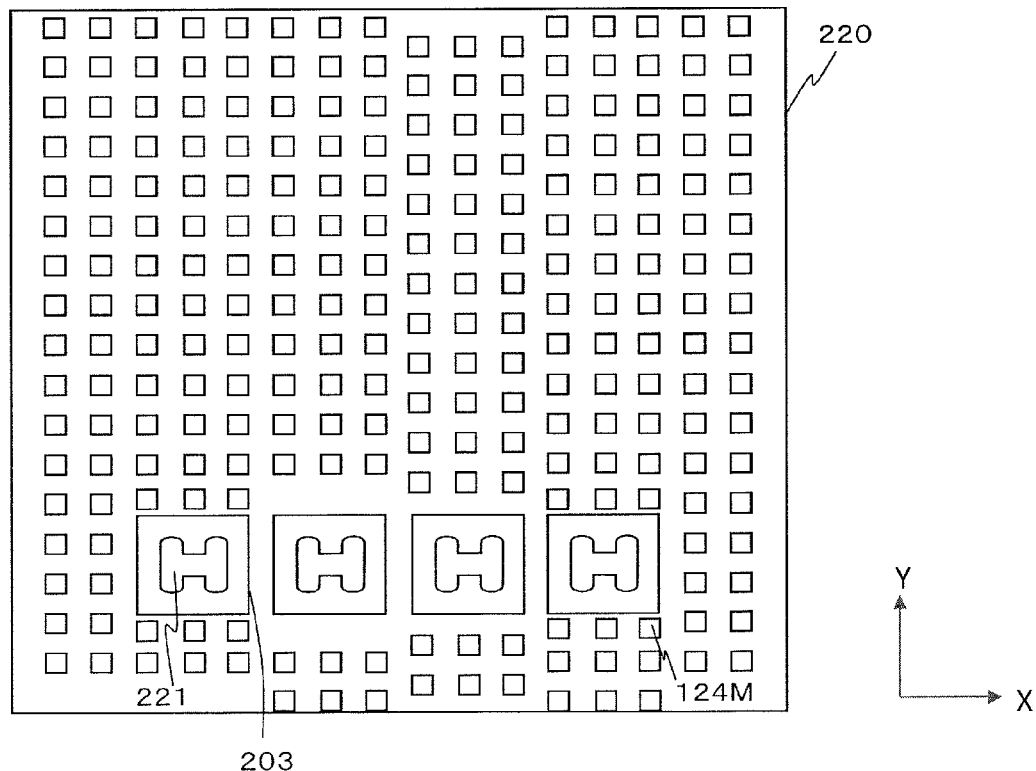
[Fig. 22C]
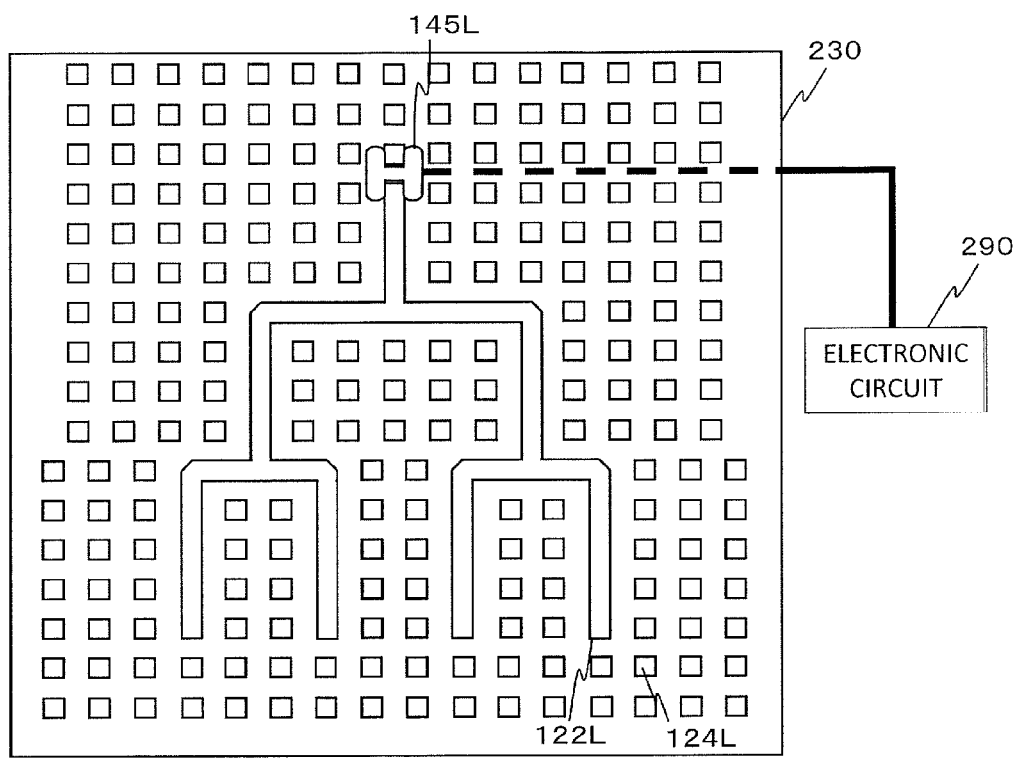

[Fig. 23A]
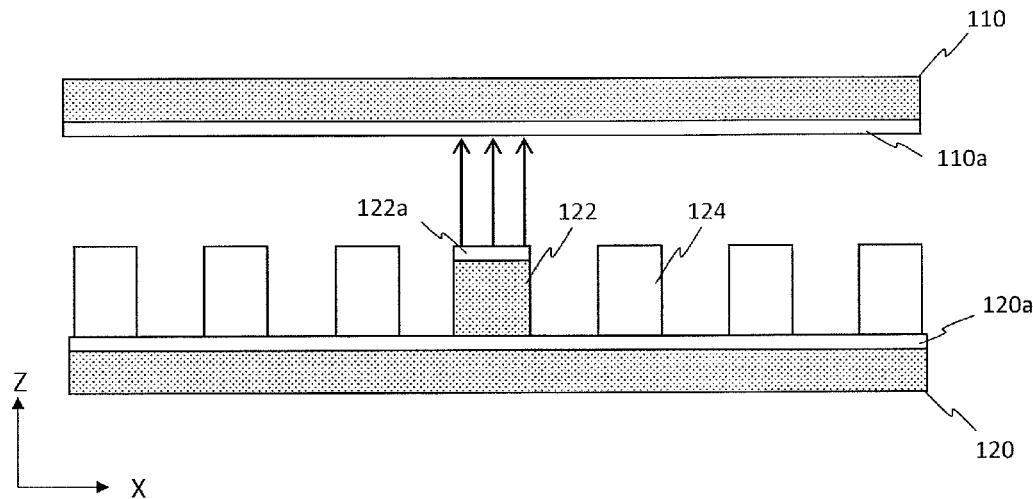
[Fig. 23B]
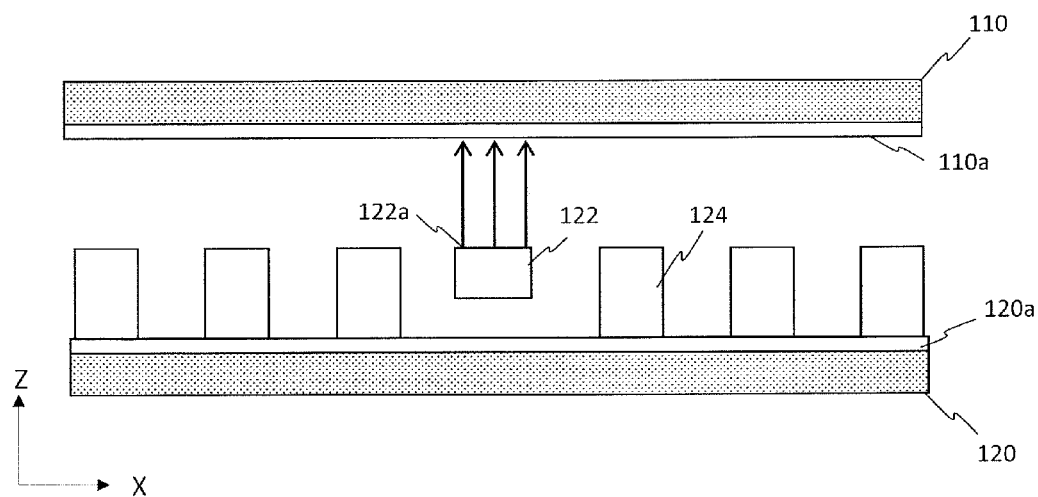
[Fig. 23C]
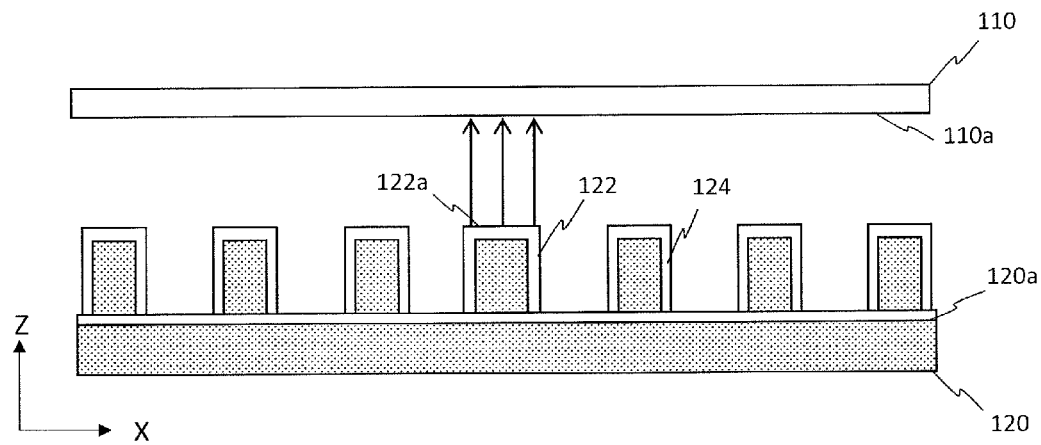

[Fig. 23D]
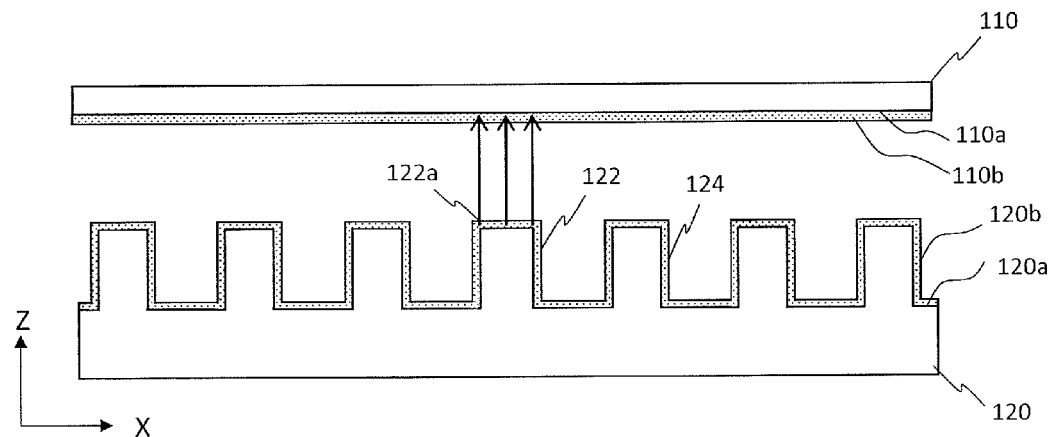
[Fig. 23E]
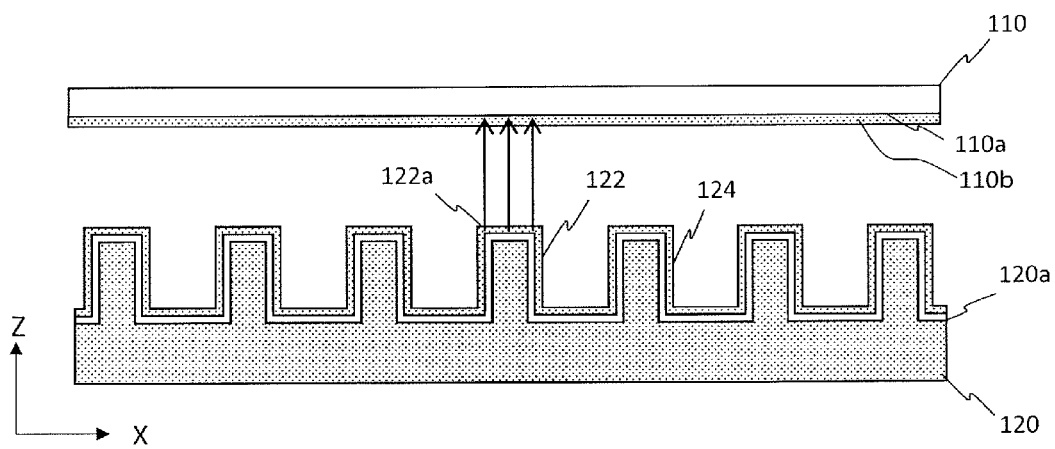
[Fig. 23F]
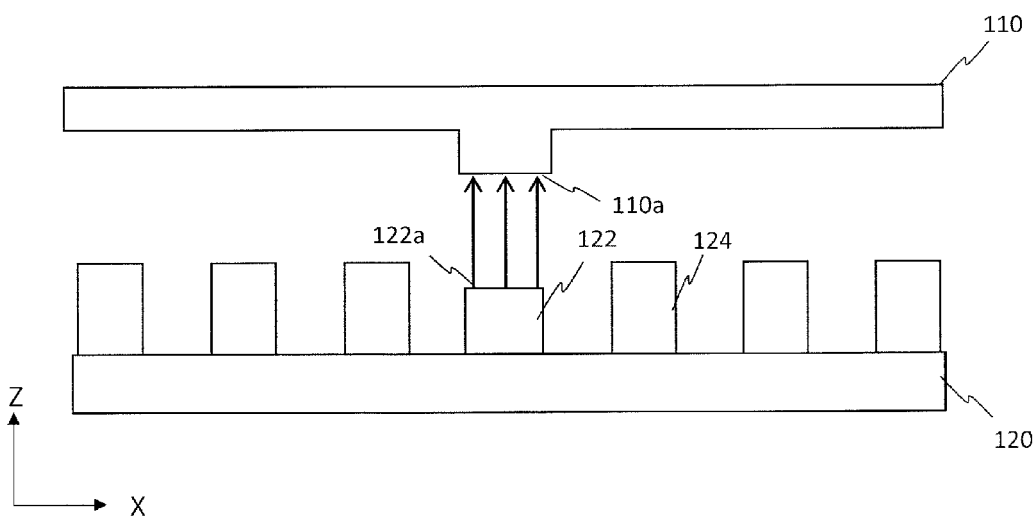

[Fig. 23G]
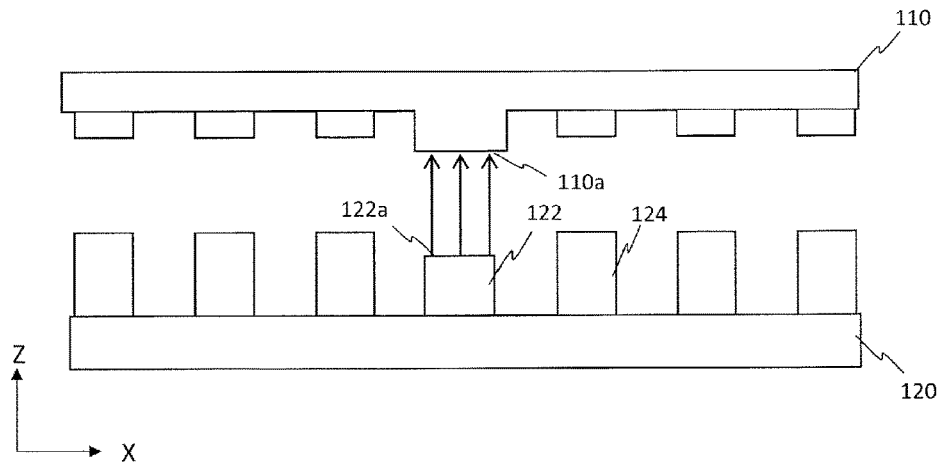
[Fig. 24A]
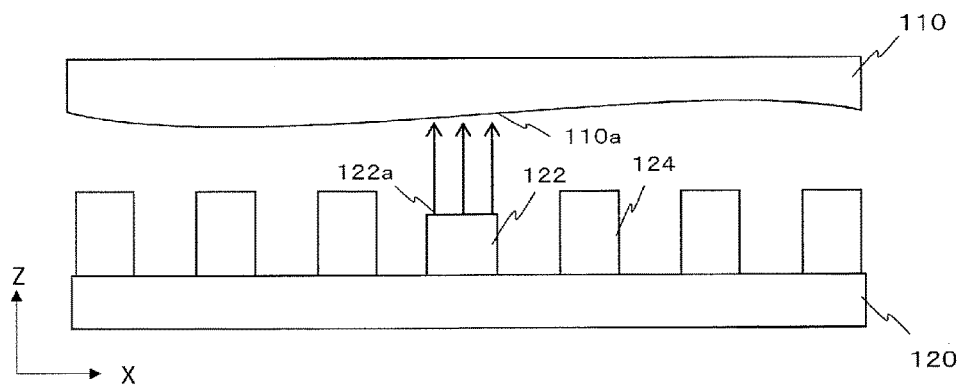
[Fig. 24B]
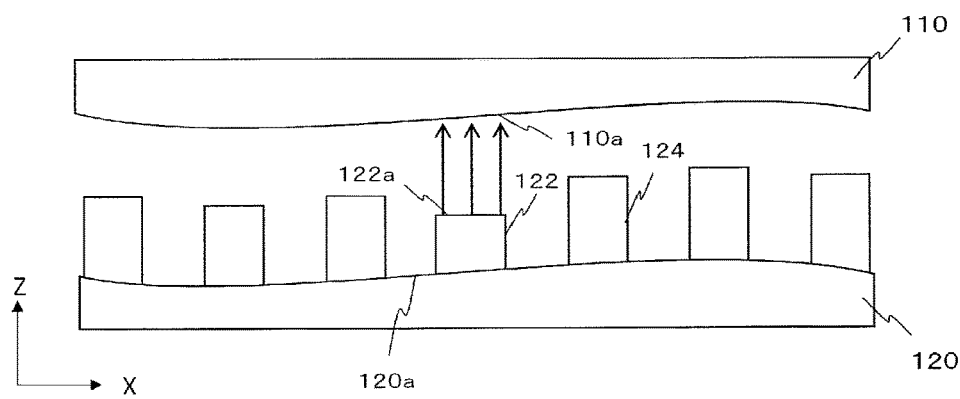
[Fig. 25]
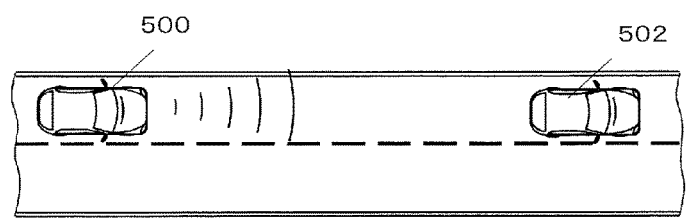

[Fig. 26]
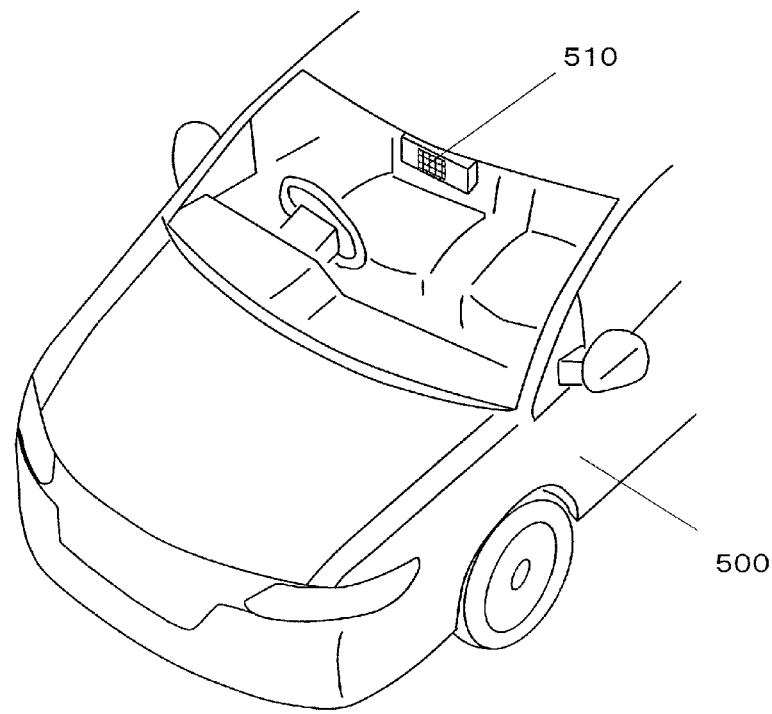
[Fig. 27A]
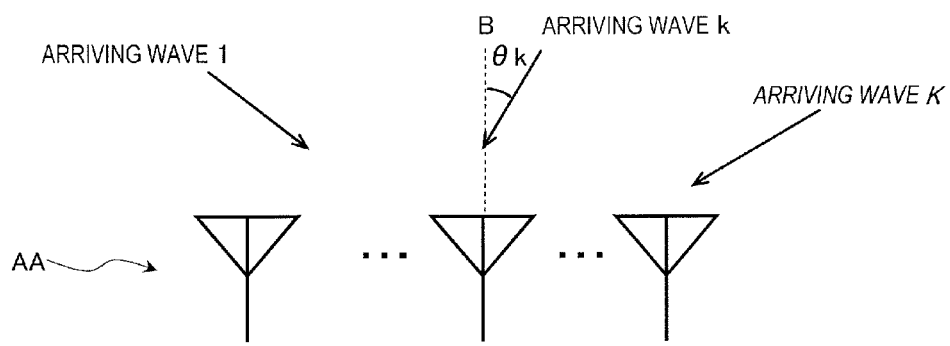
[Fig. 27B]
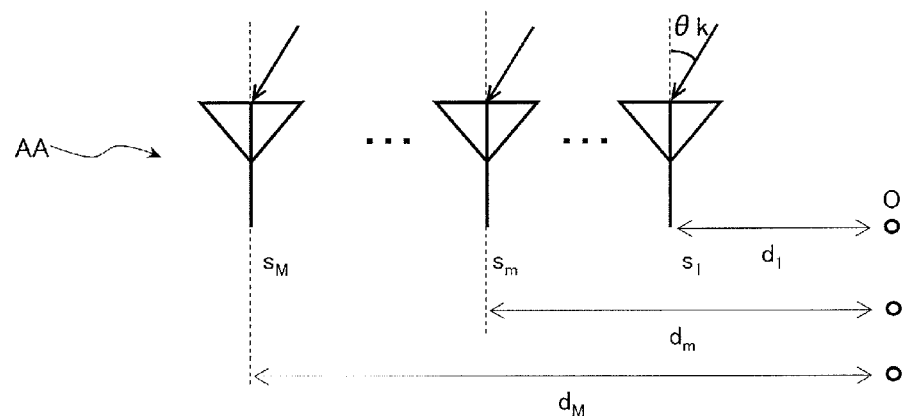

[Fig. 28]
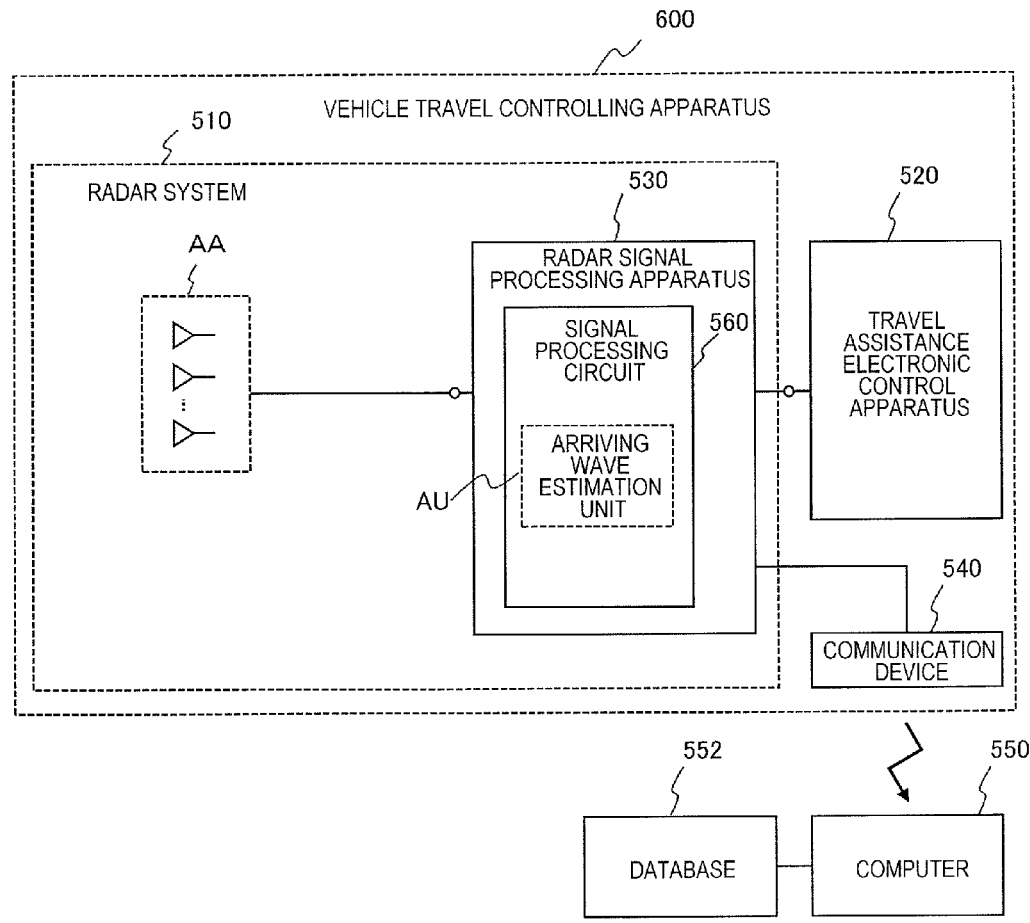
[Fig. 29]
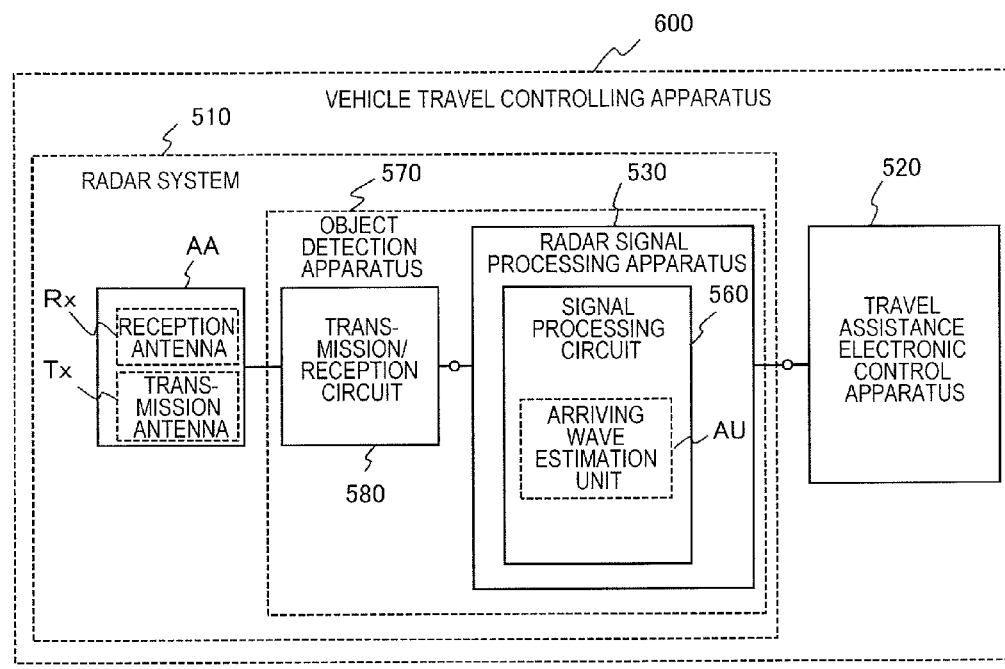

[Fig. 30]
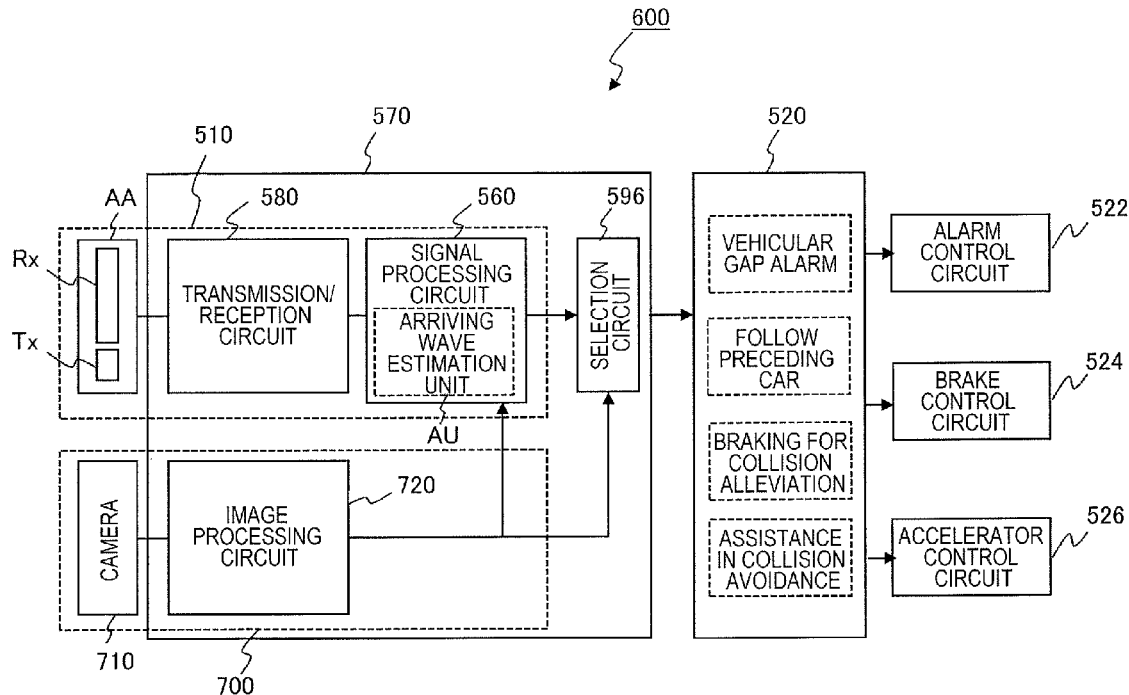
[Fig. 31]
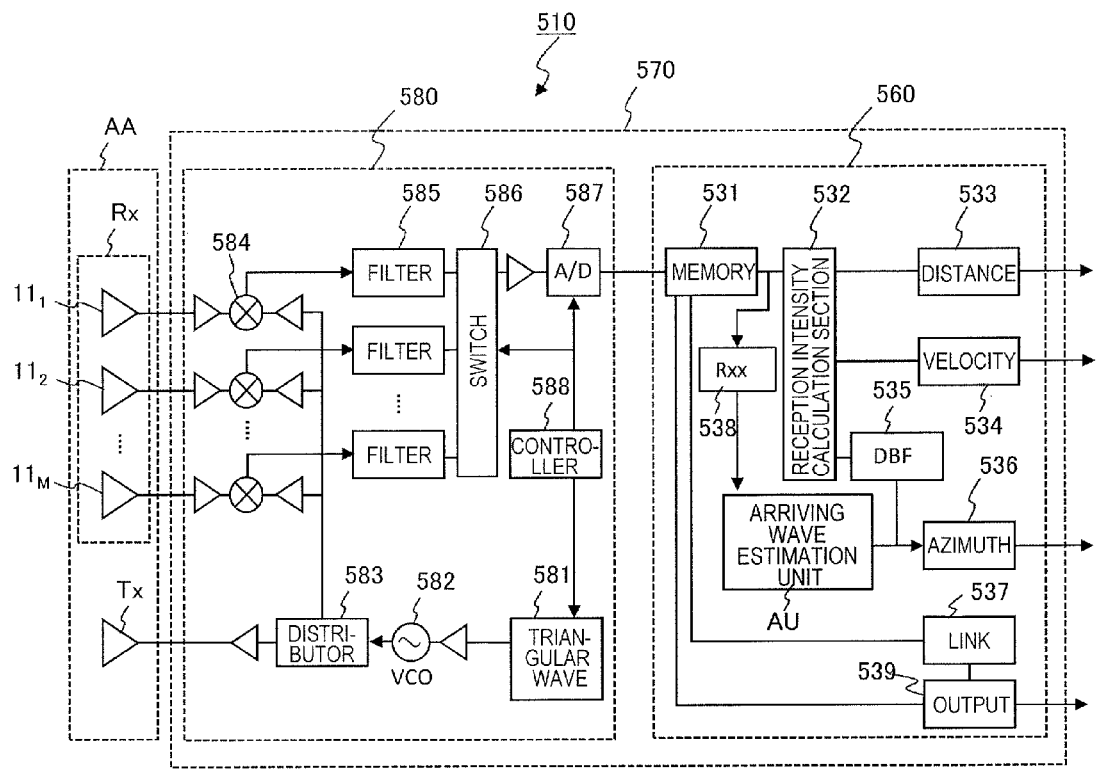

[Fig. 32]
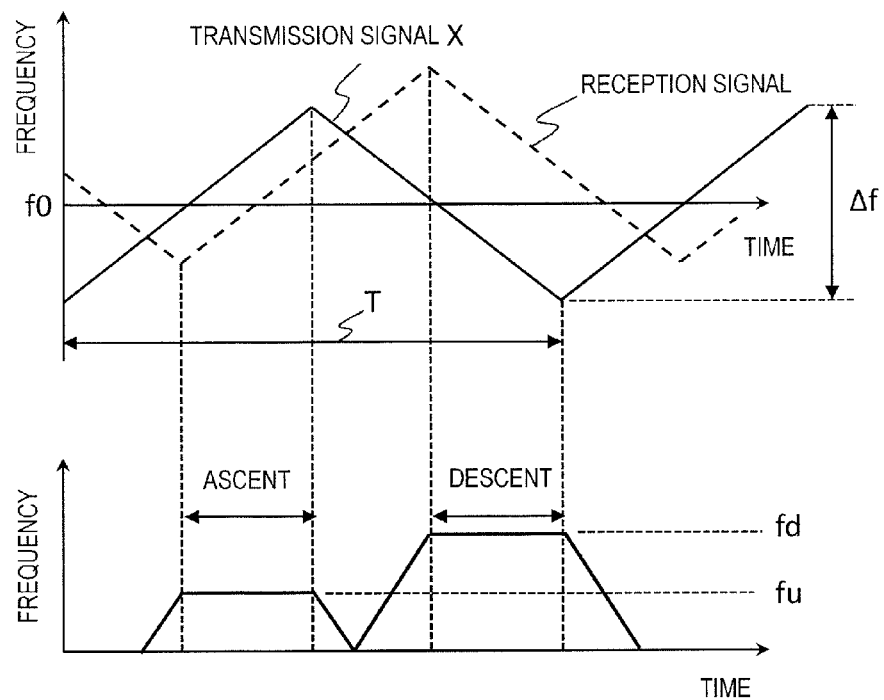
[Fig. 33]
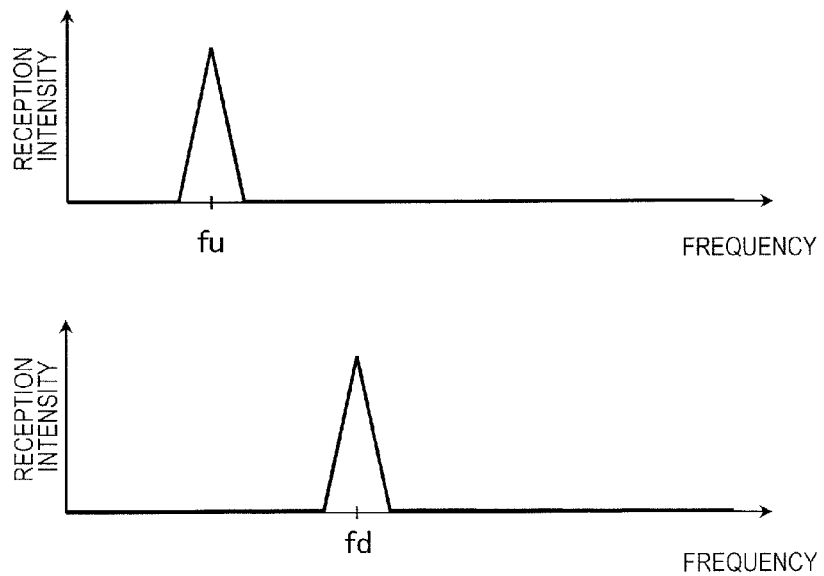

[Fig. 34]
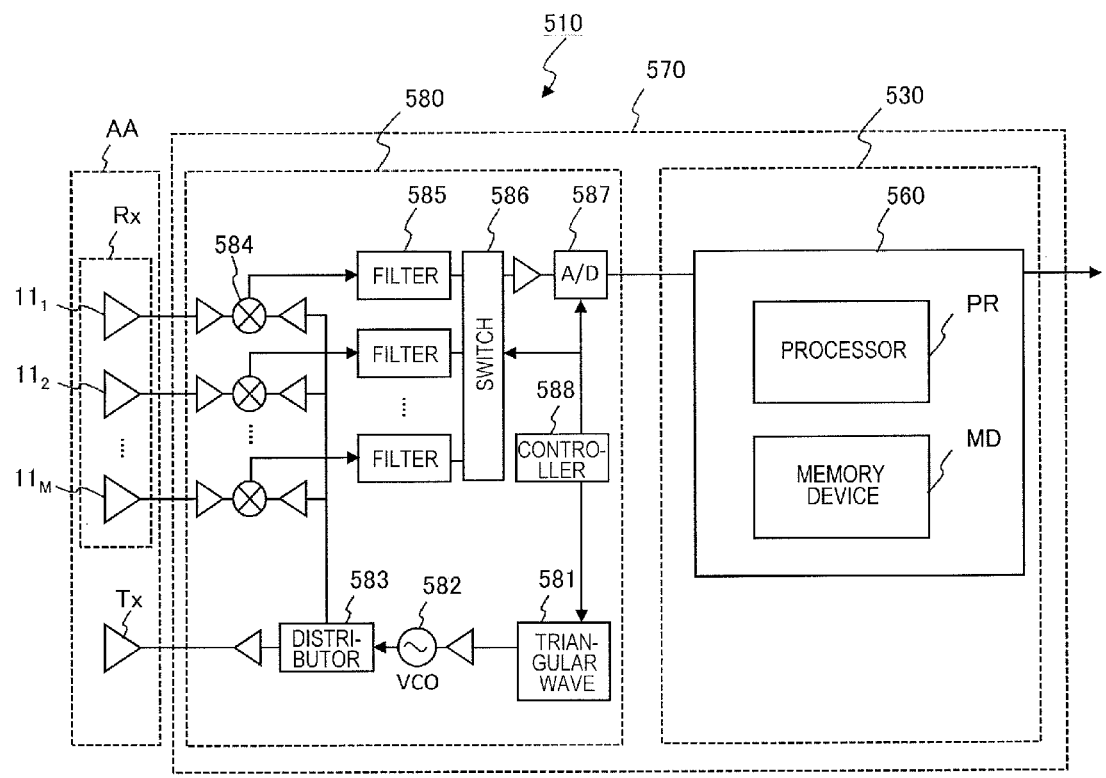
[Fig. 35]
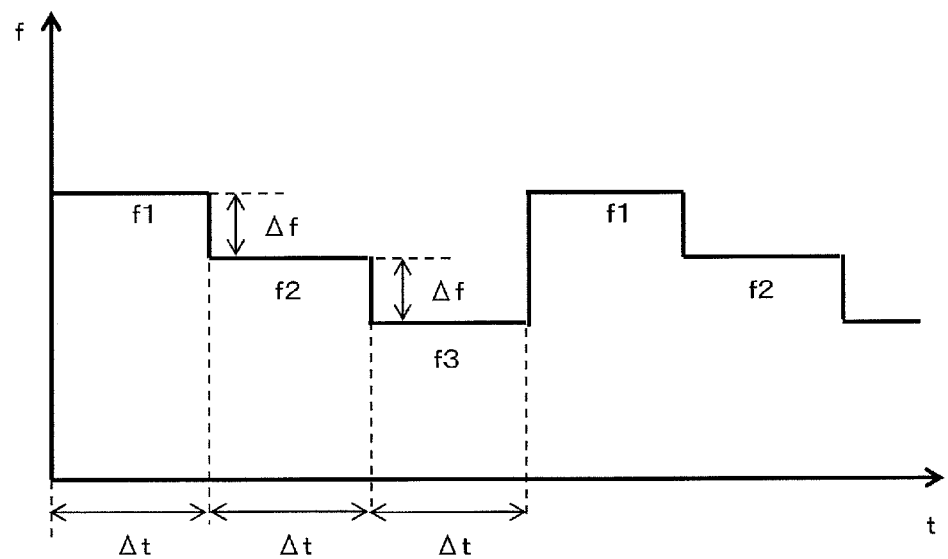

[Fig. 36]
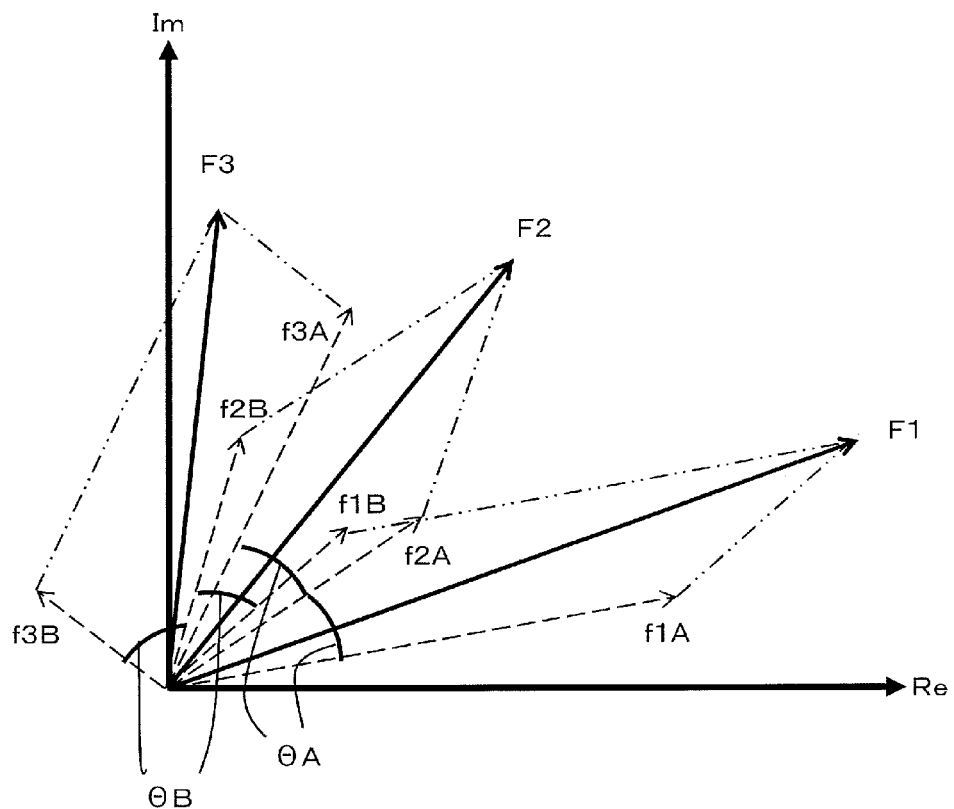

[Fig. 37]
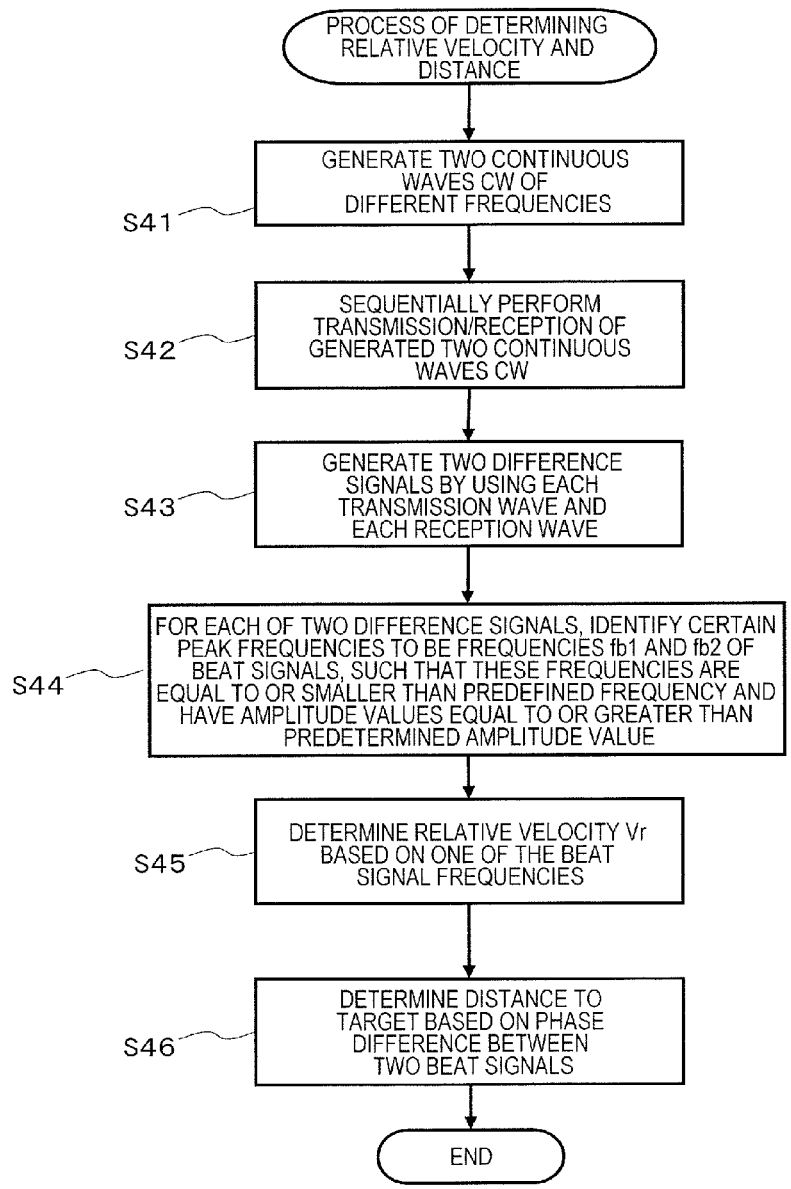

[Fig. 38]
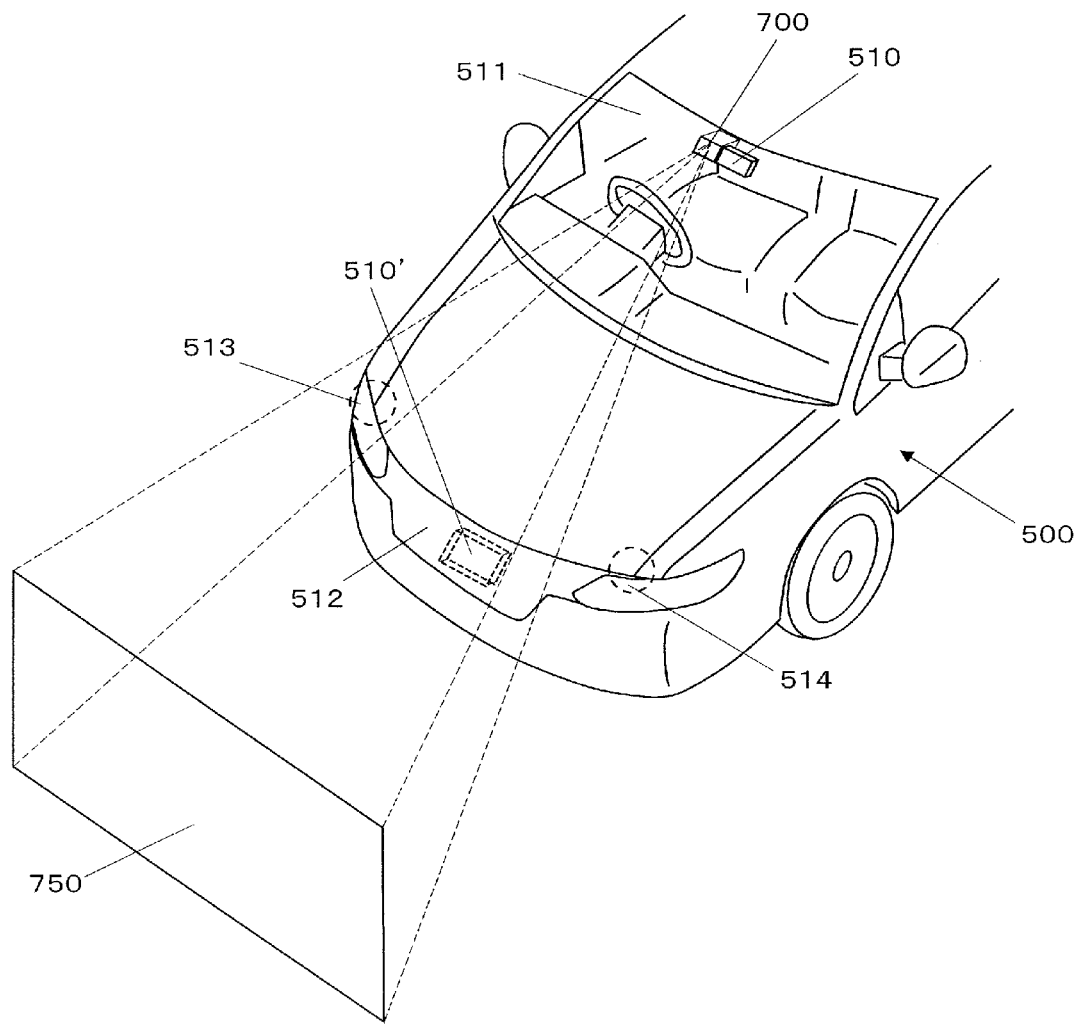
[Fig. 39]
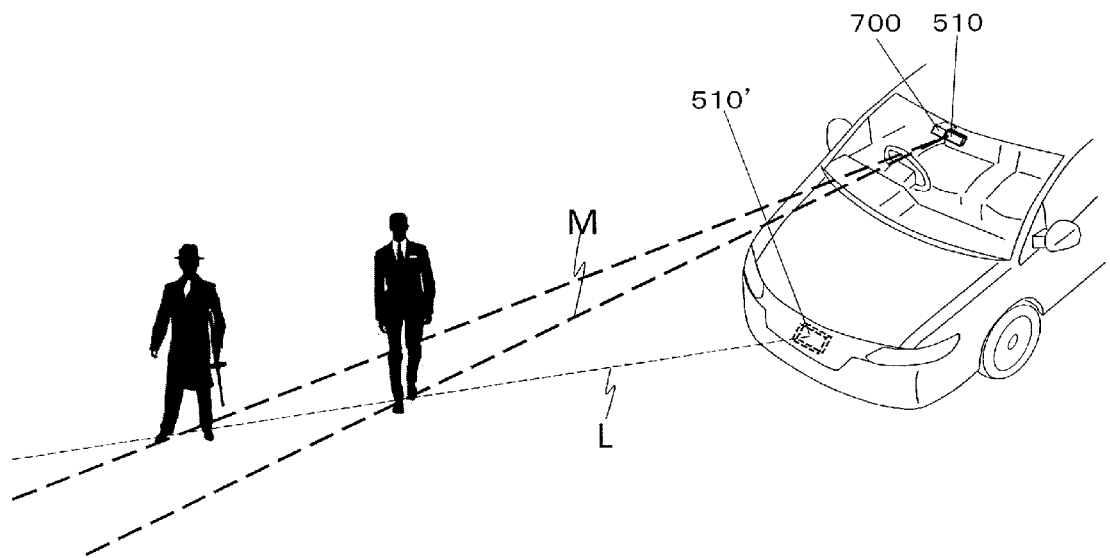

[Fig. 40]
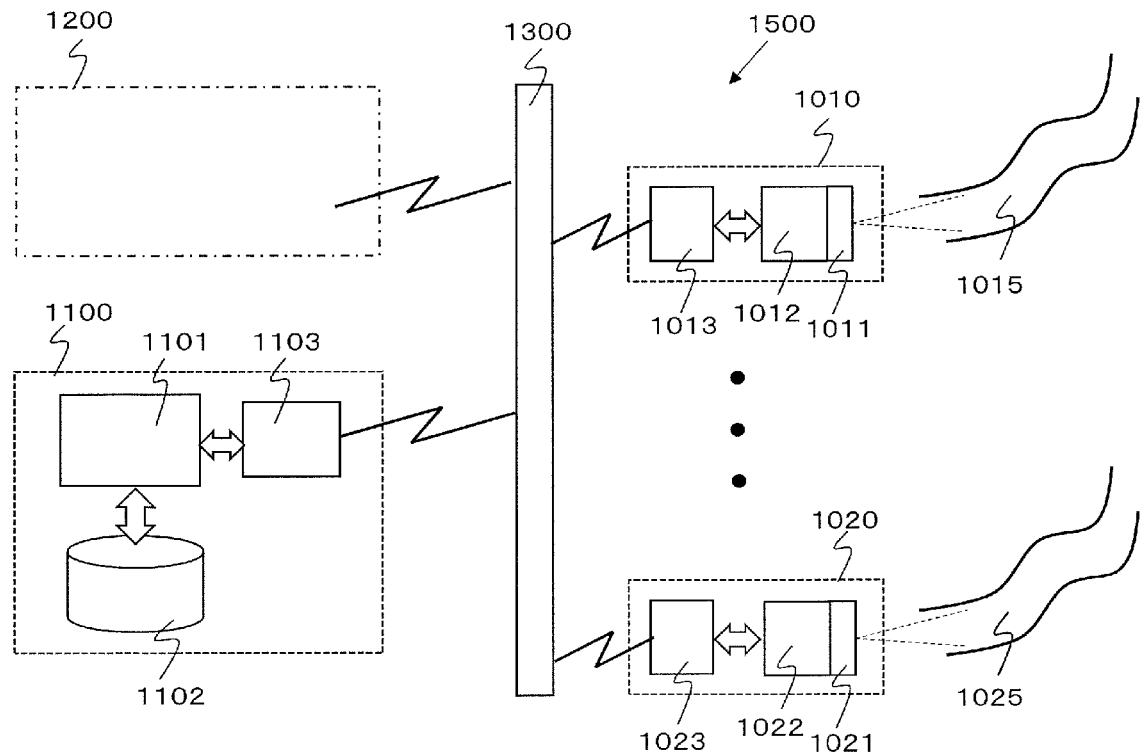
[Fig. 41]
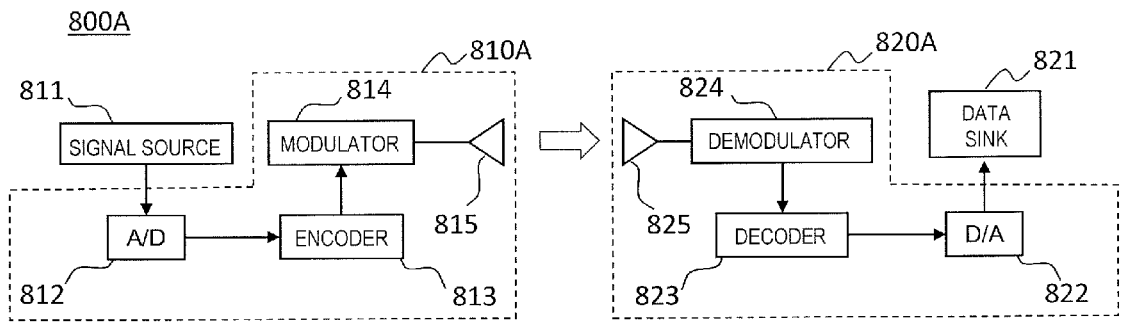
[Fig. 42]
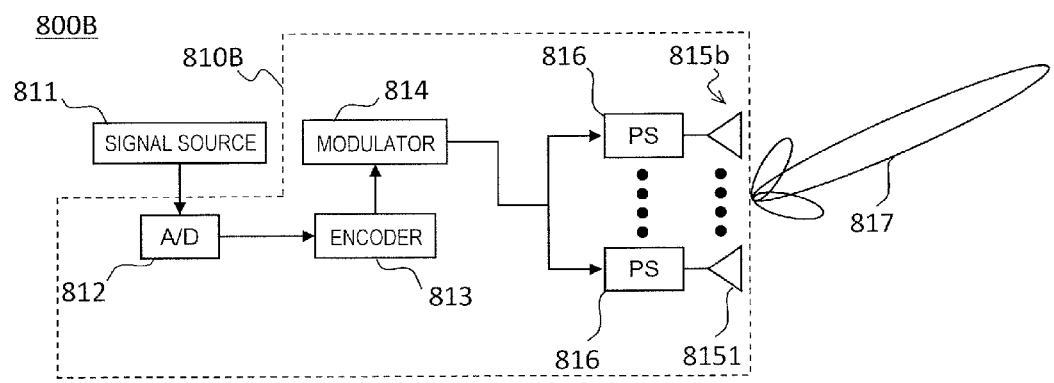

[Fig. 43]
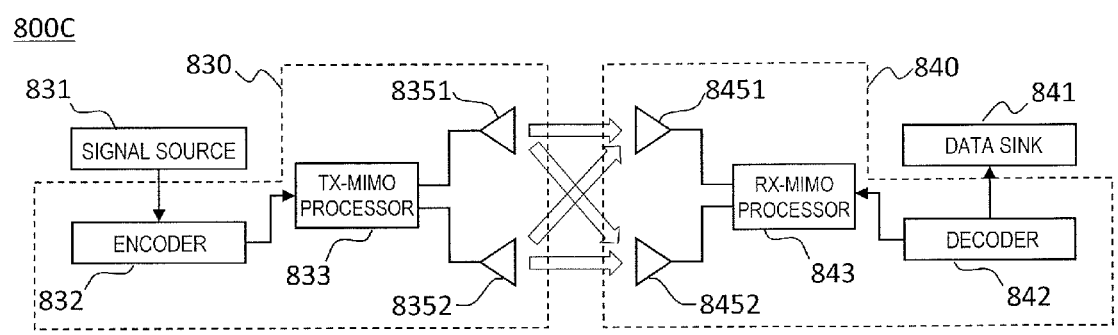

WAVEGUIDE DEVICE, AND ANTENNA DEVICE INCLUDING THE WAVEGUIDE DEVICE

This is a continuation of International Application No. PCT/JP2017/002769, with an international filing date of Jan. 26, 2017, which claims priority of Japanese Patent Application No. 2016-015329 filed Jan. 29, 2016, the entire contents of which are hereby incorporated by reference.

BACKGROUND

1. Technical Field

The present disclosure relates to a waveguide device, and an antenna device including the waveguide device.

2. Description of the Related Art

Examples of waveguiding structures including an artificial magnetic conductor are disclosed in Patent Documents 1 to 3 and Non-Patent Documents 1 and 2. An artificial magnetic conductor is a structure which artificially realizes the properties of a perfect magnetic conductor (PMC), which does not exist in nature. One property of a perfect magnetic conductor is that "a magnetic field on its surface has zero tangential component". This property is the opposite of the property of a perfect electric conductor (PEC), i.e., "an electric field on its surface has zero tangential component". Although no perfect magnetic conductor exists in nature, it can be embodied by an artificial structure, e.g., an array of a plurality of electrically conductive rods. An artificial magnetic conductor functions as a perfect magnetic conductor in a specific frequency band which is defined by its structure. An artificial magnetic conductor restrains or prevents an electromagnetic wave of any frequency that is contained in the specific frequency band (propagation-restricted band) from propagating along the surface of the artificial magnetic conductor. For this reason, the surface of an artificial magnetic conductor may be referred to as a high impedance surface.

In the waveguide devices disclosed in Patent Documents 1 to 3 and Non-Patent Documents 1 and 2, an artificial magnetic conductor is realized by a plurality of electrically conductive rods which are arrayed along row and column directions. Such rods may also be referred to as posts or pins. Each of these waveguide devices includes, as a whole, a pair of opposing electrically conductive plates. One conductive plate has a ridge protruding toward the other conductive plate, and stretches of an artificial magnetic conductor extending on both sides of the ridge. An upper face (i.e., its electrically conductive face) of the ridge opposes, via a gap, a conductive surface of the other conductive plate. An electromagnetic wave of a wavelength which is contained in the propagation-restricted band of the artificial magnetic conductor propagates along the ridge, in the space (gap) between this conductive surface and the upper face of the ridge.

Patent Document 1: International Publication No. 2010/050122

Patent Document 2: the specification of U.S. Pat. No. 8,803,638

Patent Document 3: the specification of European Patent Application Publication No. 1331688

Non-Patent Document 1: H. Kirino and K. Ogawa, "A 76 GHz Multi-Layered Phased Array Antenna using a Non-Metal Contact Metamaterial Waveguide", IEEE Transaction on Antenna and Propagation, Vol. 60, No. 2, pp. 840-853, February, 2012

Non-Patent Document 2: A. Uz. Zaman and P.-S. Kildal, "Ku Band Linear Slot-Array in Ridge Gapwaveguide Technology, EUCAP 2013, 7th European Conference on Antenna and Propagation

SUMMARY

In accordance with the waveguide structures disclosed in Patent Documents 1 to 3 and Non-Patent Documents 1 and 2, antenna devices can be realized which are smaller in size than in the case of adopting a conventional hollow waveguide. However, as the antenna device becomes smaller, it becomes more difficult to construct a feeding network for feeding power to each antenna element.

An embodiment of the present disclosure provides a waveguide device having a novel feeding structure that is suitable for a small-sized antenna device.

A waveguide device according to an implementation of the present disclosure is for use in propagating an electromagnetic wave of a band having a shortest wavelength $\lambda m$ in free space, the waveguide device comprising: a first electrically conductive member having an electrically conductive surface and a first throughhole; a second electrically conductive member including a plurality of electrically conductive rods each having a leading end opposing the electrically conductive surface, the second electrically conductive member having a second throughhole which overlaps the first throughhole as viewed along an axial direction of the first throughhole; and an electrically-conductive waveguiding wall at least partially surrounding a space between the first throughhole and the second throughhole and being surrounded by the plurality of electrically conductive rods, the waveguiding wall allowing the electromagnetic wave to propagate between the first throughhole and the second throughhole. The height of the waveguiding wall is less than $\lambda m/2$. The distance between the electrically conductive rod among the plurality of electrically conductive rods that is adjacent to the waveguiding wall and the outer periphery of the waveguiding wall is less than $\lambda m/2$.

According to an embodiment of the present disclosure, an electromagnetic wave is allowed to propagate through at least one waveguide layer, via the waveguiding wall. In a layer above or below this waveguide layer, another waveguide layer or an excitation layer may be provided. Since unwanted propagation can be suppressed in an intermediate layer (s), the waveguide device has improved design freedom.

BRIEF DESCRIPTION OF THE DRAWINGS

FIG. 1 is a perspective view schematically showing a non-limiting example of the fundamental construction of a waveguide device.

FIG. 2A is a diagram schematically showing a construction for a waveguide device 100, in a cross section parallel to the XZ plane.

FIG. 2B is a diagram schematically showing another construction for the waveguide device 100 in FIG. 1, in a cross section parallel to the XZ plane.

FIG. 3 is another perspective view schematically illustrating the construction of the waveguide device 100, illustrated so that the spacing between a first conductive member 110 and a second conductive member 120 is exaggerated.

FIG. 4 is a diagram showing an exemplary range of dimension of each member in the structure shown in FIG. 2A.

FIG. 5A is a diagram schematically showing an electromagnetic wave that propagates in a narrow space, i.e., a gap between a waveguide face 122a of a waveguide member 122 and a conductive surface 110a of the first conductive member 110.

FIG. 5B is a diagram schematically showing a cross section of a hollow waveguide 130.

FIG. 5C is a cross-sectional view showing an implementation in which two waveguide members 122 are provided on the second conductive member 120.

FIG. 5D is a diagram schematically showing a cross section of a waveguide device in which two hollow waveguides 130 are placed side-by-side.

FIG. 6A is a perspective view showing the waveguide structure of a phase shifter which is shown in FIG. 7 of Patent Document 1.

FIG. 6B is a cross-sectional view showing the waveguide structure of a phase shifter which is shown in FIG. 8 of Patent Document 1.

FIG. 7A is a perspective view schematically showing a partial structure of a waveguide device 200 according to Embodiment 1 of the present disclosure.

FIG. 7B is a perspective view illustrating the structure of the first conductive member 210 shown in FIG. 7A on the side opposing the second conductive member 220.

FIG. 7C is a perspective view illustrating the structure of the second conductive member 220 shown in FIG. 7A on the side opposing the first conductive member 210.

FIG. 7D is a diagram schematically showing a cross section of the waveguide device 200 taken parallel to the XZ plane and through the center of the throughhole 211, 221.

FIG. 8A is a cross-sectional view showing another exemplary construction for a waveguiding wall.

FIG. 8B is a cross-sectional view showing still another exemplary construction for a waveguiding wall.

FIG. 8C is a cross-sectional view showing still another exemplary construction for a waveguiding wall.

FIG. 8D is a cross-sectional view showing still another exemplary construction for a waveguiding wall.

FIG. 8E is a cross-sectional view showing still another exemplary construction for a waveguiding wall.

FIG. 9A is a diagram schematically showing an exemplary shape of an X-Y cross section of a second portion 203b of a waveguiding wall.

FIG. 9B is a diagram schematically showing another exemplary shape of an X-Y cross section of the second portion 203b of the waveguiding wall.

FIG. 9C is a diagram schematically showing still another exemplary shape of an X-Y cross section of the second portion 203b of the waveguiding wall.

FIG. 9D is a diagram schematically showing still another exemplary shape of an X-Y cross section of the second portion 203b of the waveguiding wall.

FIG. 10 is a diagram schematically showing an exemplary distribution of electric field intensity that is created in the case where the opening is H-shaped.

FIG. 11 is a diagram showing another exemplary construction for the waveguiding wall.

FIG. 12A is a cross-sectional view showing an example where a third conductive member 230 having a WRG structure is provided below the second conductive member 220.

FIG. 12B is a cross-sectional view showing an example where WRG structures are provided above and below the second conductive member 220.

FIG. 13 is an upper plan view showing the third conductive member 230 as viewed from the positive direction of the Z axis.

FIG. 14 is a cross-sectional view showing an example where a WRG structure is provided above the first conductive member 210.

FIG. 15 is an upper plan view showing the first conductive member 210 in FIG. 14 as viewed from the positive direction of the Z axis.

FIG. 16 is a cross-sectional view showing an exemplary construction in which the constructions of FIG. 12A and FIG. 14 are combined.

FIG. 17 is a cross-sectional view schematically showing an exemplary construction of a waveguide device 200 that allows electromagnetic waves to propagate in a manner of skipping two layers.

FIG. 18 is a cross-sectional view schematically showing an exemplary construction where another waveguide is created in a layer in which a waveguiding wall 203 is provided.

FIG. 19 is an upper plan view showing the second conductive member 220 in the waveguide device 200 of FIG. 18 as viewed from the positive direction of the Z axis.

FIG. 20A is a graph showing frequency dependence of scattering parameters (S parameters) in the waveguiding wall of the waveguide device 200 illustrated in FIGS. 7A through 7D.

FIG. 20B is a graph showing frequency dependence of S parameters in the case where an adjacent port is provided near a waveguiding wall.

FIG. 21A is a diagram showing an example of an antenna device (array antenna) in which a plurality of slots (openings) are arrayed.

FIG. 21B is a cross-sectional view taken along line B-B in FIG. 21A.

FIG. 22A is a diagram showing a planar layout of waveguide members 122U and conductive rods 124U on the first conductive member 210.

FIG. 22B is a diagram showing a planar layout of conductive rods 124M, waveguiding walls 203, and throughholes 221 on the second conductive member 220.

FIG. 22C is a diagram showing a planar layout of a waveguide member 122L and conductive rods 124L on the third conductive member 230.

FIG. 23A is a cross-sectional view showing an exemplary structure where only a waveguide face 122a, defining an upper face of the waveguide member 122, is electrically conductive, while any portion of the waveguide member 122 other than the waveguide face 122a is not electrically conductive.

FIG. 23B is a diagram showing a variant in which the waveguide member 122 is not formed on the conductive member 120.

FIG. 23C is a diagram showing an exemplary structure where the conductive member 120, the waveguide member 122, and each of the plurality of conductive rods 124 are composed of a dielectric surface that is coated with an electrically conductive material such as a metal.

FIG. 23D is a diagram showing an exemplary structure in which dielectric layers 110b and 120b are respectively provided on the outermost surfaces of conductive members 110 and 120, a waveguide member 122, and conductive rods 124.

FIG. 23E is a diagram showing another exemplary structure in which dielectric layers 110b and 120b are respectively provided on the outermost surfaces of conductive members 110 and 120, a waveguide member 122, and conductive rods 124.

FIG. 23F is a diagram showing an example where the height of the waveguide member 122 is lower than the height of the conductive rods 124 and a portion of a conductive surface 110a of the conductive member 110 that opposes the waveguide face 122a protrudes toward the waveguide member 122.

FIG. 23G is a diagram showing an example where, further in the structure of FIG. 23F, portions of the conductive surface 110a that oppose the conductive rods 124 protrude toward the conductive rods 124.

FIG. 24A is a diagram showing an example where a conductive surface 110a of the conductive member 110 is shaped as a curved surface.

FIG. 24B is a diagram showing an example where also a conductive surface 120a of the conductive member 120 is shaped as a curved surface.

FIG. 25 is a diagram showing a driver's vehicle 500, and a preceding vehicle 502 that is traveling in the same lane as the driver's vehicle 500.

FIG. 26 is a diagram showing an onboard radar system 510 of the driver's vehicle 500.

FIG. 27A is a diagram showing a relationship between an array antenna AA of the onboard radar system 510 and plural arriving waves k.

FIG. 27B is a diagram showing the array antenna AA receiving the $k^{th}$ arriving wave.

FIG. 28 is a block diagram showing an exemplary fundamental construction of a vehicle travel controlling apparatus 600 according to the present disclosure.

FIG. 29 is a block diagram showing another exemplary construction for the vehicle travel controlling apparatus 600.

FIG. 30 is a block diagram showing an example of a more specific construction of the vehicle travel controlling apparatus 600.

FIG. 31 is a block diagram showing a more detailed exemplary construction of the radar system 510 according to this Application Example.

FIG. 32 is a diagram showing change in frequency of a transmission signal which is modulated based on the signal that is generated by a triangular wave generation circuit 581.

FIG. 33 is a diagram showing a beat frequency fu in an "ascent" period and a beat frequency fd in a "descent" period.

FIG. 34 is a diagram showing an exemplary implementation in which a signal processing circuit 560 is implemented in hardware including a processor PR and a memory device MD.

FIG. 35 is a diagram showing a relationship between three frequencies f1, f2 and f3.

FIG. 36 is a diagram showing a relationship between synthetic spectra F1 to F3 on a complex plane.

FIG. 37 is a flowchart showing the procedure of a process of determining relative velocity and distance.

FIG. 38 is a diagram concerning a fusion apparatus in which a radar system 510 having a slot array antenna and an onboard camera system 700 are included.

FIG. 39 is a diagram illustrating how placing a millimeter wave radar 510 and an onboard camera system 700 at substantially the same position within the vehicle room may allow them to acquire an identical field of view and line of sight, thus facilitating a matching process.

FIG. 40 is a diagram showing an exemplary construction for a monitoring system 1500 based on millimeter wave radar.

FIG. 41 is a block diagram showing a construction for a digital communication system 800A.

FIG. 42 is a block diagram showing an exemplary communication system 800B including a transmitter 810B which is capable of changing its radio wave radiation pattern.

FIG. 43 is a block diagram showing an exemplary communication system 800C implementing a MIMO function.

DETAILED DESCRIPTION

Prior to describing embodiments of the present disclosure, findings that form the basis of the present disclosure will be described.

A ridge waveguide which is disclosed in each of the aforementioned Patent Document 1 and Non-Patent Document 1 is provided in a waffle iron structure which may function as an artificial magnetic conductor. A ridge waveguide in which such an artificial magnetic conductor is utilized (which hereinafter may be referred to as a WRG: Waffle-iron Ridge waveguide) is able to realize an antenna feeding network with low losses in the microwave or the millimeter wave band.

FIG. 1 is a perspective view schematically showing a non-limiting example of a fundamental construction of such a waveguide device. FIG. 1 shows XYZ coordinates along X, Y and Z directions which are orthogonal to one another. The waveguide device 100 shown in the figure includes a plate-like first conductive member 110 and a plate-like second conductive member 120, which are in opposing and parallel positions to each other. A plurality of conductive rods 124 are arrayed on the second conductive member 120.

Note that any structure appearing in a figure of the present application is shown in an orientation that is selected for ease of explanation, which in no way should limit its orientation when an embodiment of the present disclosure is actually practiced. Moreover, the shape and size of a whole or a part of any structure that is shown in a figure should not limit its actual shape and size.

FIG. 2A is a diagram schematically showing the construction of a cross section of the waveguide device 100 in FIG. 1, taken parallel to the XZ plane. As shown in FIG. 2A, the first conductive member 110 has a conductive surface 110a on the side facing the second conductive member 120. The conductive surface 110a has a two-dimensional expanse along a plane which is orthogonal to the axial direction (Z direction) of the conductive rods 124 (i.e., a plane which is parallel to the XY plane). Although the conductive surface 110a is shown to be a smooth plane in this example, the conductive surface 110a does not need to be a plane, as will be described later.

FIG. 3 is a perspective view schematically showing the waveguide device 100, illustrated so that the spacing between the first conductive member 110 and the second conductive member 120 is exaggerated for ease of understanding. In an actual waveguide device 100, as shown in FIG. 1 and FIG. 2A, the spacing between the first conductive member 110 and the second conductive member 120 is narrow, with the first conductive member 110 covering over all of the conductive rods 124 on the second conductive member 120.

See FIG. 2A again. The plurality of conductive rods 124 arrayed on the second conductive member 120 each have a leading end 124a opposing the conductive surface 110a. In the example shown in the figure, the leading ends 124a of the plurality of conductive rods 124 are on the same plane. This plane defines the surface 125 of an artificial magnetic conductor. Each conductive rod 124 does not need to be entirely electrically conductive, so long as it at least includes an electrically conductive layer that extends along the upper face and the side face of the rod-like structure. Although this electrically conductive layer may be located at the surface layer of the rod-like structure, the surface layer may be composed of an insulation coating or a resin layer with no electrically conductive layer existing on the surface of the rod-like structure. Moreover, each second conductive member 120 does not need to be entirely electrically conductive, so long as it can support the plurality of conductive rods 124 to constitute an artificial magnetic conductor. Of the surfaces of the second conductive member 120, a face 120a carrying the plurality of conductive rods 124 may be electrically conductive, such that the electrical conductor electrically interconnects the surfaces of adjacent ones of the plurality of conductive rods 124. Moreover, the electrically conductive layer of the second conductive member 120 may be covered with an insulation coating or a resin layer. In other words, the entire combination of the second conductive member 120 and the plurality of conductive rods 124 may at least present an electrically conductive layer with rises and falls opposing the conductive surface 110a of the first conductive member 110.

On the second conductive member 120, a ridge-like waveguide member 122 is provided among the plurality of conductive rods 124. More specifically, stretches of an artificial magnetic conductor are present on both sides of the waveguide member 122, such that the waveguide member 122 is sandwiched between the stretches of artificial magnetic conductor on both sides. As can be seen from FIG. 3, the waveguide member 122 in this example is supported on the second conductive member 120, and extends linearly along the Y direction. In the example shown in the figure, the waveguide member 122 has the same height and width as those of the conductive rods 124. As will be described later, however, the height and width of the waveguide member 122 may have different values from those of the conductive rod 124. Unlike the conductive rods 124, the waveguide member 122 extends along a direction (which in this example is the Y direction) in which to guide electromagnetic waves along the conductive surface 110a. Similarly, the waveguide member 122 does not need to be entirely electrically conductive, but may at least include an electrically conductive waveguide face 122a opposing the conductive surface 110a of the first conductive member 110. The second conductive member 120, the plurality of conductive rods 124, and the waveguide member 122 may be portions of a continuous single-piece body. Furthermore, the first conductive member 110 may also be a portion of such a single-piece body.

On both sides of the waveguide member 122, the space between the surface 125 of each stretch of artificial magnetic conductor and the conductive surface 110a of the first conductive member 110 does not allow an electromagnetic wave of any frequency that is within a specific frequency band to propagate. This frequency band is called a "prohibited band". The artificial magnetic conductor is designed so that the frequency of an electromagnetic wave (which hereinafter may be referred to as a signal wave) to propagate in the waveguide device 100 (which may hereinafter be referred to as the "operating frequency") is contained in the prohibited band. The prohibited band may be adjusted based on the following: the height of the conductive rods 124, i.e., the depth of each groove formed between adjacent conductive rods 124; the width of each conductive rod 124; the interval between conductive rods 124; and the size of the gap between the leading end 124a and the conductive surface 110a of each conductive rod 124.

Next, with reference to FIG. 4, the dimensions, shape, positioning, and the like of each member will be described.

FIG. 4 is a diagram showing an exemplary range of dimension of each member in the structure shown in FIG. 2A. In the present specification, $\lambda o$ denotes a representative value of wavelengths in free space (e.g., a central wavelength corresponding to a center frequency in the operating frequency band) of an electromagnetic wave (signal wave) propagating in a waveguide extending between the conductive surface 110a of the first conductive member 110 and the waveguide face 122a of the waveguide member 122. Moreover, $\lambda m$ denotes a wavelength, in free space, of an electromagnetic wave of the highest frequency in the operating frequency band. The end of each conductive rod 124 that is in contact with the second conductive member 120 is referred to as the "root". As shown in FIG. 4, each conductive rod 124 has the leading end 124a and the root 124b. Examples of dimensions, shapes, positioning, and the like of the respective members are as follows.

(1) Width of the Conductive Rod

The width (i.e., the size along the X direction and the Y direction) of the conductive rod 124 may be set to less than $\lambda m/2$. Within this range, resonance of the lowest order can be prevented from occurring along the X direction and the Y direction. Since resonance may possibly occur not only in the X and Y directions but also in any diagonal direction in an X-Y cross section, the diagonal length of an X-Y cross section of the conductive rod 124 is also preferably less than $\lambda m/2$. The lower limit values for the rod width and diagonal length will conform to the minimum lengths that are producible under the given manufacturing method, but is not particularly limited.

(2) Distance from the Root of the Conductive Rod to the Conductive Surface of the First Conductive Member The distance from the root 124b of each conductive rod 124 to the conductive surface 110a of the first conductive member 110 may be longer than the height of the conductive rods 124, while also being less than $\lambda m/2$. When the distance is $\lambda m/2$ or more, resonance may occur between the root 124b of each conductive rod 124 and the conductive surface 110a, thus reducing the effect of signal wave containment.

The distance from the root 124b of each conductive rod 124 to the conductive surface 110a of the first conductive member 110 corresponds to the spacing between the first conductive member 110 and the second conductive member 120. For example, when a signal wave of 76.5±0.5 GHz (which belongs to the millimeter band or the extremely high frequency band) propagates in the waveguide, the wavelength of the signal wave is in the range from 3.8923 mm to 3.9435 mm. Therefore, $\lambda m$ equals 3.8923 mm in this case, so that the spacing between the first conductive member 110 and the second conductive member 120 may be set to less than a half of 3.8923 mm. So long as the first conductive member 110 and the second conductive member 120 realize such a narrow spacing while being disposed opposite from each other, the first conductive member 110 and the second conductive member 120 do not need to be strictly parallel. Moreover, when the spacing between the first conductive member 110 and the second conductive member 120 is less than $\lambda m/2$, a whole or a part of the first conductive member 110 and/or the second conductive member 120 may be shaped as a curved surface. On the other hand, the first and second conductive members 110 and 120 each have a planar shape (i.e., the shape of their region as perpendicularly projected onto the XY plane) and a planar size (i.e., the size of their region as perpendicularly projected onto the XY plane) which may be arbitrarily designed depending on the purpose.

Although the conductive surface 120a is illustrated as a plane in the example shown in FIG. 2A, embodiments of the present disclosure are not limited thereto. For example, as shown in FIG. 2B, the conductive surface 120a may be the bottom parts of faces each of which has a cross section similar to a U-shape or a V-shape. The conductive surface 120a will have such a structure when each conductive rod 124 or the waveguide member 122 is shaped with a width which increases toward the root. Even with such a structure, the device shown in FIG. 2B can function as the waveguide device according to an embodiment of the present disclosure so long as the distance between the conductive surface 110a and the conductive surface 120a is less than a half of the wavelength $\lambda m$.

(3) Distance L2 from the Leading End of the Conductive Rod to the Conductive Surface The distance L2 from the leading end 124a of each conductive rod 124 to the conductive surface 110a is set to less than $\lambda m/2$. When the distance is $\lambda m/2$ or more, a propagation mode that reciprocates between the leading end 124a of each conductive rod 124 and the conductive surface 110a may occur, thus no longer being able to contain an electromagnetic wave. Note that, among the plurality of conductive rods 124, at least those which are adjacent to the waveguide member 122 do not have their leading ends in electrical contact with the conductive surface 110a. As used herein, the leading end of a conductive rod not being in electrical contact with the conductive surface means either of the following states: there being an air gap between the leading end and the conductive surface; or the leading end of the conductive rod and the conductive surface adjoining each other via an insulating layer which may exist in the leading end of the conductive rod or in the conductive surface.

(4) Arrangement and Shape of Conductive Rods

The interspace between two adjacent conductive rods 124 among the plurality of conductive rods 124 has a width of less than $\lambda m/2$, for example. The width of the interspace between any two adjacent conductive rods 124 is defined by the shortest distance from the surface (side face) of one of the two conductive rods 124 to the surface (side face) of the other. This width of the interspace between rods is to be determined so that resonance of the lowest order will not occur in the regions between rods. The conditions under which resonance will occur are determined based by a combination of: the height of the conductive rods 124; the distance between any two adjacent conductive rods; and the capacitance of the air gap between the leading end 124a of each conductive rod 124 and the conductive surface 110a. Therefore, the width of the interspace between rods may be appropriately determined depending on other design parameters. Although there is no clear lower limit to the width of the interspace between rods, for manufacturing ease, it may be e.g. $\lambda m/16$ or more when an electromagnetic wave in the extremely high frequency range is to be propagated. Note that the interspace does not need to have a constant width. So long as it remains less than $\lambda m/2$, the interspace between conductive rods 124 may vary.

The arrangement of the plurality of conductive rods 124 is not limited to the illustrated example, so long as it exhibits a function of an artificial magnetic conductor. The plurality of conductive rods 124 do not need to be arranged in orthogonal rows and columns; the rows and columns may be intersecting at angles other than 90 degrees. The plurality of conductive rods 124 do not need to form a linear array along rows or columns, but may be in a dispersed arrangement which does not present any straightforward regularity. The conductive rods 124 may also vary in shape and size depending on the position on the second conductive member 120.

The surface 125 of the artificial magnetic conductor that are constituted by the leading ends 124a of the plurality of conductive rods 124 does not need to be a strict plane, but may be a plane with minute rises and falls, or even a curved surface. In other words, the conductive rods 124 do not need to be of uniform height, but rather the conductive rods 124 may be diverse so long as the array of conductive rods 124 is able to function as an artificial magnetic conductor.

Each conductive rod 124 does not need to have a prismatic shape as shown in the figure, but may have a cylindrical shape, for example. Furthermore, each conductive rod 124 does not need to have a simple columnar shape. The artificial magnetic conductor may also be realized by any structure other than an array of conductive rods 124, and various artificial magnetic conductors are applicable to the waveguide device of the present disclosure. Note that, when the leading end 124a of each conductive rod 124 has a prismatic shape, its diagonal length is preferably less than $\lambda m/2$. When the leading end 124a of each conductive rod 124 is shaped as an ellipse, the length of its major axis is preferably less than $\lambda m/2$. Even when the leading end 124a has any other shape, the dimension across it is preferably less than $\lambda m/2$ even at the longest position.

The height of each conductive rod 124, i.e., the length from the root 124b to the leading end 124a, may be set to a value which is shorter than the distance (i.e., less than $\lambda m/2$) between the conductive surface 110a and the conductive surface 120a, e.g., $\lambda o/4$.

(5) Width of the Waveguide Face

The width of the waveguide face 122a of the waveguide member 122, i.e., the size of the waveguide face 122a along a direction which is orthogonal to the direction that the waveguide member 122 extends, may be set to less than $\lambda m/2$ (e.g. $\lambda o/8$). If the width of the waveguide face 122a is $\lambda m/2$ or more, resonance will occur along the width direction, which will prevent any WRG from operating as a simple transmission line.

(6) Height of the Waveguide Member

The height (i.e., the size along the Z direction in the example shown in the figure) of the waveguide member 122 is set to less than $\lambda m/2$. The reason is that, if the distance is $\lambda m/2$ or more, the distance between the root 124b of each conductive rod 124 and the conductive surface 110a will be $\lambda m/2$ or more. Similarly, the height of the conductive rods 124 (especially those conductive rods 124 which are adjacent to the waveguide member 122) is set to less than $\lambda m/2$.

(7) Distance L1 between the Waveguide Face and the Conductive Surface

The distance L1 between the waveguide face 122a of the waveguide member 122 and the conductive surface 110a is set to less than $\lambda m/2$. If the distance is $\lambda m/2$ or more, resonance will occur between the waveguide face 122a and the conductive surface 110a, which will prevent functionality as a waveguide. In one example, the distance is $\lambda m/4$ or less. In order to ensure manufacturing ease, when an electromagnetic wave in the extremely high frequency range is to propagate, the distance L1 is preferably $\lambda m/16$ or more, for example.

The lower limit of the distance L1 between the conductive surface 110a and the waveguide face 122a and the lower limit of the distance L2 between the conductive surface 110a and the leading end 124a of each conductive rod 124 depends on the machining precision, and also on the precision when assembling the two upper/lower conductive members 110 and 120 so as to be apart by a constant distance. When a pressing technique or an injection technique is used, the practical lower limit of the aforementioned distance is about 50 micrometers (μm). In the case of using an MEMS (Micro-Electro-Mechanical System) technique to make a product in e.g. the terahertz range, the lower limit of the aforementioned distance is about 2 to about 3 μm.

In the waveguide device 100 of the above-described construction, a signal wave of the operating frequency is unable to propagate in the space between the surface 125 of the artificial magnetic conductor and the conductive surface 110a of the first conductive member 110, but propagates in the space between the waveguide face 122a of the waveguide member 122 and the conductive surface 110a of the first conductive member 110. Unlike in a hollow waveguide, the width of the waveguide member 122 in such a waveguide structure does not need to be equal to or greater than a half of the wavelength of the electromagnetic wave to propagate. Moreover, the first conductive member 110 and the second conductive member 120 do not need to be interconnected by a metal wall that extends along the thickness direction (i.e., in parallel to the YZ plane).

FIG. 5A schematically shows an electromagnetic wave that propagates in a narrow space, i.e., a gap between the waveguide face 122a of the waveguide member 122 and the conductive surface 110a of the first conductive member 110. Three arrows in FIG. 5A schematically indicate the orientation of an electric field of the propagating electromagnetic wave. The electric field of the propagating electromagnetic wave is perpendicular to the conductive surface 110a of the first conductive member 110 and to the waveguide face 122a.

On both sides of the waveguide member 122, stretches of artificial magnetic conductor that are created by the plurality of conductive rods 124 are present. An electromagnetic wave propagates in the gap between the waveguide face 122a of the waveguide member 122 and the conductive surface 110a of the first conductive member 110. FIG. 5A is schematic, and does not accurately represent the magnitude of an electromagnetic field to be actually created by the electromagnetic wave. A part of the electromagnetic wave (electromagnetic field) propagating in the space over the waveguide face 122a may have a lateral expanse, to the outside (i.e., toward where the artificial magnetic conductor exists) of the space that is delineated by the width of the waveguide face 122a. In this example, the electromagnetic wave propagates in a direction (Y direction) which is perpendicular to the plane of FIG. 5A. As such, the waveguide member 122 does not need to extend linearly along the Y direction, but may include a bend(s) and/or a branching portion(s) not shown. Since the electromagnetic wave propagates along the waveguide face 122a of the waveguide member 122, the direction of propagation would change at a bend, whereas the direction of propagation would ramify into plural directions at a branching portion.

In the waveguide structure of FIG. 5A, no metal wall (electric wall), which would be indispensable to a hollow waveguide, exists on both sides of the propagating electromagnetic wave. Therefore, in the waveguide structure of this example, "a constraint due to a metal wall (electric wall)" is not included in the boundary conditions for the electromagnetic field mode to be created by the propagating electromagnetic wave, and the width (size along the X direction) of the waveguide face 122a is less than a half of the wavelength of the electromagnetic wave.

For reference, FIG. 5B schematically shows a cross section of a hollow waveguide 130. With arrows, FIG. 5B schematically shows the orientation of an electric field of an electromagnetic field mode ($TE_{10}$) that is created in the internal space 132 of the hollow waveguide 130. The lengths of the arrows correspond to electric field intensities. The width of the internal space 132 of the hollow waveguide 130 needs to be set to be broader than a half of the wavelength. In other words, the width of the internal space 132 of the hollow waveguide 130 cannot be set to be smaller than a half of the wavelength of the propagating electromagnetic wave.

FIG. 5C is a cross-sectional view showing an implementation where two waveguide members 122 are provided on the second conductive member 120. Thus, an artificial magnetic conductor that is created by the plurality of conductive rods 124 exists between the two adjacent waveguide members 122. More accurately, stretches of artificial magnetic conductor created by the plurality of conductive rods 124 are present on both sides of each waveguide member 122, such that each waveguide member 122 is able to independently propagate an electromagnetic wave.

For reference's sake, FIG. 5D schematically shows a cross section of a waveguide device in which two hollow waveguides 130 are placed side-by-side. The two hollow waveguides 130 are electrically insulated from each other. Each space in which an electromagnetic wave is to propagate needs to be surrounded by a metal wall that defines the respective hollow waveguide 130. Therefore, the interval between the internal spaces 132 in which electromagnetic waves are to propagate cannot be made smaller than a total of the thicknesses of two metal walls. Usually, a total of the thicknesses of two metal walls is longer than a half of the wavelength of a propagating electromagnetic wave. Therefore, it is difficult for the interval between the hollow waveguides 130 (i.e., interval between their centers) to be shorter than the wavelength of a propagating electromagnetic wave. Particularly for electromagnetic waves of wavelengths in the extremely high frequency range (i.e., electromagnetic wave wavelength: 10 mm or less) or even shorter wavelengths, a metal wall which is sufficiently thin relative to the wavelength is difficult to be formed. This presents a cost problem in commercially practical implementation.

On the other hand, a waveguide device 100 including an artificial magnetic conductor can easily realize a structure in which waveguide members 122 are placed close to one another. Thus, such a waveguide device 100 can be suitably used in an array antenna that includes plural antenna elements in a close arrangement.

When constructing a small-sized array antenna by using the aforementioned WRG structure, it is important to consider how each antenna element is to be fed. The area of the face on which the antenna elements are provided is to be determined based on the location of installation and on the required antenna characteristics. As the area of the face on which the antenna elements are provided is decreased due to constraints associated with the location of installation and the like, it becomes difficult to achieve the needed feeding for each antenna element via the waveguide.

In order to achieve desired feeding to each antenna element within a limited space, a one-dimensional ridge waveguide as shown in FIG. 3 or any two-dimensional ridge waveguide would be insufficient, and it will be necessary to construct a three-dimensional (i.e., multiple levels of) network of feeding paths. In doing so, it is important how the waveguides in different layers are to be interconnected. In the present specification, a "layer" means a laminar space which is interposed between two opposing conductive members that contains a region in which electromagnetic waves can propagate. For example, the space between the first conductive member 110 and the second conductive member 120 shown in FIG. 3 corresponds to one "layer".

Patent Document 1 discloses a phase shifter having a multilayered waveguide structure. This structure will be described, while relying on figures that are disclosed in Patent Document 1 for reference's sake.

FIG. 6A is a perspective view showing the waveguide structure of a phase shifter which is shown in FIG. 7 of Patent Document 1. This phase shifter includes an upper conductor 23 having a throughhole 27b and a lower conductor 22 having a throughhole 27a. The lower conductor 22 includes a ridge 25 extending along the Z direction, and a plurality of columnar projections (rods) 24 around it. The throughhole 27b and the throughhole 27a are provided at positions which are apart along the Z direction.

FIG. 6B is a cross-sectional view showing the waveguide structure of a phase shifter which is shown in FIG. 8 of Patent Document 1. This phase shifter has a structure that combines two phase shifters as shown in FIG. 6A. FIG. 6B shows a cross section of a structure in which the conductors 22a and 22b of two phase shifters are placed back-to-back, as taken along the ridges 25a and 25b. In this phase shifter, electromagnetic waves propagate along a path A-A shown in the figure, via throughholes 27ba, 27aa, 27ab and 27bb. As the conductors 22a and 22b are slid in the directions of arrowheads 30 in the figure, an electromagnetic wave passing through the throughholes 27ba, 27aa, 27ab and 27bb undergoes changes in phase. Thus, this can operate as a variable phase shifter.

In the construction shown in FIG. 6A and FIG. 6B, a ridge waveguide of the upper layer and a ridge waveguide of the lower layer are interconnected via the throughholes. Near each throughhole, a choke structure 28 or 29 that includes a tip of a ridge and a plurality of grooves is provided. As a result, radio frequency energy losses are suppressed, and electromagnetic waves can be transmitted efficiently between the different layers via the throughholes.

With the above construction, a three-dimensional network of feeding paths can be realized. On the other hand, in some applications it may be necessary to achieve feeding in a manner of skipping one or more layers. For example, when another ridge waveguide, or a camera or other structures need to be provided in a middle layer, feeding must be achieved beyond that layer. Such a construction may be adopted, for example, in the case where a feeding path connecting to transmission antenna elements and a feeding path connecting to reception antenna elements are to be provided separately; in the case where a radar system utilizing cameras is to be constructed; and so on. There has been no known structure that allows electromagnetic waves to be transmitted in a manner of skipping an intermediate layer(s) in such a case.

An embodiment of the present disclosure provides a novel waveguide structure which allows an electromagnetic wave to be propagated across three or more layers.

Hereinafter, more specific exemplary constructions for waveguide devices according to embodiments of the present disclosure will be described. Note however that unnecessarily detailed descriptions may be omitted. For example, detailed descriptions on what is well known in the art or redundant descriptions on what is substantially the same constitution may be omitted. This is to avoid lengthy description, and facilitate the understanding of those skilled in the art. The accompanying drawings and the following description, which are provided by the inventors so that those skilled in the art can sufficiently understand the present disclosure, are not intended to limit the scope of claims.

Embodiment 1: Waveguide Device

FIG. 7A is a perspective view schematically showing a portion of a waveguide device 200 according to an illustrative embodiment of the present disclosure. The waveguide device 200 includes a first conductive member 210 and a second conductive member 220. The first conductive member 210 and the second conductive member 220 are fixed to each other at a peripheral portion not shown, so as to oppose each other via a gap. FIG. 7A shows XYZ coordinates along X, Y and Z directions which are orthogonal to one another. The first conductive member 210 and the second conductive member 220 extend along the XY plane. Around the portion shown in FIG. 7A, the waveguide device 200 may have a WRG structure similar to that of the waveguide device 100 described with reference to FIG. 1 through FIG. 4. With such a structure, for example, one of the transmission wave and the reception wave may be allowed to propagate along the vertical direction (the Z axis direction) via the throughhole 211 in the first conductive member 210, while the other is allowed to propagate via the WRG structure in the peripheral portion. The electromagnetic wave which has propagated along the vertical direction via the throughhole 211 in the first conductive member 210 may further be propagated by the WRG structure in the other layer, as will be described later.

FIG. 7B is a perspective view illustrating the structure of the first conductive member 210 shown in FIG. 7A on the side opposing the second conductive member 220. The first conductive member 210 includes a protrusion 203a around the first throughhole 211. The first conductive member 210, the inner wall of the first throughhole 211, and the protrusion 203a all have an electrically conductive surface.

FIG. 7C is a perspective view illustrating the structure of the second conductive member 220 shown in FIG. 7A on the side opposing the first conductive member 210. The second conductive member 220 includes a second throughhole 221, a protrusion 203b around the second throughhole 221, and a plurality of conductive rods 124 surrounding the protrusion 203b. The plurality of conductive rods 124 are arranged in a matrix array along the X direction and the Y direction. Note that the plurality of conductive rods 124 do not need to form a linear array along rows or columns, but may be in a dispersed arrangement which does not present any straightforward regularity. The inner wall of the throughhole 221, the protrusion 203b, and the plurality of conductive rods 124 all have an electrically conductive surface.

FIG. 7D is a diagram schematically showing a cross section of the waveguide device 200 taken parallel to the XZ plane and through the center of the throughhole 211, 221. In FIG. 7D and any subsequent cross-sectional view, only the protrusions 203a and 203b are shown hatched for emphasis. Note that the protrusions 203a and 203b, the plurality of conductive rods 124, the first conductive member 210, and the second conductive member 220 may be composed of discrete parts, or together constitute a single interconnected part. In the case where these constituent elements are interconnected to constitute a single part, there will be no clear boundaries between constituent elements; however, for ease of understanding, boundaries between constituent elements are nonetheless indicated with lines in FIG. 7D and in subsequent figures.

As shown in FIG. 7D, a top surface 203*at* of the protrusion 203*a* of the first conductive member 210 and a top surface 203*bt* of the protrusion 203*b* of the second conductive member 220 oppose each other, with a gap therebetween. The protrusions 203*a* and 203*b* function as a waveguiding wall for allowing electromagnetic waves to propagate inside. Therefore, in the present specification, the protrusions 203*a* and 203*b* may be collectively referred to as the "waveguiding wall 203". Hereinafter, the protrusion 203*a* of the first conductive member 210 will be referred to as a "first portion" of the waveguiding wall, and the protrusion 203*b* of the second conductive member 220 as a "second portion" of the waveguiding wall.

The first throughhole 211 extends through the first conductive member 210 along an axis 211*a*. The axis 211*a* will be referred to as the "axis of the first throughhole". The second throughhole 221 extends through the second conductive member 220 along an axis 221*a*. The axis 221*a* will be referred to as "the axis of the second throughhole". The second throughhole 221 is located so as to have an overlap with the first throughhole 211, as viewed along the axial direction of the first throughhole 211. As used herein, an "overlap" is inclusive of not only a complete overlap, but also any partial overlap. In other words, when the first throughhole 211 is viewed in the direction of the axis 211*a* from the side where the second conductive member 220 is not provided, the first throughhole 211 and the second throughhole 221 at least partially overlap. In the present embodiment, the conductive surface 210*a* of the first conductive member 210 is planar. The first throughhole 211 extends through the first conductive member 210, perpendicularly to the conductive surface 210*a*. The second throughhole 221 extends through the second conductive member 220, along the axial direction of the first throughhole 211. In other words, the axis 211*a* of the first throughhole 211 and the axis 221*a* of the second throughhole 221 coincide. However, without being limited to such a construction, the axes 211*a* and 221*a* may be slightly offset. Moreover, the directions of the axes 211*a* and 221*a* may be somewhat inclined with respect to the Z axis.

In the present embodiment, the first throughhole 211, the first portion 203*a* and the second portion 203*b* of the waveguiding wall, and the inner wall of the second throughhole 221 each have an X-Y cross-sectional shape which is invariable irrespective of position along the Z direction. However, without being limited to such an implementation, a throughhole or a waveguiding wall whose X-Y cross-sectional shape varies at different positions along the Z direction may instead be adopted.

Similarly to any other member, the waveguiding wall (the first portion 203*a* and second portion 203*b*) does not need to be electrically conductive in its entirety, so long as at least the surface thereof is composed of an electrically conductive material. So long as the waveguiding wall surrounds at least a portion of the space between the first throughhole 211 and the second throughhole 221, it does not need to entirely surround this space. The waveguiding wall allows electromagnetic waves to be propagated between the first throughhole 211 and the second throughhole 221.

The waveguide device 200 is used to propagate electromagnetic waves of a band having a central wavelength $\lambda$o and a shortest wavelength $\lambda$m in free space. The wavelength $\lambda$o may be, for example, a wavelength in the millimeter wave band (equal to or greater than 1 mm and less than 10 cm), and is about 4 mm in the present embodiment. A total of the height of the first portion 203*a* and the height of the second portion 203*b* of the waveguiding wall and the length of the gap therebetween is less than $\lambda$m/2. As used herein, the "height of the first portion 203*a*" means the distance from the root (i.e., the portion connecting to the first conductive member 210) to the top surface 203*at* of the first portion 203*a*. The "height of the second portion 203*b*" means the distance from the root (i.e., the portion connecting to the second conductive member 220) to the top surface 203*bt* of the second portion 203*b*. The "length of the gap" means the length of the gap between the first portion 203*a* and the second portion 203*b*, along the Z direction. When the waveguiding wall is divided into the first portion 203*a* and the second portion 203*b* as in the present embodiment, a total of the height of the first portion 203*a* and the height of the second portion 203*b* is defined as the "height of the waveguiding wall". As will be described later, the waveguiding wall may only have one of the first portion 203*a* and the second portion 203*b*. In that case, the height of that one portion defines the "height of the waveguiding wall". Without being limited to the above construction, any construction may be adopted in which the height of the waveguiding wall is less than $\lambda$m/2. As a result of this, reflection of signal waves passing through the waveguiding wall can be suppressed, whereby efficient propagation of signal waves can be achieved. The present embodiment provides an advantage of fabrication ease, because a gap exists between the first portion 203*a* and the second portion 203*b* of the waveguiding wall so that there is no need to ensure contact therebetween.

The thickness of the waveguiding wall at the top surfaces 203*at* and 203*bt* is less than $\lambda$m/2. This condition is imposed in order to prevent resonance of the lowest order from occurring at the top surfaces 203*at* and 203*bt* of the waveguiding wall. This restrains electromagnetic waves from leaking outside the waveguiding wall. In the present specification, the "thickness at a top surface" is defined as, among shortest distances from various points along the inner periphery to the outer periphery of the top surface, the largest distance of all.

In the present embodiment, the height of the second portion 203*b* of waveguiding wall is greater than the height of the first portion 203*a*, and is equal to the height of the surrounding conductive rods 124. Therefore, the first portion 203*a* of the waveguiding wall and the plurality of conductive rods 124 can be formed on the second conductive member 220 through a simple process; however, this implementation is not limiting. Hereinafter, other exemplary constructions for the waveguiding wall will be described.

FIG. 8A is a cross-sectional view showing another exemplary construction for the waveguiding wall. In this example, the height of the first portion 203*a* of the waveguiding wall is greater than the height of the second portion 203*b*. In this example, too, there is a gap between the first portion 203*a* and the second portion 203*b*. Therefore, the thickness of the waveguiding wall at the top surfaces 203*at* and 203*bt* is set to be less than $\lambda$m/2. In order to further reduce leakage of electromagnetic waves, a total of the thickness of the waveguiding wall at the top surfaces 203*at* and 203*bt*, a half of the width of the space between the waveguiding wall and a conductive rod 124, and a length resulting by subtracting the height of the second portion 203*b* of the waveguiding wall from the height of the conductive rod 124 (i.e., lengths of the arrows shown in FIG. 8A) is less than $\lambda$m/2. As a result of this, resonance of the lowest order can be prevented from occurring in the region from the mouth of the gap of the waveguiding wall to the leading end of the conductive rod 124. Note that the construction shown in FIG. 7D is also to be designed so as to satisfy similar conditions.

FIG. 8B is a cross-sectional view showing still another exemplary construction for the waveguiding wall. In this example, a single unsplit waveguiding wall 203 is connected to both the first conductive member 210 and the second conductive member 220. In this example, a total of the height of the waveguiding wall 203, the thickness of the first conductive member 210, and the thickness of the second conductive member 220 is designed to be less than λm/2. In other words, the length along the Z direction of the space which is surrounded by the first throughhole 211, the waveguiding wall 203, and the second throughhole 221 is designed to be less than λm. As a result of this, resonance of the lowest order is prevented from occurring, and loss of energy due to reflection when passing through the first throughhole 211, the waveguiding wall, and the second throughhole 221 can be reduced. In this example, there are no particular constraints on the thickness of the waveguiding wall 203.

FIG. 8C is a cross-sectional view showing still another exemplary construction for a waveguiding wall. In this example, the waveguiding wall only includes a second portion 203*b* that connects to the second conductive member 220. In this example, the height of the waveguiding wall (second portion 203*b*) is the same as the height of the conductive rods 124; however, they may be different. There is a gap between the waveguiding wall (second portion 203*b*) and the first conductive member 210. In order to restrain energy of electromagnetic waves from leaking through the gap, the thickness of the waveguiding wall (second portion 203*b*) at the top surface is set to be less than λm/2.

FIG. 8D is a cross-sectional view showing still another exemplary construction for a waveguiding wall. In this example, the waveguiding wall only includes a first portion 203*a* that connects to the first conductive member 210. There is a gap between the waveguiding wall (first portion 203*a*) and the second conductive member 220. In order to prevent energy of electromagnetic waves from leaking through the gap, the thickness of the waveguiding wall (first portion 203*a*) at the top surface is set to be less than λm/2.

FIG. 8E is a cross-sectional view showing still another exemplary construction for a waveguiding wall. In this example, the waveguiding wall 203 only includes a single portion that is connected to neither the first conductive member 210 nor the second conductive member 220. By a member not shown, the waveguiding wall 203 is fixed to the first conductive member 210 and the second conductive member 220. There is a gap between the waveguiding wall 203 and the first conductive member 210, and also between the waveguiding wall 203 and the second conductive member 220. In order to prevent energy of electromagnetic waves from leaking through the gap, the thickness of the waveguiding wall 203 at the top surface is set to be less than λm/2. In this example, the top surface of the waveguiding wall 203 refers to both a face opposing the conductive surface 210*a* of the first conductive member 210 and a face opposing the conductive surface 220*a* of the second conductive member 220.

In any of the aforementioned constructions, the distance between the one of the plurality of conductive rods 124 that is adjacent (i.e., the closest) to the waveguiding wall and the outer periphery of the waveguiding wall is set to be less than λm/2. At least one of the first conductive member 210 and the second conductive member 220, and the waveguiding wall, may constitute a single interconnected part. In other words, at least one of the first conductive member 210 and the second conductive member 220, and the waveguiding wall, may be portions of a single-piece body. In a construction in which the waveguiding wall is split into the first portion 203*a* and the second portion 203*b*, the first conductive member 210 and the first portion 203*a* may be portions of a single-piece body, while the second conductive member 220 and the second portion 203*b* may be portions of another single-piece body. Such a single-piece body may be a single part which is made of the same material, and produced through steps such as cutting, drawing, or molding, for example. A single-piece body may be produced by using a 3D printer, for example. Any such construction in which constituent elements are not clearly bounded from one another is also encompassed by embodiments of the present disclosure. Next, exemplary cross-sectional shapes of the waveguiding wall and the throughholes 211 and 221 will be described.

FIG. 9A is a diagram schematically showing an exemplary shape of an X-Y cross section of the second portion 203*b* of the waveguiding wall. The first portion 203*a* and the throughholes 211 and 221 also have similar cross-sectional shapes. In this example, the first portion 203*a* of the waveguiding wall, the second portion 203*b* of the waveguiding wall, and the inner wall surface of each of the throughholes 211 and 221 have two projections 203*r* which project inward. The opening has a cross-sectional shape resembling the alphabetical letter "H", with one lateral portion 203T extending along the X direction and a pair of vertical portions 203L extending along the Y direction from both ends of the lateral portion. Although the vertical portions 203L extend perpendicularly to the lateral portion 203T in this example, it is not necessary that they do. More generally, the vertical portions 203L extend along a direction intersecting the direction that the lateral portion 203T extends. Hereinafter, such a shape may be referred to as an H-shape or a double projection shape. Although FIG. 9A illustrates that the lateral portion 203T of the H shape is parallel to the X axis direction, the lateral portion 203T may be inclined with respect to the X axis direction. The cross-sectional shape of the opening may be designed so that a length which is twice the length extending along the lateral portion 203T/vertical portion 203L from the center point (i.e., the center point of the lateral portion 203T) to an end (i.e., either end of a vertical portion 203L) of the H shape is equal to or greater than λo/2. As a result, the waveguiding wall functions as a hollow waveguide, allowing electromagnetic wave to propagate mainly along the pair of projections 203*r* (lateral portion 203T). By adopting an H shape, the size of the opening along the direction of the lateral portion 203T can be reduced. The thickness of the waveguiding wall at a center of the lateral portion 203T (i.e., the thickness along the Y direction of the second portion 203*b* of the waveguiding wall where it has a projection 203*r*) is preferably λo/4, or not less than 0.8 times as large as λo/4 and not more than 1.2 times as large as λo/4. By adopting this range of dimensions, leakage of electromagnetic waves from the throughholes can be better suppressed.

FIG. 9B is a diagram schematically showing another exemplary shape of an X-Y cross section of the second portion 203*b* of the waveguiding wall. The first portion 203*a* and the throughholes 211 and 221 also have similar cross-sectional shapes. In this example, the first throughhole, the second throughhole, and the waveguiding wall each have a cross-sectional shape along the conductive surface 210*a* which is elongated in one direction (elongated shape), such that each only has a lateral portion 203T. Without being limited to a rectangular shape, such a shape may be a shape with rounded both ends, e.g., an ellipse. Since such a shape resembles the alphabetical letter "I", it may be referred to as an I shape. The dimension of the opening along its longitudinal direction (the X direction) is set to be a value which is greater than $\lambda o/2$. Although this results in a larger size along the longitudinal direction (which in the example of FIG. 9B is the X direction) than in the structure of FIG. 9A, the aperture shape is simplified. The dimension from the edge of the throughhole to the longer-side edge of the second portion 203b of the waveguiding wall along the Y direction is preferably $\lambda o/4$, or not less than 0.8 times as large as $\lambda o/4$ and not more than 1.2 times as large as $\lambda o/4$. By adopting this range of dimensions, leakage of electromagnetic waves from the throughholes can be better suppressed.

FIG. 9C is a diagram schematically showing still another exemplary shape of an X-Y cross section of the second portion 203b of the waveguiding wall. The first portion 203a and the throughholes 211 and 221 also have similar cross-sectional shapes. In this example, the first portion 203a of the waveguiding wall, the second portion 203b of the waveguiding wall, and the inner wall surfaces of the throughholes 211 and 221 each have one projection 203r which projects inward. Such a shape may be referred to as a single projection shape. Since the inner wall surface of the waveguiding wall thus has at least one projection 203r which projects inward, electromagnetic waves can be propagated along the projection(s) 203r. Even in the case of a single projection shape, though, one or more other projections may be provided on the outer wall surface of the waveguiding wall. In the example of FIG. 9C, on the opposite side of the side having the projection 203r, the outer wall surface of the waveguiding wall has one outer projection 203r2 which projects outward. In this example, the width of the outer projection 203r2 along the X direction is greater than the width of the projection 203r along the X direction. However, a structure in which the outer projection 203r2 has substantially the same width as the width of the projection 203r may also be adopted. The opening in this example has one lateral portion 203T extending along the X direction and a pair of vertical portions 203L, which extend alike in the +Y direction from both ends of the lateral portion 203T. In this example, the length along the pair of vertical portions 203L and the lateral portion 203T from an end of one vertical portion 203L (the upper right end in FIG. 9C) to an end of the other vertical portion 203L (the upper left end in FIG. 9C) is designed to be a value which is greater than $\lambda o/2$. The thickness of the waveguiding wall at a center of the lateral portion 203T (i.e., the thickness along the Y direction of the second portion 203b of the waveguiding wall where it has the projection 203r) is preferably $\lambda o/4$, or not less than 0.8 times as large as $\lambda o/4$ and not more than 1.2 times as large as $\lambda o/4$. The dimension from the edge of the throughhole to the longer-side edge of the second portion 203b of the waveguiding wall along the Y direction is also preferably $\lambda o/4$, or not less than 0.8 times as large as $\lambda o/4$ and not more than 1.2 times as large as $\lambda o/4$. By adopting this range of dimensions, leakage of electromagnetic waves from the throughholes can be better suppressed.

FIG. 9D is a diagram schematically showing still another exemplary shape of an X-Y cross section of the second portion 203b of the waveguiding wall. The first portion 203a and the throughholes 211 and 221 also have similar cross-sectional shapes. The cross-sectional shape in this example has one lateral portion 203T extending along the X direction and a pair of vertical portions 203L extending in respectively different directions (i.e., the +Z direction and the −Z direction) from both ends of the lateral portion 203T. Since such a shape resembles the alphabetical letter "Z" or an inverted "Z", it may be referred to as a Z shape. The cross-sectional shape of the opening may be designed so that a length which is twice the length extending along the lateral portion 203T/vertical portion 203L from the center point (i.e., the center point of the lateral portion 203T) to an end (i.e., either end of a vertical portion 203L) of the Z shape is equal to or greater than $\lambda o/2$.

FIG. 10 is a diagram schematically showing an exemplary distribution of electric field intensity that is created in the case where the opening is H-shaped. While an electromagnetic wave is propagating along the waveguiding wall, an electric field as illustrated in FIG. 10 may be created in the waveguiding wall. In FIG. 10, electric field directions are indicated by arrows, with the electric field intensity being indicated by arrow length. The electric field is relatively strong between the pair of projections, but relatively weak in the portions around the projections. With such an electric field distribution, electromagnetic waves will propagate mainly along the projections.

In the above examples, the waveguiding wall (i.e., the first portion 203a and the second portion 203b) completely surrounds the space between the first throughhole 211 and the second throughhole 221 (excluding the gap); however, this implementation is not limiting.

FIG. 11 is a diagram showing another exemplary construction for the waveguiding wall. In this example, the waveguiding wall is split into two portions. An X-Y cross-sectional shape of one of the two portions is a half of an H shape (i.e., half a lateral portion and one vertical portion). With such a waveguiding wall, too, as shown in FIG. 11, a strong electric field is created between opposing projections 203r. Therefore, electromagnetic wave can propagate as in the above examples.

Next, examples of combining the waveguide device 200 in the present embodiment and the aforementioned ridge waveguide (WRG) will be described. By being combined with the aforementioned WRG structure, various feeding paths as adapted to the purpose can be established in the waveguide devices 200 according to the present embodiment.

FIG. 12A is a cross-sectional view showing an example where a third conductive member 230 having a WRG structure is provided below the second conductive member 220. The third conductive member 230 includes a waveguide member 122 extending along the Y direction, and plural conductive rods 124 on both sides of the waveguide member 122. The plurality of conductive rods 124 provided on the upper surface of the third conductive member 230 can be called a second plurality of conductive rods. The waveguide face of the waveguide member 122 and the leading ends of the conductive rods 124 oppose a conductive surface 220b of the second conductive member 220.

FIG. 12B is a cross-sectional view showing an example where conductive rods 124 are provided above and below the second conductive member 220. On the lower surface of the second conductive member 220, a plurality of conductive rods 124 and a waveguide member 122 are provided. The plurality of conductive rods 124 provided on the upper surface (conductive surface 220a) of the second conductive member 220 may be referred to as a first plurality of conductive rods 124, whereas the plurality of conductive rods 124 provided on the lower surface (conductive surface 220b) of the second conductive member 220 may be referred to as a second plurality of conductive rods 124. The third conductive member 230 is a plate-like member provided below the second conductive member 220, having a conductive surface 230a that opposes the conductive surface 220b. In this example, the waveguide member 122 below the second conductive member 220 extends along the Y direction, with plural conductive rods 124 on both sides. The waveguide face of the waveguide member 122 and the leading ends of the conductive rods 124 oppose the conductive surface 230a of the third conductive member 230. The second throughhole 221 is open at an end or another site of the waveguide face of the waveguide member 122.

FIG. 13 is an upper plan view showing the third conductive member 230 in FIG. 12A as viewed from the positive direction of the Z axis. On both sides of the waveguide member 122, stretches of artificial magnetic conductor, each created by an array of plural conductive rods 124, are present. At one end of the waveguide member 122, a plurality of conductive rods 124 flanking each other along the Y direction constitute a choke structure 129. The choke structure 129 includes: an open end of the waveguide member (ridge) 122; and a plurality of conductive rods having a height of about $\lambda o/4$, these conductive rods lying on the extension from that end of the ridge 122. The length of the ridge that is contained in this choke structure is $\lambda g/4$, where $\lambda g$ is the wavelength of an electromagnetic wave in the ridge waveguide. The choke structure 129 restrains electromagnetic waves from leaking from one end of the waveguide member 122, thereby permitting efficient transmission of electromagnetic waves.

The third conductive member 230 has a port (opening) 145 close to the other end of the waveguide member 122. Via the port 145, an electromagnetic wave may be supplied to the waveguide extending above the waveguide member 122 from a transmission circuit (electronic circuit) not shown. Conversely, an electromagnetic wave having propagated through the waveguide extending above the waveguide member 122 may further be transmitted via the port 145 to the waveguide in the underlayer. The waveguide face of the waveguide member 122 on the third conductive member 230 may oppose the second throughhole 221 at any site on the waveguide face.

FIG. 14 is a cross-sectional view showing an example where a WRG structure is provided above the first conductive member 210. In this example, the first conductive member 210 has a waveguide member 122 and a plurality of conductive rods 124 provided on its opposite surface from the conductive surface 210a. One end of the waveguide member 122 connects to the side walls of the first throughhole 211. A further conductive member 240 is provided opposite to the first conductive member 210. The conductive surface 240a of the conductive member 240 opposes the waveguide face of the waveguide member 122 and the leading ends of the conductive rods 124. A waveguide is created between the conductive surface 240a and the waveguide face.

FIG. 15 is an upper plan view showing the first conductive member 210 in FIG. 14 as viewed from the positive direction of the Z axis. From the position of the first throughhole 211 on the first conductive member 210, a waveguide member 122 having a stripe shape (which may also be referred to as a "strip shape") extends in the negative direction of the Y axis. Around the waveguide member 122, a plurality of conductive rods 124 are provided in a two-dimensional array to constitute an artificial magnetic conductor. An electromagnetic wave having passed through the waveguiding wall and the first throughhole 211 is able to propagate along the waveguide face above the waveguide member 122. The waveguide extending between the waveguide member 122 and the conductive surface 240a may be connected to at least one antenna element (e.g., a slot(s)) not shown, or connected to a waveguide in a further upper layer. In the present specification, a "stripe shape" means a shape which is defined by a single stripe, rather than a shape constituted by stripes. Not only shapes that extend linearly in one direction, but also any shape that bends or branches along the way is also encompassed by a "stripe shape". In the case where any portion that undergoes a change in height or width is provided on the waveguide face 122a, it still falls under the meaning of "stripe shape" so long as the shape includes a portion that extends in one direction as viewed from the normal direction of the waveguide face 122a.

FIG. 16 is a cross-sectional view showing an exemplary construction in which the constructions of FIG. 12A and FIG. 14 are combined. In this construction, the waveguide extending above the waveguide member 122 on the third conductive member 230 and the waveguide extending above the waveguide member 122 on the first conductive member 210 are connected to each other via the second throughhole 211, the waveguiding wall (i.e., the first portion 203a and the second portion 203b), and the second throughhole 221. As a result, an electromagnetic wave is allowed to propagate between the two (upper and lower) waveguides. Moreover, on the third conductive member 230, a choke structure 229 including a ridge having a length of $\lambda g/4$ along the Y direction is provided in the positive direction of the Y axis from the throughhole 221. The choke structure 229 restrains an electromagnetic wave from leaking at the end of the waveguide member 122 that is in the positive direction of the Y axis, thereby permitting efficient transmission of electromagnetic waves.

FIG. 17 is a cross-sectional view schematically showing an exemplary construction of a waveguide device 200 that allows electromagnetic waves to propagate in a manner of skipping two waveguide layers. The waveguide device 200 of this example includes a first conductive member 210, a second conductive member 220, a third conductive member 230, and further conductive members 240 and 250. The third conductive member 230 includes: a second plurality of conductive rods 124 each having a leading end opposing the conductive surface 220b of the second conductive member 220; a third throughhole 231 which overlaps the second throughhole 221 as viewed along the axial direction of the second throughhole 221; and a further electrically-conductive waveguiding wall 233 (i.e., a first portion 233a and a second portion 233b) surrounding at least a portion of the space between the second throughhole 221 and the third throughhole 231. The waveguiding wall 233 is surrounded by the second plurality of conductive rods 124 on the third conductive member 230, and allows electromagnetic waves to propagate between the second throughhole 221 and the third throughhole 231. The height of the further waveguiding wall 233 (i.e., a total height of the first portion 233a and the second portion 233b) is also less than $\lambda m/2$. Among the second plurality of conductive rods 124, the distance between any conductive rod 124 that is adjacent to the waveguiding wall 233 and the outer periphery of the waveguiding wall 233 is less than $\lambda m/2$. In the example shown in FIG. 17, the waveguiding wall 233 is divided into the first portion 233a, which is connected to the rear face (i.e., the conductive surface 220b) side of the conductive member 220, and the second portion 233b, which is connected to the conductive member 230; however, it may alternatively be composed of a single part. The waveguiding wall 233 may be connected to at least one of the conductive members 220 and 230, or connected to neither conductive member as in the example shown in FIG. 8E. At least one of the conductive members 220 and 230 and at least a portion of the waveguiding wall 233 may belong to a single-piece body. As for the waveguiding wall 233, too, its thickness at the top surface is set to be less than λm/2, as is the case with the aforementioned waveguiding wall 203.

In this example, electromagnetic waves can propagate in a manner of skipping two layers, i.e., the layer between the conductive member 210 and the conductive member 220 and the layer between the conductive member 220 and the conductive member 230. This makes it possible to provide other structures, e.g., waveguides, cameras, or the like, in the space occupied by these two skipped layers. Note that, instead of the conductive member 250 in FIG. 17, a member having still another waveguiding wall may be provided. In such a construction, electromagnetic waves can propagate in a manner of skipping three or more layers.

FIG. 18 is a cross-sectional view schematically showing an exemplary construction where another waveguide is created in a layer in which a waveguiding wall 203 is provided. The waveguide device 200 further includes, in addition to the construction shown in FIG. 16, further ridge waveguides on the second conductive member 220 and on the third conductive member 230. In this example, the third conductive member 230 includes two stripe-shaped waveguide members 122 that are separated by a plurality of conductive rods 124.

FIG. 19 is an upper plan view showing the second conductive member 220 in the waveguide device 200 of FIG. 18 as viewed from the positive direction of the Z axis. The second conductive member 220 in this example further includes, among the plurality of conductive rods 124, a waveguide member 122 having an electrically conductive waveguide face that opposes the conductive surface 210a. The waveguide member 122 is placed a certain number of conductive rods 124 away from the waveguiding wall 203. A waveguide is created between the waveguide face of the waveguide member 122 and the conductive surface 210a of the first conductive member. Via a port 145, this waveguide is connected to a waveguide extending above the waveguide member 122 on the third conductive member 230.

An electromagnetic wave propagating through the waveguide extending above the waveguide member 122 on the second conductive member 220 is able to carry a signal which is different from that of an electromagnetic wave propagating in the waveguiding wall 203. For example, the former electromagnetic wave may be a reception wave which is transmitted from a reception antenna element, whereas the latter electromagnetic wave may be a transmission wave to be transmitted to a transmission antenna element. Such a construction allows a small-sized antenna device with a waveguide structure to be implemented in a limited space.

Next, with reference to FIGS. 20A and 20B, transmission/return characteristics of electromagnetic waves passing through a waveguiding wall according to the present embodiment will be described. FIGS. 20A and 20B show results of conducting a simulation by setting the dimensions of respective members, etc., at appropriate values.

FIG. 20A is a graph showing frequency dependence of scattering parameters (S parameters) in the waveguiding wall of the waveguide device 200 illustrated in FIGS. 7A through 7D. The S parameters are matrix elements of a scattering matrix (S matrix), representing the transmission/return characteristics of a signal wave that propagates in a given circuit. In FIG. 20A, S(1,1) represents the ratio of a reflected wave intensity to an input wave intensity, and S(2,1) represents the ratio of a transmitted wave intensity to an input wave intensity.

As can be seen from FIG. 20A, while S(1,1) takes very small values on the order of −50 dB to −30 dB (×10$^{-5}$ to ×10$^{-3}$), S(2,1) is substantially 0 dB (×1). This means that, when an electromagnetic wave passes in the waveguiding wall according to the present embodiment, reflection hardly occurs (i.e., there is little loss).

FIG. 20B is a graph showing frequency dependence of S parameters in the case where an adjacent port is provided near a waveguiding wall. In this case, since an energy leak from the waveguiding wall to the adjacent port may occur, the S matrix is 4 rows by 4 columns. In this case, S(1,1) represents the ratio of a reflected wave intensity to an input wave intensity; S(2,1) represents the ratio of a transmitted wave intensity to an input wave intensity; and S(3,1) and S(4,1) represent the ratio of the intensity of a leaky wave toward the adjacent port to an input wave intensity.

As can be seen from FIG. 20B, while S(1,1), S(3,1), and S(4,1) take very small values on the order of −37 dB to −25 dB, S(2,1) is substantially 0 dB (×1). This means that, when an electromagnetic wave passes in the waveguiding wall, reflection and leakage to the adjacent port hardly occur (i.e., there is little loss).

Thus, according to the present embodiment, an electromagnetic wave can propagate through the waveguiding wall with a high efficiency.

Embodiment 2: Antenna Device

Next, an illustrative embodiment of an antenna device including the waveguide device according to the present disclosure will be described. The antenna device of the present embodiment includes the waveguide device according to Embodiment 1 and at least one antenna element which is connected to a waveguide in a waveguiding wall of the waveguide device. To be "connected to a waveguide in a waveguiding wall" means being connected to a waveguide in the waveguiding wall either directly or indirectly via another waveguide such as the aforementioned WRG. The at least one antenna element has at least one of the function of radiating into space an electromagnetic wave which has propagated through the waveguide in the waveguiding wall and the function of allowing an electromagnetic wave which has propagated in space to be introduced into the waveguide in the waveguiding wall. In other words, the antenna device according to the present embodiment is used for at least one of transmission and reception of signals.

FIG. 21A is a diagram showing an example of an antenna device (array antenna) in which a plurality of slots (openings) are arrayed. FIG. 21A is an upper plan view showing the antenna device as viewed from the +Z direction. FIG. 21B is a cross-sectional view taken along line B-B in FIG. 21A. In the antenna device shown in the figure, a first waveguide layer 10a including a plurality of waveguide members 122U that directly couple to a plurality of slots 112 functioning as antenna elements (radiating elements), a second waveguide layer 10b including a plurality of conductive rods 124M and waveguiding walls not shown, and a third waveguide layer 10c including another waveguide member 122L that couples to waveguide members 122U of the first waveguide layer 10a via the waveguiding walls are stacked. The plurality of waveguide members 122U and the plurality of conductive rods 124U in the first waveguide layer 10a are provided on a first conductive member 210.

The plurality of conductive rods 124M and the waveguiding walls not shown in the second waveguide layer 10b are provided on a second conductive member 220. The waveguide member 122L and the plurality of conductive rods 124L in the third waveguide layer 10c are provided on a third conductive member 230.

This antenna device further includes a conductive member 110 that covers the waveguide members 122U and the plurality of conductive rods 124U in the first waveguide layer 10a. The conductive member 110 has 16 slots (openings) 112 in an array of 4 rows and 4 column. Side walls 114 surrounding each slot 112 are provided on the conductive member 110. The side walls 114 form a horn that adjusts directivity of the slot 112. The number and arrangement of slots 112 in this example are only illustrative. The orientations and shapes of the slots 112 are not limited to those of the example shown in the figures, either. For example, H-shaped slots may also be used. It is not intended that the example shown in the figures provides any limitation as to whether the side walls 114 of each horn are tilted or not, the angles thereof, or the shape of each horn.

FIG. 22A is a diagram showing a planar layout of the waveguide members 122U and conductive rods 124U in the first conductive member 210. FIG. 22B is a diagram showing a planar layout of conductive rods 124M, waveguiding walls 203, and throughholes 221 in the second conductive member 220. FIG. 22C is a diagram showing a planar layout of a waveguide member 122L and conductive rods 124L on the third conductive member 230. As is clear from these figures, the waveguide members 122U on the first conductive member 210 extend linearly (stripe-shaped), and include no branching portions or bends. On the other hand, the waveguide member 122L on the third conductive member 230 includes both branching portions (at which the direction of extending ramifies into two) and bends (at which the direction of extending changes). Between the throughholes 211 in the first conductive member 210 and the throughholes 221 in the second conductive member 220, as shown in FIG. 22B, waveguiding walls 203 as described in Embodiment 1 are provided.

In the example shown in FIG. 22B, four waveguiding walls 203 exist on the second conductive member 220. The relative positioning between the waveguiding walls 203 and the respectively adjacent rods 124M differs from waveguiding wall 203 to waveguiding wall 203. The thickness of each waveguiding wall 203 having an inward projection, where the thickness is inclusive of that projection, may be set to be about $\lambda_o/4$, as shown in FIG. 9A. In order to accommodate such waveguiding walls 203, the interval with adjacent conductive rods 124M need to be adjusted. FIG. 22B illustrates variations thereof. As for the rightmost and leftmost waveguiding walls 221 in the figure, only six rods 124M that are adjacent thereto along the Y direction are slightly offset along the Y direction so as to avoid contact between the waveguiding walls 203 and these rods 124M. As for the waveguiding wall 221 that is the second from the left, six rods 124M that are adjacent thereto along the Y direction are eliminated. As for the waveguiding wall 221 that is the third from the left, three columns of rods 124M having overlapping X coordinates are dephased in terms of their positioning along the Y direction. All of these instances satisfactorily function. Moreover, the interval between the outer peripheral surface of any waveguiding wall 203 and the outer peripheral surface of any adjacent rod 124M is less than $\lambda m/2$.

The waveguide members 122U on the first conductive member 210 couple to the waveguide member 122L on the third conductive member 230 via the throughholes 211, the waveguiding walls, and the throughholes 221. Stated otherwise, an electromagnetic wave which has propagated along the waveguide member 122L on the third conductive member 230 passes through the throughholes 221, the waveguiding walls, and the throughholes 211 to reach the waveguide members 122U on the first conductive member 210, and propagates along the waveguide members 122U. In this case, each slot 112 functions as an antenna element to allow an electromagnetic wave which has propagated through the waveguide to be radiated into space. Conversely, when an electromagnetic wave which has propagated in space impinges on a slot 112, the electromagnetic wave couples to the waveguide member 122U that lies directly under that slot 112, and propagates along the waveguide member 122U. Electromagnetic waves which have propagated through the waveguide members 122U may also pass through the throughholes 211, the waveguiding walls, and the throughholes 221 to reach the waveguide member 122L on the third conductive member 230, and propagate along the waveguide member 122L. Via a port 145L of the third conductive member 230, the waveguide member 122L of the second waveguide device 100b may couple to an external waveguide device or radio frequency circuit (electronic circuit). As one example, FIG. 22C illustrates an electronic circuit 290 which is connected to the port 145L. Without being limited to a specific position, the electronic circuit 290 may be provided at any arbitrary position. The electronic circuit 290 may be provided on a circuit board which is on the rear surface side (i.e., the lower side in FIG. 21B) of the third conductive member 210, for example. Such an electronic circuit is a microwave integrated circuit, which may be an MMIC (Monolithic Microwave Integrated Circuit) that generates or receives millimeter waves, for example.

The conductive member 110 shown in FIG. 21A may be called a "radiation layer". Moreover, the layer including the entirety of the waveguide members 122U on the first conductive member 210 and conductive rods 124U shown in FIG. 22A may be called an "excitation layer", whereas the layer including the entirety of the conductive rods 124M and waveguiding walls on the second conductive member 220 shown in FIG. 22B may be called an "intermediate layer", and the layer including the entirety of the waveguide member 122L on the third conductive member 230 and conductive rods 124L shown in FIG. 22C may be called a "distribution layer". Moreover, the "excitation layer", the "intermediate layer", and the "distribution layer" may be collectively called a "feeding layer". Each of the "radiation layer", the "excitation layer", the "intermediate layer", and the "distribution layer" can be mass-produced by processing a single metal plate. The radiation layer, the excitation layer, the distribution layer, and the electronic circuitry to be provided on the rear face side of the distribution layer may be fabricated as a single-module product.

In the array antenna of this example, as can be seen from FIG. 21B, a radiation layer, an excitation layer, and a distribution layer are layered, which are in plate form; therefore, a flat and low-profile flat panel antenna is realized as a whole. For example, the height (thickness) of a multilayer structure having a cross-sectional construction as shown in FIG. 21B can be set to 20 mm or less.

With the waveguide member 122L shown in FIG. 22C, the distances from the port 145L of the third conductive member 230 to the respective throughholes 211 (see FIG. 22A) in the first conductive member 210 measured along the waveguide member 122L are all equal. Therefore, a signal wave which is input to the waveguide member 122L at the port 145L of the third conductive member 230 reaches the four throughholes 211 in the first conductive member 210 all in the same phase. As a result, the four waveguide members 122U on the first conductive member 210 can be excited in the same phase.

It is not necessary for all slots 112 functioning as antenna elements to radiate electromagnetic waves in the same phase. The network patterns of the waveguide members 122U and 122L in the excitation layer and the distribution layer may be arbitrary, and they may be arranged so that the respective waveguide members 122U and 122L independently propagate different signals.

Although the waveguide members 122U on the first conductive member 210 according to the present embodiment include neither a branching portion nor a bend, the portion functioning as an excitation layer may also include a waveguide member having at least one of a branching portion and a bend. As mentioned earlier, it is not necessary for all conductive rods in the waveguide device to be similar in shape.

According to the present embodiment, an electromagnetic wave can propagate in a direct manner via the electrically conductive waveguiding walls 203, between the throughholes 211 in the first conductive member 210 and the throughholes 221 in the second conductive member 220. Since no unwanted propagation occurs on the second conductive member 220, it is possible to provided other structures, e.g., waveguides, circuit boards, or cameras, on the second conductive member 220. Thus, the device has improved design freedom. Although the present embodiment illustrates that waveguiding walls are provided between the first conductive member 210 and the second conductive member 220, the waveguiding walls may be provided at other positions. A plurality of waveguiding walls may be provided as necessary.

The waveguide device and antenna device according to the present embodiment can be suitably used in a radar or a radar system to be incorporated in moving entities such as vehicles, marine vessels, aircraft, robots, or the like, for example. A radar would include an antenna device according to an embodiment of the present disclosure and a microwave integrated circuit that is connected to the antenna device. A radar system would include the radar and a signal processing circuit that is connected to the microwave integrated circuit of the radar. An antenna device according to the present embodiment includes a multi-layered WRG structure which permits downsizing, and thus allows the area of the face on which antenna elements are arrayed to be greatly reduced, as compared to a construction in which a conventional hollow waveguide is used. Therefore, a radar system incorporating the antenna device can be easily mounted in a narrow place such as a face of a rearview mirror in a vehicle that is opposite to its specular surface, or a small-sized moving entity such as a UAV (an Unmanned Aerial Vehicle, a so-called drone). Note that, without being limited to the implementation where it is mounted in a vehicle, a radar system may be used while being fixed on the road or a building, for example.

A slot array antenna according to an embodiment of the present disclosure can also be used in a wireless communication system. Such a wireless communication system would include a slot array antenna according to any of the above embodiments and a communication circuit (a transmission circuit or a reception circuit). Details of exemplary applications to wireless communication systems will be described later.

A slot array antenna according to an embodiment of the present disclosure can further be used as an antenna in an indoor positioning system (IPS). An indoor positioning system is able to identify the position of a moving entity, such as a person or an automated guided vehicle (AGV), that is in a building. An array antenna can also be used as a radio wave transmitter (beacon) for use in a system which provides information to an information terminal device (e.g., a smartphone) that is carried by a person who has visited a store or any other facility. In such a system, once every several seconds, a beacon may radiate an electromagnetic wave carrying an ID or other information superposed thereon, for example. When the information terminal device receives this electromagnetic wave, the information terminal device transmits the received information to a remote server computer via telecommunication lines. Based on the information that has been received from the information terminal device, the server computer identifies the position of that information terminal device, and provides information which is associated with that position (e.g., product information or a coupon) to the information terminal device.

The present specification employs the term "artificial magnetic conductor" in describing the technique according to the present disclosure, this being in line with what is set forth in a paper by one of the inventors Kirino (Non-Patent Document 1) as well as a paper by Kildal et al., who published a study directed to related subject matter around the same time. However, it has been found through a study by the inventors that the invention according to the present disclosure does not necessarily require an "artificial magnetic conductor" under its conventional definition. That is, while a periodic structure has been believed to be a requirement for an artificial magnetic conductor, the invention according to the present disclosure does not necessary require a periodic structure in order to be practiced.

The artificial magnetic conductor that is described in the present disclosure consists of rows of conductive rods. In order to prevent electromagnetic waves from leaking away from the waveguide face, it has been believed essential that there exist at least two rows of conductive rods on one side of the waveguide member(s), such rows of conductive rods extending along the waveguide member(s) (ridge(s)). The reason is that it takes at least two rows of conductive rods for them to have a "period". However, according to a study by the inventors, even when only one row of conductive rods, or only one conductive rod, exists between two waveguide members that extend in parallel to each other, the intensity of a signal that leaks from one waveguide member to the other waveguide member can be suppressed to −10 dB or less, which is a practically sufficient value in many applications. The reason why such a sufficient level of separation is achieved with only an imperfect periodic structure is so far unclear. However, in view of this fact, in the present disclosure, the conventional notion of "artificial magnetic conductor" is extended so that the term also encompasses a structure including only one row of conductive rods, or only one conductive rod.

Other Variants

Next, other variants of a waveguide structure that includes the waveguide member 122, the conductive members 110 and 120, and the conductive rod 124 will be described.

FIG. 23A is a cross-sectional view showing an exemplary structure in which only the waveguide face 122a, defining an upper face of the waveguide member 122, is electrically conductive, while any portion of the waveguide member 122 other than the waveguide face 122a is not electrically conductive. Both of the conductive member 110 and the conductive member 120 alike are only electrically conductive at their surface that has the waveguide member 122 provided thereon (i.e., the conductive surface 110a, 120a), while not being electrically conductive in any other portions. Thus, each of the waveguide member 122, the conductive member 110, and the conductive member 120 does not need to be electrically conductive.

FIG. 23B is a diagram showing a variant in which the waveguide member 122 is not formed on the conductive member 120. In this example, the waveguide member 122 is fixed to a supporting member (e.g., the inner wall of the housing) that supports the conductive member 110 and the conductive member 120. A gap exists between the waveguide member 122 and the conductive member 120. Thus, the waveguide member 122 does not need to be connected to the conductive member 120.

FIG. 23C is a diagram showing an exemplary structure where the conductive member 120, the waveguide member 122, and each of the plurality of conductive rods 124 are composed of a dielectric surface that is coated with an electrically conductive material such as a metal. The conductive member 120, the waveguide member 122, and the plurality of conductive rods 124 are connected to one another via the electrical conductor. On the other hand, the conductive member 110 is made of an electrically conductive material such as a metal.

FIG. 23D and FIG. 23E are diagrams each showing an exemplary structure in which dielectric layers 110b and 120b are respectively provided on the outermost surfaces of conductive members 110 and 120, a waveguide member 122, and conductive rods 124. FIG. 23D shows an exemplary structure in which the surface of metal conductive members, which are conductors, are covered with a dielectric layer. FIG. 23E shows an example where the conductive member 120 is structured so that the surface of members which are composed of a dielectric, e.g., resin, is covered with a conductor such as a metal, this metal layer being further coated with a dielectric layer. The dielectric layer that covers the metal surface may be a coating of resin or the like, or an oxide film of passivation coating or the like which is generated as the metal becomes oxidized.

The dielectric layer on the outermost surface will allow losses to be increased in the electromagnetic wave propagating through the WRG waveguide, but is able to protect the conductive surfaces 110a and 120a (which are electrically conductive) from corrosion. It also prevents influences of a DC voltage, or an AC voltage of such a low frequency that it is not capable of propagation on certain WRG waveguides.

FIG. 23F is a diagram showing an example where the height of the waveguide member 122 is lower than the height of the conductive rods 124, and a portion of the conductive surface 110a of the conductive member 110 that opposes the waveguide face 122a protrudes toward the waveguide member 122. Even such a structure will operate in a similar manner to the above-described embodiment, so long as the ranges of dimensions depicted in FIG. 4 are satisfied.

FIG. 23G is a diagram showing an example where, further in the structure of FIG. 23F, portions of the conductive surface 110a that oppose the conductive rods 124 protrude toward the conductive rods 124. Even such a structure will operate in a similar manner to the above-described embodiment, so long as the ranges of dimensions depicted in FIG. 4 are satisfied. Instead of a structure in which the conductive surface 110a partially protrudes, a structure in which the conductive surface 110a is partially dented may be adopted.

FIG. 24A is a diagram showing an example where a conductive surface 110a of the conductive member 110 is shaped as a curved surface. FIG. 24B is a diagram showing an example where also a conductive surface 120a of the conductive member 120 is shaped as a curved surface. As demonstrated by these examples, the conductive surfaces 110a and 120a may not be shaped as planes, but may be shaped as curved surfaces.

Application Example: Onboard Radar System

Next, as an Application Example of utilizing the above-described array antenna, an instance of an onboard radar system including an array antenna will be described. A transmission wave used in an onboard radar system may have a frequency of e.g. 76 gigahertz (GHz) band, which will have a wavelength λo of about 4 mm in free space.

In safety technology of automobiles, e.g., collision avoidance systems or automated driving, it is particularly essential to identify one or more vehicles (targets) that are traveling ahead of the driver's vehicle. As a method of identifying vehicles, techniques of estimating the directions of arriving waves by using a radar system have been under development.

FIG. 25 shows a driver's vehicle 500, and a preceding vehicle 502 that is traveling in the same lane as the driver's vehicle 500. The driver's vehicle 500 includes an onboard radar system which incorporates an array antenna according to the above-described embodiment. When the onboard radar system of the driver's vehicle 500 radiates a radio frequency transmission signal, the transmission signal reaches the preceding vehicle 502 and is reflected therefrom, so that a part of the signal returns to the driver's vehicle 500. The onboard radar system receives this signal to calculate a position of the preceding vehicle 502, a distance ("range") to the preceding vehicle 502, velocity, etc.

FIG. 26 shows the onboard radar system 510 of the driver's vehicle 500. The onboard radar system 510 is provided within the vehicle. More specifically, the onboard radar system 510 is disposed on a face of the rearview mirror that is opposite to its specular surface. From within the vehicle, the onboard radar system 510 radiates a radio frequency transmission signal in the direction of travel of the vehicle 500, and receives a signal(s) which arrives from the direction of travel.

The onboard radar system 510 of this Application Example includes a slot array antenna according to Embodiment 2 above. This Application Example is arranged so that the direction that each of the plurality of waveguide members extends coincides with the vertical direction, and that the direction in which the plurality of waveguide members are arrayed (with respect to one another) coincides with the horizontal direction. As a result, the lateral dimension of the plurality of slots as viewed from the front can be reduced. Exemplary dimensions of an antenna device including the above array antenna may be 60 mm (wide)×30 mm (long)× 10 mm (deep). It will be appreciated that this is a very small size for a millimeter wave radar system of the 76 GHz band.

Note that many a conventional onboard radar system is provided outside the vehicle, e.g., at the tip of the front nose. The reason is that the onboard radar system is relatively large in size, and thus is difficult to be provided within the vehicle as in the present disclosure. The onboard radar system 510 of this Application Example may be installed within the vehicle as described above, but may instead be mounted at the tip of the front nose. Since the footprint of the onboard radar system on the front nose is reduced, other parts can be more easily placed.

The Application Example allows the interval between a plurality of waveguide members (ridges) that are used in the transmission antenna to be narrow, which also narrows the interval between a plurality of slots to be provided opposite from a number of adjacent waveguide members. This reduces the influences of grating lobes. For example, when the interval between the centers of two laterally adjacent slots is shorter than the free-space wavelength λo of the transmission wave (i.e., less than about 4 mm), no grating lobes will occur frontward. As a result, influences of grating lobes are reduced. Note that grating lobes will occur when the interval at which the antenna elements are arrayed is greater than a half of the wavelength of an electromagnetic wave. If the interval at which the antenna elements are arrayed is less than the wavelength, no grating lobes will occur frontward. Therefore, in the case where no beam steering is performed to impart phase differences among the radio waves radiated from the respective antenna elements composing an array antenna, grating lobes will exert substantially no influences so long as the interval at which the antenna elements are arrayed is smaller than the wavelength. By adjusting the array factor of the transmission antenna, the directivity of the transmission antenna can be adjusted. A phase shifter may be provided so as to be able to individually adjust the phases of electromagnetic waves that are transmitted on plural waveguide members. In this case, in order to avoid the influences of grating lobes, it is more preferable that the interval between antenna elements is less than a half of the free-space wavelength λo of the transmission wave. By providing a phase shifter, the directivity of the transmission antenna can be changed in any desired direction. Since the construction of a phase shifter is well-known, description thereof will be omitted.

A reception antenna according to the Application Example is able to reduce reception of reflected waves associated with grating lobes, thereby being able to improve the precision of the below-described processing. Hereinafter, an example of a reception process will be described.

FIG. 27A shows a relationship between an array antenna AA of the onboard radar system 510 and plural arriving waves k (k: an integer from 1 to K; the same will always apply below. K is the number of targets that are present in different azimuths). The array antenna AA includes M antenna elements in a linear array. Principlewise, an antenna can be used for both transmission and reception, and therefore the array antenna AA can be used for both a transmission antenna and a reception antenna. Hereinafter, an example method of processing an arriving wave which is received by the reception antenna will be described.

The array antenna AA receives plural arriving waves that simultaneously impinge at various angles. Some of the plural arriving waves may be arriving waves which have been radiated from the transmission antenna of the same onboard radar system 510 and reflected by a target(s). Furthermore, some of the plural arriving waves may be direct or indirect arriving waves that have been radiated from other vehicles.

The incident angle of each arriving wave (i.e., an angle representing its direction of arrival) is an angle with respect to the broadside B of the array antenna AA. The incident angle of an arriving wave represents an angle with respect to a direction which is perpendicular to the direction of the line along which antenna elements are arrayed.

Now, consider a $k^{th}$ arriving wave. Where K arriving waves are impinging on the array antenna from K targets existing at different azimuths, a "$k^{th}$ arriving wave" means an arriving wave which is identified by an incident angle $\theta_k$.

FIG. 27B shows the array antenna AA receiving the $k^{th}$ arriving wave. The signals received by the array antenna AA can be expressed as a "vector" having M elements, by Math. 1.

$$S=[s_1, s_2, \ldots, s_m]^T \quad \text{(Math. 1)}$$

In the above, $s_m$ (where m is an integer from 1 to M; the same will also be true hereinbelow) is the value of a signal which is received by an $m^{th}$ antenna element. The superscript $T$ means transposition. S is a column vector. The column vector S is defined by a product of multiplication between a direction vector (referred to as a steering vector or a mode vector) as determined by the construction of the array antenna and a complex vector representing a signal from each target (also referred to as a wave source or a signal source). When the number of wave sources is K, the waves of signals arriving at each individual antenna element from the respective K wave sources are linearly superposed. In this state, $s_m$ can be expressed by Math. 2.

$$s_m = \sum_{k=1}^{K} a_k \exp\left\{j\left(\frac{2\pi}{\lambda} d_m \sin\theta_k + \varphi_k\right)\right\} \quad [\text{Math. 2}]$$

In Math. 2, $a_k$, $\theta_k$ and $\varphi_k$ respectively denote the amplitude, incident angle, and initial phase of the $k^{th}$ arriving wave. Moreover, λ denotes the wavelength of an arriving wave, and j is an imaginary unit.

As will be understood from Math. 2, $s_m$ is expressed as a complex number consisting of a real part (Re) and an imaginary part (Im).

When this is further generalized by taking noise (internal noise or thermal noise) into consideration, the array reception signal X can be expressed as Math. 3.

$$X=S+N \quad \text{(Math. 3)}$$

N is a vector expression of noise.

The signal processing circuit generates a spatial covariance matrix Rxx (Math. 4) of arriving waves by using the array reception signal X expressed by Math. 3, and further determines eigenvalues of the spatial covariance matrix Rxx.

$$R_{xx} = XX^H = \begin{bmatrix} Rxx_{11} & \cdots & Rxx_{1M} \\ \vdots & \ddots & \vdots \\ Rxx_{M1} & \cdots & Rxx_{MM} \end{bmatrix} \quad [\text{Math. 4}]$$

In the above, the superscript $H$ means complex conjugate transposition (Hermitian conjugate).

Among the eigenvalues, the number of eigenvalues which have values equal to or greater than a predetermined value that is defined based on thermal noise (signal space eigenvalues) corresponds to the number of arriving waves. Then, angles that produce the highest likelihood as to the directions of arrival of reflected waves (i.e. maximum likelihood) are calculated, whereby the number of targets and the angles at which the respective targets are present can be identified. This process is known as a maximum likelihood estimation technique.

Next, see FIG. 28. FIG. 28 is a block diagram showing an exemplary fundamental construction of a vehicle travel controlling apparatus 600 according to the present disclosure. The vehicle travel controlling apparatus 600 shown in FIG. 28 includes a radar system 510 which is mounted in a vehicle, and a travel assistance electronic control apparatus 520 which is connected to the radar system 510. The radar system 510 includes an array antenna AA and a radar signal processing apparatus 530.

The array antenna AA includes a plurality of antenna elements, each of which outputs a reception signal in response to one or plural arriving waves. As mentioned earlier, the array antenna AA is capable of radiating a millimeter wave of a high frequency. Note that, without being limited to the array antenna according to Embodiment 2, the array antenna AA may be any other array antenna that suitably performs reception.

In the radar system 510, the array antenna AA needs to be attached to the vehicle, while at least some of the functions of the radar signal processing apparatus 530 may be implemented by a computer 550 and a database 552 which are provided externally to the vehicle travel controlling apparatus 600 (e.g., outside of the driver's vehicle). In that case, the portions of the radar signal processing apparatus 530 that are located within the vehicle may be perpetually or occasionally connected to the computer 550 and database 552 external to the vehicle so that bidirectional communications of signal or data are possible. The communications are to be performed via a communication device 540 of the vehicle and a commonly-available communications network.

The database 552 may store a program which defines various signal processing algorithms. The content of the data and program needed for the operation of the radar system 510 may be externally updated via the communication device 540. Thus, at least some of the functions of the radar system 510 can be realized externally to the driver's vehicle (which is inclusive of the interior of another vehicle), by a cloud computing technique. Therefore, an "onboard" radar system in the meaning of the present disclosure does not require that all of its constituent elements be mounted within the (driver's) vehicle. However, for simplicity, the present application will describe an implementation in which all constituent elements according to the present disclosure are mounted in a single vehicle (i.e., the driver's vehicle), unless otherwise specified.

The radar signal processing apparatus 530 includes a signal processing circuit 560. The signal processing circuit 560 directly or indirectly receives reception signals from the array antenna AA, and inputs the reception signals, or a secondary signal(s) which has been generated from the reception signals, to an arriving wave estimation unit AU. A part or a whole of the circuit (not shown) which generates a secondary signal(s) from the reception signals does not need to be provided inside of the signal processing circuit 560. A part or a whole of such a circuit (preprocessing circuit) may be provided between the array antenna AA and the radar signal processing apparatus 530.

The signal processing circuit 560 is configured to perform computation by using the reception signals or secondary signal(s), and output a signal indicating the number of arriving waves. As used herein, a "signal indicating the number of arriving waves" can be said to be a signal indicating the number of preceding vehicles (which may be one preceding vehicle or plural preceding vehicles) ahead of the driver's vehicle.

The signal processing circuit 560 may be configured to execute various signal processing which is executable by known radar signal processing apparatuses. For example, the signal processing circuit 560 may be configured to execute "super-resolution algorithms" such as the MUSIC method, the ESPRIT method, or the SAGE method, or other algorithms for direction-of-arrival estimation of relatively low resolution.

The arriving wave estimation unit AU shown in FIG. 28 estimates an angle representing the azimuth of each arriving wave by an arbitrary algorithm for direction-of-arrival estimation, and outputs a signal indicating the estimation result. The signal processing circuit 560 estimates the distance to each target as a wave source of an arriving wave, the relative velocity of the target, and the azimuth of the target by using a known algorithm which is executed by the arriving wave estimation unit AU, and output a signal indicating the estimation result.

In the present disclosure, the term "signal processing circuit" is not limited to a single circuit, but encompasses any implementation in which a combination of plural circuits is conceptually regarded as a single functional part. The signal processing circuit 560 may be realized by one or more System-on-Chips (SoCs). For example, a part or a whole of the signal processing circuit 560 may be an FPGA (Field-Programmable Gate Array), which is a programmable logic device (PLD). In that case, the signal processing circuit 560 includes a plurality of computation elements (e.g., general-purpose logics and multipliers) and a plurality of memory elements (e.g., look-up tables or memory blocks). Alternatively, the signal processing circuit 560 may be a set of a general-purpose processor(s) and a main memory device(s). The signal processing circuit 560 may be a circuit which includes a processor core(s) and a memory device(s). These may function as the signal processing circuit 560.

The travel assistance electronic control apparatus 520 is configured to provide travel assistance for the vehicle based on various signals which are output from the radar signal processing apparatus 530. The travel assistance electronic control apparatus 520 instructs various electronic control units to fulfill predetermined functions, e.g., a function of issuing an alarm to prompt the driver to make a braking operation when the distance to a preceding vehicle (vehicular gap) has become shorter than a predefined value; a function of controlling the brakes; and a function of controlling the accelerator. For example, in the case of an operation mode which performs adaptive cruise control of the driver's vehicle, the travel assistance electronic control apparatus 520 sends predetermined signals to various electronic control units (not shown) and actuators, to maintain the distance of the driver's vehicle to a preceding vehicle at a predefined value, or maintain the traveling velocity of the driver's vehicle at a predefined value.

In the case of the MUSIC method, the signal processing circuit 560 determines eigenvalues of the spatial covariance matrix, and, as a signal indicating the number of arriving waves, outputs a signal indicating the number of those eigenvalues ("signal space eigenvalues") which are greater than a predetermined value (thermal noise power) that is defined based on thermal noise.

Next, see FIG. 29. FIG. 29 is a block diagram showing another exemplary construction for the vehicle travel controlling apparatus 600. The radar system 510 in the vehicle travel controlling apparatus 600 of FIG. 29 includes an array antenna AA, which includes an array antenna that is dedicated to reception only (also referred to as a reception antenna) Rx and an array antenna that is dedicated to transmission only (also referred to as a transmission antenna) Tx; and an object detection apparatus 570.

At least one of the transmission antenna Tx and the reception antenna Rx has the aforementioned waveguide structure. The transmission antenna Tx radiates a transmission wave, which may be a millimeter wave, for example. The reception antenna Rx that is dedicated to reception only outputs a reception signal in response to one or plural arriving waves (e.g., a millimeter wave(s)).

A transmission/reception circuit 580 sends a transmission signal for a transmission wave to the transmission antenna Tx, and performs "preprocessing" for reception signals of reception waves received at the reception antenna Rx. A part or a whole of the preprocessing may be performed by the signal processing circuit 560 in the radar signal processing apparatus 530. A typical example of preprocessing to be performed by the transmission/reception circuit 580 may be generating a beat signal from a reception signal, and converting a reception signal of analog format into a reception signal of digital format.

Note that the radar system according to the present disclosure may, without being limited to the implementation where it is mounted in the driver's vehicle, be used while being fixed on the road or a building.

Next, an example of a more specific construction of the vehicle travel controlling apparatus 600 will be described.

FIG. 30 is a block diagram showing an example of a more specific construction of the vehicle travel controlling apparatus 600. The vehicle travel controlling apparatus 600 shown in FIG. 30 includes a radar system 510 and an onboard camera system 700. The radar system 510 includes an array antenna AA, a transmission/reception circuit 580 which is connected to the array antenna AA, and a signal processing circuit 560.

The onboard camera system 700 includes an onboard camera 710 which is mounted in a vehicle, and an image processing circuit 720 which processes an image or video that is acquired by the onboard camera 710.

The vehicle travel controlling apparatus 600 of this Application Example includes an object detection apparatus 570 which is connected to the array antenna AA and the onboard camera 710, and a travel assistance electronic control apparatus 520 which is connected to the object detection apparatus 570. The object detection apparatus 570 includes a transmission/reception circuit 580 and an image processing circuit 720, in addition to the above-described radar signal processing apparatus 530 (including the signal processing circuit 560). The object detection apparatus 570 detects a target on the road or near the road, by using not only the information which is obtained by the radar system 510 but also the information which is obtained by the image processing circuit 720. For example, while the driver's vehicle is traveling in one of two or more lanes of the same direction, the image processing circuit 720 can distinguish which lane the driver's vehicle is traveling in, and supply that result of distinction to the signal processing circuit 560. When the number and azimuth(s) of preceding vehicles are to be recognized by using a predetermined algorithm for direction-of-arrival estimation (e.g., the MUSIC method), the signal processing circuit 560 is able to provide more reliable information concerning a spatial distribution of preceding vehicles by referring to the information from the image processing circuit 720.

Note that the onboard camera system 700 is an example of a means for identifying which lane the driver's vehicle is traveling in. The lane position of the driver's vehicle may be identified by any other means. For example, by utilizing an ultra-wide band (UWB) technique, it is possible to identify which one of a plurality of lanes the driver's vehicle is traveling in. It is widely known that the ultra-wide band technique is applicable to position measurement and/or radar. Using the ultra-wide band technique enhances the range resolution of the radar, so that, even when a large number of vehicles exist ahead, each individual target can be detected with distinction, based on differences in distance. This makes it possible to identify distance from a guardrail on the road shoulder, or from the median strip. The width of each lane is predefined based on each country's law or the like. By using such information, it becomes possible to identify where the lane in which the driver's vehicle is currently traveling is. Note that the ultra-wide band technique is an example. A radio wave based on any other wireless technique may be used. Moreover, LIDAR (Light Detection and Ranging) may be used together with a radar. LIDAR is sometimes called "laser radar".

The array antenna AA may be a generic millimeter wave array antenna for onboard use. The transmission antenna Tx in this Application Example radiates a millimeter wave as a transmission wave ahead of the vehicle. A portion of the transmission wave is reflected off a target which is typically a preceding vehicle, whereby a reflected wave occurs from the target being a wave source. A portion of the reflected wave reaches the array antenna (reception antenna) AA as an arriving wave. Each of the plurality of antenna elements of the array antenna AA outputs a reception signal in response to one or plural arriving waves. In the case where the number of targets functioning as wave sources of reflected waves is K (where K is an integer of one or more), the number of arriving waves is K, but this number K of arriving waves is not known beforehand.

The example of FIG. 28 assumes that the radar system 510 is provided as an integral piece, including the array antenna AA, on the rearview mirror. However, the number and positions of array antennas AA are not limited to any specific number or specific positions. An array antenna AA may be disposed on the rear surface of the vehicle so as to be able to detect targets that are behind the vehicle. Moreover, a plurality of array antennas AA may be disposed on the front surface and the rear surface of the vehicle. The array antenna(s) AA may be disposed inside the vehicle. Even in the case where a horn antenna whose respective antenna elements include horns as mentioned above is to be adopted as the array antenna(s) AA, the array antenna(s) with such antenna elements may be situated inside the vehicle.

The signal processing circuit 560 receives and processes the reception signals which have been received by the reception antenna Rx and subjected to preprocessing by the transmission/reception circuit 580. This process encompasses inputting the reception signals to the arriving wave estimation unit AU, or alternatively, generating a secondary signal(s) from the reception signals and inputting the secondary signal(s) to the arriving wave estimation unit AU.

In the example of FIG. 30, a selection circuit 596 which receives the signal being output from the signal processing circuit 560 and the signal being output from the image processing circuit 720 is provided in the object detection apparatus 570. The selection circuit 596 allows one or both of the signal being output from the signal processing circuit 560 and the signal being output from the image processing circuit 720 to be fed to the travel assistance electronic control apparatus 520.

FIG. 31 is a block diagram showing a more detailed exemplary construction of the radar system 510 according to this Application Example.

As shown in FIG. 31, the array antenna AA includes a transmission antenna Tx which transmits a millimeter wave and reception antennas Rx which receive arriving waves reflected from targets. Although only one transmission antenna Tx is illustrated in the figure, two or more kinds of transmission antennas with different characteristics may be provided. The array antenna AA includes M antenna elements $11_1$, $11_2$, ..., $11_M$ (where M is an integer of 3 or more). In response to the arriving waves, the plurality of antenna elements $11_1$, $11_2$, ..., $11_M$ respectively output reception signals $s_1$, $s_2$, ..., $s_M$ (FIG. 27B).

In the array antenna AA, the antenna elements $11_1$ to $11_M$ are arranged in a linear array or a two-dimensional array at fixed intervals, for example. Each arriving wave will impinge on the array antenna AA from a direction at an angle θ with respect to the normal of the plane in which the antenna elements $11_1$ to $11_M$ are arrayed. Thus, the direction of arrival of an arriving wave is defined by this angle θ.

When an arriving wave from one target impinges on the array antenna AA, this approximates to a plane wave impinging on the antenna elements $11_1$ to $11_M$ from azimuths of the same angle θ. When K arriving waves impinge on the array antenna AA from K targets with different azimuths, the individual arriving waves can be identified in terms of respectively different angles $θ_1$ to $θ_K$.

As shown in FIG. 31, the object detection apparatus 570 includes the transmission/reception circuit 580 and the signal processing circuit 560.

The transmission/reception circuit 580 includes a triangular wave generation circuit 581, a VCO (voltage controlled oscillator) 582, a distributor 583, mixers 584, filters 585, a switch 586, an A/D converter 587, and a controller 588. Although the radar system in this Application Example is configured to perform transmission and reception of millimeter waves by the FMCW method, the radar system of the present disclosure is not limited to this method. The transmission/reception circuit 580 is configured to generate a beat signal based on a reception signal from the array antenna AA and a transmission signal from the transmission antenna Tx.

The signal processing circuit 560 includes a distance detection section 533, a velocity detection section 534, and an azimuth detection section 536. The signal processing circuit 560 is configured to process a signal from the A/D converter 587 in the transmission/reception circuit 580, and output signals respectively indicating the detected distance to the target, the relative velocity of the target, and the azimuth of the target.

First, the construction and operation of the transmission/reception circuit 580 will be described in detail.

The triangular wave generation circuit 581 generates a triangular wave signal, and supplies it to the VCO 582. The VCO 582 outputs a transmission signal having a frequency as modulated based on the triangular wave signal. FIG. 32 is a diagram showing change in frequency of a transmission signal which is modulated based on the signal that is generated by the triangular wave generation circuit 581. This waveform has a modulation width Δf and a center frequency of f0. The transmission signal having a thus modulated frequency is supplied to the distributor 583. The distributor 583 allows the transmission signal obtained from the VCO 582 to be distributed among the mixers 584 and the transmission antenna Tx. Thus, the transmission antenna radiates a millimeter wave having a frequency which is modulated in triangular waves, as shown in FIG. 32.

In addition to the transmission signal, FIG. 32 also shows an example of a reception signal from an arriving wave which is reflected from a single preceding vehicle. The reception signal is delayed from the transmission signal. This delay is in proportion to the distance between the driver's vehicle and the preceding vehicle. Moreover, the frequency of the reception signal increases or decreases in accordance with the relative velocity of the preceding vehicle, due to the Doppler effect.

When the reception signal and the transmission signal are mixed, a beat signal is generated based on their frequency difference. The frequency of this beat signal (beat frequency) differs between a period in which the transmission signal increases in frequency (ascent) and a period in which the transmission signal decreases in frequency (descent). Once a beat frequency for each period is determined, based on such beat frequencies, the distance to the target and the relative velocity of the target are calculated.

FIG. 33 shows a beat frequency fu in an "ascent" period and a beat frequency fd in a "descent" period. In the graph of FIG. 33, the horizontal axis represents frequency, and the vertical axis represents signal intensity. This graph is obtained by subjecting the beat signal to time-frequency conversion. Once the beat frequencies fu and fd are obtained, based on a known equation, the distance to the target and the relative velocity of the target are calculated. In this Application Example, with the construction and operation described below, beat frequencies corresponding to each antenna element of the array antenna AA are obtained, thus enabling estimation of the position information of a target.

In the example shown in FIG. 31, reception signals from channels $Ch_1$ to $Ch_M$ corresponding to the respective antenna elements $11_1$ to $11_M$ are each amplified by an amplifier, and input to the corresponding mixers 584. Each mixer 584 mixes the transmission signal into the amplified reception signal. Through this mixing, a beat signal is generated corresponding to the frequency difference between the reception signal and the transmission signal. The generated beat signal is fed to the corresponding filter 585. The filters 585 apply bandwidth control to the beat signals on the channels $Ch_1$ to $Ch_M$, and supply bandwidth-controlled beat signals to the switch 586.

The switch 586 performs switching in response to a sampling signal which is input from the controller 588. The controller 588 may be composed of a microcomputer, for example. Based on a computer program which is stored in a memory such as a ROM, the controller 588 controls the entire transmission/reception circuit 580. The controller 588 does not need to be provided inside the transmission/reception circuit 580, but may be provided inside the signal processing circuit 560. In other words, the transmission/reception circuit 580 may operate in accordance with a control signal from the signal processing circuit 560. Alternatively, some or all of the functions of the controller 588 may be realized by a central processing unit which controls the entire transmission/reception circuit 580 and signal processing circuit 560.

The beat signals on the channels $Ch_1$ to $Ch_M$ having passed through the respective filters 585 are consecutively supplied to the A/D converter 587 via the switch 586. In synchronization with the sampling signal, the A/D converter 587 converts the beat signals on the channels $Ch_1$ to $Ch_M$, which are input from the switch 586, into digital signals.

Hereinafter, the construction and operation of the signal processing circuit 560 will be described in detail. In this Application Example, the distance to the target and the relative velocity of the target are estimated by the FMCW method. Without being limited to the FMCW method as described below, the radar system can also be implemented by using other methods, e.g., 2 frequency CW and spread spectrum methods.

In the example shown in FIG. 31, the signal processing circuit 560 includes a memory 531, a reception intensity calculation section 532, a distance detection section 533, a velocity detection section 534, a DBF (digital beam forming) processing section 535, an azimuth detection section 536, a target link processing section 537, a matrix generation section 538, a target output processing section 539, and an arriving wave estimation unit AU. As mentioned earlier, a part or a whole of the signal processing circuit 560 may be implemented by FPGA, or by a set of a general-purpose processor(s) and a main memory device(s). The memory 531, the reception intensity calculation section 532, the DBF processing section 535, the distance detection section 533, the velocity detection section 534, the azimuth detection section 536, the target link processing section 537, and the arriving wave estimation unit AU may be individual parts that are implemented in distinct pieces of hardware, or functional blocks of a single signal processing circuit.

FIG. 34 shows an exemplary implementation in which the signal processing circuit 560 is implemented in hardware including a processor PR and a memory device MD. In the signal processing circuit 560 with this construction, too, a computer program that is stored in the memory device MD may fulfill the functions of the reception intensity calculation section 532, the DBF processing section 535, the distance detection section 533, the velocity detection section 534, the azimuth detection section 536, the target link processing section 537, the matrix generation section 538, and the arriving wave estimation unit AU shown in FIG. 31.

The signal processing circuit 560 in this Application Example is configured to estimate the position information of a preceding vehicle by using each beat signal converted into a digital signal as a secondary signal of the reception signal, and output a signal indicating the estimation result. Hereinafter, the construction and operation of the signal processing circuit 560 in this Application Example will be described in detail.

For each of the channels $Ch_1$ to $Ch_M$, the memory 531 in the signal processing circuit 560 stores a digital signal which is output from the A/D converter 587. The memory 531 may be composed of a generic storage medium such as a semiconductor memory or a hard disk and/or an optical disk.

The reception intensity calculation section 532 applies Fourier transform to the respective beat signals for the channels $Ch_1$ to $Ch_M$ (shown in the lower graph of FIG. 32) that are stored in the memory 531. In the present specification, the amplitude of a piece of complex number data after the Fourier transform is referred to as "signal intensity". The reception intensity calculation section 532 converts the complex number data of a reception signal from one of the plurality of antenna elements, or a sum of the complex number data of all reception signals from the plurality of antenna elements, into a frequency spectrum. In the resultant spectrum, beat frequencies corresponding to respective peak values, which are indicative of presence and distance of targets (preceding vehicles), can be detected. Taking a sum of the complex number data of the reception signals from all antenna elements will allow the noise components to average out, whereby the S/N ratio is improved.

In the case where there is one target, i.e., one preceding vehicle, as shown in FIG. 33, the Fourier transform will produce a spectrum having one peak value in a period of increasing frequency (the "ascent" period) and one peak value in a period of decreasing frequency ("the descent" period). The beat frequency of the peak value in the "ascent" period is denoted by "fu", whereas the beat frequency of the peak value in the "descent" period is denoted by "fd".

From the signal intensities of beat frequencies, the reception intensity calculation section 532 detects any signal intensity that exceeds a predefined value (threshold value), thus determining the presence of a target. Upon detecting a signal intensity peak, the reception intensity calculation section 532 outputs the beat frequencies (fu, fd) of the peak values to the distance detection section 533 and the velocity detection section 534 as the frequencies of the object of interest. The reception intensity calculation section 532 outputs information indicating the frequency modulation width $\Delta f$ to the distance detection section 533, and outputs information indicating the center frequency f0 to the velocity detection section 534.

In the case where signal intensity peaks corresponding to plural targets are detected, the reception intensity calculation section 532 find associations between the ascents peak values and the descent peak values based on predefined conditions. Peaks which are determined as belonging to signals from the same target are given the same number, and thus are fed to the distance detection section 533 and the velocity detection section 534.

When there are plural targets, after the Fourier transform, as many peaks as there are targets will appear in the ascent portions and the descent portions of the beat signal. In proportion to the distance between the radar and a target, the reception signal will become more delayed and the reception signal in FIG. 32 will shift more toward the right. Therefore, a beat signal will have a greater frequency as the distant between the target and the radar increases.

Based on the beat frequencies fu and fd which are input from the reception intensity calculation section 532, the distance detection section 533 calculates a distance R through the equation below, and supplies it to the target link processing section 537.

$$R=\{c\cdot T/(2\cdot \Delta f)\}\cdot \{(fu+fd)/2\}$$

Moreover, based on the beat frequencies fu and fd being input from the reception intensity calculation section 532, the velocity detection section 534 calculates a relative velocity V through the equation below, and supplies it to the target link processing section 537.

$$V=\{c/(2\cdot f0)\}\cdot \{(fu-fd)/2\}$$

In the equation which calculates the distance R and the relative velocity V, c is velocity of light, and T is the modulation period.

Note that the lower limit resolution of distance R is expressed as $c/(2\Delta f)$. Therefore, as $\Delta f$ increases, the resolution of distance R increases. In the case where the frequency f0 is in the 76 GHz band, when $\Delta f$ is set on the order of 660 megahertz (MHz), the resolution of distance R will be on the order of 0.23 meters (m), for example. Therefore, if two preceding vehicles are traveling abreast of each other, it may be difficult with the FMCW method to identify whether there is one vehicle or two vehicles. In such a case, it might be possible to run an algorithm for direction-of-arrival estimation that has an extremely high angular resolution to separate between the azimuths of the two preceding vehicles and enable detection.

By utilizing phase differences between signals from the antenna elements $11_1, 11_2, \ldots, 11_M$, the DBF processing section 535 allows the incoming complex data corresponding to the respective antenna elements, which has been Fourier transformed with respect to the time axis, to be Fourier transformed with respect to the direction in which the antenna elements are arrayed. Then, the DBF processing section 535 calculates spatial complex number data indicating the spectrum intensity for each angular channel as determined by the angular resolution, and outputs it to the azimuth detection section 536 for the respective beat frequencies.

The azimuth detection section 536 is provided for the purpose of estimating the azimuth of a preceding vehicle. Among the values of spatial complex number data that has been calculated for the respective beat frequencies, the azimuth detection section 536 chooses an angle θ that takes the largest value, and outputs it to the target link processing section 537 as the azimuth at which an object of interest exists.

Note that the method of estimating the angle θ indicating the direction of arrival of an arriving wave is not limited to this example. Various algorithms for direction-of-arrival estimation that have been mentioned earlier can be employed.

The target link processing section 537 calculates absolute values of the differences between the respective values of distance, relative velocity, and azimuth of the object of interest as calculated in the current cycle and the respective values of distance, relative velocity, and azimuth of the object of interest as calculated 1 cycle before, which are read from the memory 531. Then, if the absolute value of each difference is smaller than a value which is defined for the respective value, the target link processing section 537 determines that the target that was detected 1 cycle before and the target detected in the current cycle are an identical target. In that case, the target link processing section 537 increments the count of target link processes, which is read from the memory 531, by one.

If the absolute value of a difference is greater than predetermined, the target link processing section 537 determines that a new object of interest has been detected. The target link processing section 537 stores the respective values of distance, relative velocity, and azimuth of the object of interest as calculated in the current cycle and also the count of target link processes for that object of interest to the memory 531.

In the signal processing circuit 560, the distance to the object of interest and its relative velocity can be detected by using a spectrum which is obtained through a frequency analysis of beat signals, which are signals generated based on received reflected waves.

The matrix generation section 538 generates a spatial covariance matrix by using the respective beat signals for the channels $Ch_1$ to $Ch_M$ (lower graph in FIG. 32) stored in the memory 531. In the spatial covariance matrix of Math. 4, each component is the value of a beat signal which is expressed in terms of real and imaginary parts. The matrix generation section 538 further determines eigenvalues of the spatial covariance matrix Rxx, and inputs the resultant eigenvalue information to the arriving wave estimation unit AU.

When a plurality of signal intensity peaks corresponding to plural objects of interest have been detected, the reception intensity calculation section 532 numbers the peak values respectively in the ascent portion and in the descent portion, beginning from those with smaller frequencies first, and output them to the target output processing section 539. In the ascent and descent portions, peaks of any identical number correspond to the same object of interest. The identification numbers are to be regarded as the numbers assigned to the objects of interest. For simplicity of illustration, a leader line from the reception intensity calculation section 532 to the target output processing section 539 is conveniently omitted from FIG. 31.

When the object of interest is a structure ahead, the target output processing section 539 outputs the identification number of that object of interest as indicating a target. When receiving results of determination concerning plural objects of interest, such that all of them are structures ahead, the target output processing section 539 outputs the identification number of an object of interest that is in the lane of the driver's vehicle as the object position information indicating where a target is. Moreover, When receiving results of determination concerning plural objects of interest, such that all of them are structures ahead and that two or more objects of interest are in the lane of the driver's vehicle, the target output processing section 539 outputs the identification number of an object of interest that is associated with the largest count of target being read from the link processes memory 531 as the object position information indicating where a target is.

Referring back to FIG. 30, an example where the onboard radar system 510 is incorporated in the exemplary construction shown in FIG. 30 will be described. The image processing circuit 720 acquires information of an object from the video, and detects target position information from the object information. For example, the image processing circuit 720 is configured to estimate distance information of an object by detecting the depth value of an object within an acquired video, or detect size information and the like of an object from characteristic amounts in the video, thus detecting position information of the object.

The selection circuit 596 selectively feeds position information which is received from the signal processing circuit 560 or the image processing circuit 720 to the travel assistance electronic control apparatus 520. For example, the selection circuit 596 compares a first distance, i.e., the distance from the driver's vehicle to a detected object as contained in the object position information from the signal processing circuit 560, against a second distance, i.e., the distance from the driver's vehicle to the detected object as contained in the object position information from the image processing circuit 720, and determines which is closer to the driver's vehicle. For example, based on the result of determination, the selection circuit 596 may select the object position information which indicates a closer distance to the driver's vehicle, and output it to the travel assistance electronic control apparatus 520. If the result of determination indicates the first distance and the second distance to be of the same value, the selection circuit 596 may output either one, or both of them, to the travel assistance electronic control apparatus 520.

If information indicating that there is no prospective target is input from the reception intensity calculation section 532, the target output processing section 539 (FIG. 31) outputs zero, indicating that there is no target, as the object position information. Then, on the basis of the object position information from the target output processing section 539, through comparison against a predefined threshold value, the selection circuit 596 chooses either the object position information from the signal processing circuit 560 or the object position information from the image processing circuit 720 to be used.

Based on predefined conditions, the travel assistance electronic control apparatus 520 having received the position information of a preceding object from the object detection apparatus 570 performs control to make the operation safer or easier for the driver who is driving the driver's vehicle, in accordance with the distance and size indicated by the object position information, the velocity of the driver's vehicle, road surface conditions such as rainfall, snowfall or clear weather, or other conditions. For example, if the object position information indicates that no object has been detected, the travel assistance electronic control apparatus 520 may send a control signal to an accelerator control circuit 526 to increase speed up to a predefined velocity, thereby controlling the accelerator control circuit 526 to make an operation that is equivalent to stepping on the accelerator pedal.

In the case where the object position information indicates that an object has been detected, if it is found to be at a predetermined distance from the driver's vehicle, the travel assistance electronic control apparatus 520 controls the brakes via a brake control circuit 524 through a brake-by-wire construction or the like. In other words, it makes an operation of decreasing the velocity to maintain a constant vehicular gap. Upon receiving the object position information, the travel assistance electronic control apparatus 520 sends a control signal to an alarm control circuit 522 so as to control lamp illumination or control audio through a loudspeaker which is provided within the vehicle, so that the driver is informed of the nearing of a preceding object. Upon receiving object position information including a spatial distribution of preceding vehicles, the travel assistance electronic control apparatus 520 may, if the traveling velocity is within a predefined range, automatically make the steering wheel easier to operate to the right or left, or control the hydraulic pressure on the steering wheel side so as to force a change in the direction of the wheels, thereby providing assistance in collision avoidance with respect to the preceding object.

The object detection apparatus 570 may be arranged so that, if a piece of object position information which was being continuously detected by the selection circuit 596 for a while in the previous detection cycle but which is not detected in the current detection cycle becomes associated with a piece of object position information from a camera-detected video indicating a preceding object, then continued tracking is chosen, and object position information from the signal processing circuit 560 is output with priority.

An exemplary specific construction and an exemplary operation for the selection circuit 596 to make a selection between the outputs from the signal processing circuit 560 and the image processing circuit 720 are disclosed in the specification of U.S. Pat. No. 8,446,312, the specification of U.S. Pat. No. 8,730,096, and the specification of U.S. Pat. No. 8,730,099. The entire disclosure thereof is incorporated herein by reference.

[First Variant]

In the radar system for onboard use of the above Application Example, the (sweep) condition for a single instance of FMCW (Frequency Modulated Continuous Wave) frequency modulation, i.e., a time span required for such a modulation (sweep time), is e.g. 1 millisecond, although the sweep time could be shortened to about 100 microseconds.

However, in order to realize such a rapid sweep condition, not only the constituent elements involved in the radiation of a transmission wave, but also the constituent elements involved in the reception under that sweep condition must also be able to rapidly operate. For example, an A/D converter 587 (FIG. 31) which rapidly operates under that sweep condition will be needed. The sampling frequency of the A/D converter 587 may be 10 MHz, for example. The sampling frequency may be faster than 10 MHz.

In the present variant, a relative velocity with respect to a target is calculated without utilizing any Doppler shift-based frequency component. In this variant, the sweep time is Tm=100 microseconds, which is very short. The lowest frequency of a detectable beat signal, which is 1/Tm, equals 10 kHz in this case. This would correspond to a Doppler shift of a reflected wave from a target which has a relative velocity of approximately 20 m/second. In other words, so long as one relies on a Doppler shift, it would be impossible to detect relative velocities that are equal to or smaller than this. Thus, a method of calculation which is different from a Doppler shift-based method of calculation is preferably adopted.

As an example, this variant illustrates a process that utilizes a signal (upbeat signal) representing a difference between a transmission wave and a reception wave which is obtained in an upbeat (ascent) portion where the transmission wave increases in frequency. A single sweep time of FMCW is 100 microseconds, and its waveform is a sawtooth shape which is composed only of an upbeat portion. In other words, in this variant, the signal wave which is generated by the triangular wave/CW wave generation circuit 581 has a sawtooth shape. The sweep width in frequency is 500 MHz. Since no peaks are to be utilized that are associated with Doppler shifts, the process is not one that generates an upbeat signal and a downbeat signal to utilize the peaks of both, but will rely on only one of such signals. Although a case of utilizing an upbeat signal will be illustrated herein, a similar process can also be performed by using a downbeat signal.

The A/D converter 587 (FIG. 31) samples each upbeat signal at a sampling frequency of 10 MHz, and outputs several hundred pieces of digital data (hereinafter referred to as "sampling data"). The sampling data is generated based on upbeat signals after a point in time where a reception wave is obtained and until a point in time at which a transmission wave completes transmission, for example. Note that the process may be ended as soon as a certain number of pieces of sampling data are obtained.

In this variant, 128 upbeat signals are transmitted/received in series, for each of which some several hundred pieces of sampling data are obtained. The number of upbeat signals is not limited to 128. It may be 256, or 8. An arbitrary number may be selected depending on the purpose.

The resultant sampling data is stored to the memory 531. The reception intensity calculation section 532 applies a two-dimensional fast Fourier transform (FFT) to the sampling data. Specifically, first, for each of the sampling data pieces that have been obtained through a single sweep, a first FFT process (frequency analysis process) is performed to generate a power spectrum. Next, the velocity detection section 534 performs a second FFT process for the processing results that have been collected from all sweeps.

When the reflected waves are from the same target, peak components in the power spectrum to be detected in each sweep period will be of the same frequency. On the other hand, for different targets, the peak components will differ in frequency. Through the first FFT process, plural targets that are located at different distances can be separated.

In the case where a relative velocity with respect to a target is non-zero, the phase of the upbeat signal changes slightly from sweep to sweep. In other words, through the second FFT process, a power spectrum whose elements are the data of frequency components that are associated with such phase changes will be obtained for the respective results of the first FFT process.

The reception intensity calculation section 532 extracts peak values in the second power spectrum above, and sends them to the velocity detection section 534.

The velocity detection section 534 determines a relative velocity from the phase changes. For example, suppose that a series of obtained upbeat signals undergo phase changes by every phase θ [RXd]. Assuming that the transmission wave has an average wavelength λ, this means there is a $\lambda/(4\pi/\theta)$ change in distance every time an upbeat signal is obtained. Since this change has occurred over an interval of upbeat signal transmission Tm (=100 microseconds), the relative velocity is determined to be $\{\lambda/(4\pi/\theta)\}/Tm$.

Through the above processes, a relative velocity with respect to a target as well as a distance from the target can be obtained.

[Second Variant]

The radar system 510 is able to detect a target by using a continuous wave(s) CW of one or plural frequencies. This method is especially useful in an environment where a multitude of reflected waves impinge on the radar system 510 from still objects in the surroundings, e.g., when the vehicle is in a tunnel.

The radar system 510 has an antenna array for reception purposes, including five channels of independent reception elements. In such a radar system, the azimuth-of-arrival estimation for incident reflected waves is only possible if there are four or fewer reflected waves that are simultaneously incident. In an FMCW-type radar, the number of reflected waves to be simultaneously subjected to an azimuth-of-arrival estimation can be reduced by exclusively selecting reflected waves from a specific distance. However, in an environment where a large number of still objects exist in the surroundings, e.g., in a tunnel, it is as if there were a continuum of objects to reflect radio waves; therefore, even if one narrows down on the reflected waves based on distance, the number of reflected waves may still not be equal to or smaller than four. However, any such still object in the surroundings will have an identical relative velocity with respect to the driver's vehicle, and the relative velocity will be greater than that associated with any other vehicle that is traveling ahead. On this basis, such still objects can be distinguished from any other vehicle based on the magnitudes of Doppler shifts.

Therefore, the radar system 510 performs a process of: radiating continuous waves CW of plural frequencies; and, while ignoring Doppler shift peaks that correspond to still objects in the reception signals, detecting a distance by using a Doppler shift peak(s) of any smaller shift amount(s). Unlike in the FMCW method, in the CW method, a frequency difference between a transmission wave and a reception wave is ascribable only to a Doppler shift. In other words, any peak frequency that appears in a beat signal is ascribable only to a Doppler shift.

In the description of this variant, too, a continuous wave to be used in the CW method will be referred to as a "continuous wave CW". As described above, a continuous wave CW has a constant frequency; that is, it is unmodulated.

Suppose that the radar system 510 has radiated a continuous wave CW of a frequency fp, and detected a reflected wave of a frequency fq that has been reflected off a target. The difference between the transmission frequency fp and the reception frequency fq is called a Doppler frequency, which approximates to $fp-fq=2 \cdot Vr \cdot fp/c$. Herein, Vr is a relative velocity between the radar system and the target, and c is the velocity of light. The transmission frequency fp, the Doppler frequency (fp−fq), and the velocity of light c are known. Therefore, from this equation, the relative velocity $Vr=(fp-fq) \cdot c/2fp$ can be determined. The distance to the target is calculated by utilizing phase information as will be described later.

In order to detect a distance to a target by using continuous waves CW, a 2 frequency CW method is adopted. In the 2 frequency CW method, continuous waves CW of two frequencies which are slightly apart are radiated each for a certain period, and their respective reflected waves are acquired. For example, in the case of using frequencies in the 76 GHz band, the difference between the two frequencies would be several hundred kHz. As will be described later, it is more preferable to determine the difference between the two frequencies while taking into account the minimum distance at which the radar used is able to detect a target.

Suppose that the radar system 510 has sequentially radiated continuous waves CW of frequencies fp1 and fp2 (fp1<fp2), and that the two continuous waves CW have been reflected off a single target, resulting in reflected waves of frequencies fq1 and fq2 being received by the radar system 510.

Based on the continuous wave CW of the frequency fp1 and the reflected wave (frequency fq1) thereof, a first Doppler frequency is obtained. Based on the continuous wave CW of the frequency fp2 and the reflected wave (frequency fq2) thereof, a second Doppler frequency is obtained. The two Doppler frequencies have substantially the same value. However, due to the difference between the frequencies fp1 and fp2, the complex signals of the respective reception waves differ in phase. By utilizing this phase information, a distance (range) to the target can be calculated.

Specifically, the radar system 510 is able to determine the distance R as $R=c \cdot \Delta\varphi/4\pi(fp2-fp1)$. Herein, $\Delta\varphi$ denotes the phase difference between two beat signals, i.e., beat signal 1 which is obtained as a difference between the continuous wave CW of the frequency fp1 and the reflected wave (frequency fq1) thereof and beat signal 2 which is obtained as a difference between the continuous wave CW of the frequency fp2 and the reflected wave (frequency fq2) thereof. The method of identifying the frequency fb1 of beat signal 1 and the frequency fb2 of beat signal 2 is identical to that in the aforementioned instance of a beat signal from a continuous wave CW of a single frequency.

Note that a relative velocity Vr under the 2 frequency CW method is determined as follows.

$$Vr=fb1 \cdot c/2 \cdot fp1 \text{ or } Vr=fb2 \cdot c/2 \cdot fp2$$

Moreover, the range in which a distance to a target can be uniquely identified is limited to the range defined by Rmax<c/2(fp2−fp1). The reason is that beat signals resulting from a reflected wave from any farther target would produce a $\Delta\varphi$ which is greater than $2\pi$, such that they are indistinguishable from beat signals associated with targets at closer positions. Therefore, it is more preferable to adjust the difference between the frequencies of the two continuous waves CW so that Rmax becomes greater than the minimum detectable distance of the radar. In the case of a radar whose minimum detectable distance is 100 m, fp2−fp1 may be made e.g. 1.0 MHz. In this case, Rmax=150 m, so that a signal from any target from a position beyond Rmax is not detected. In the case of mounting a radar which is capable of detection up to 250 m, fp2−fp1 may be made e.g. 500 kHz. In this case, Rmax=300 m, so that a signal from any target from a position beyond Rmax is not detected, either. In the case where the radar has both of an operation mode in which the minimum detectable distance is 100 m and the horizontal viewing angle is 120 degrees and an operation mode in which the minimum detectable distance is 250 m and the horizontal viewing angle is 5 degrees, it is preferable to switch the fp2−fp1 value be 1.0 MHz and 500 kHz for operation in the respective operation modes.

A detection approach is known which, by transmitting continuous waves CW at N different frequencies (where N is an integer of 3 or more), and utilizing phase information of the respective reflected waves, detects a distance to each target. Under this detection approach, distance can be properly recognized up to N−1 targets. As the processing to enable this, a fast Fourier transform (FFT) is used, for example. Given N=64 or 128, an FFT is performed for sampling data of a beat signal as a difference between a transmission signal and a reception signal for each frequency, thus obtaining a frequency spectrum (relative velocity). Thereafter, at the frequency of the CW wave, a further FFT is performed for peaks of the same frequency, thus to derive distance information.

Hereinafter, this will be described more specifically.

For ease of explanation, first, an instance will be described where signals of three frequencies f1, f2 and f3 are transmitted while being switched over time. It is assumed that f1>f2>f3, and f1−f2=f2−f3=Δf. A transmission time Δt is assumed for the signal wave for each frequency. FIG. 35 shows a relationship between three frequencies f1, f2 and f3.

Via the transmission antenna Tx, the triangular wave/CW wave generation circuit 581 (FIG. 31) transmits continuous waves CW of frequencies f1, f2 and f3, each lasting for the time Δt. The reception antennas Rx receive reflected waves resulting by the respective continuous waves CW being reflected off one or plural targets.

Each mixer 584 mixes a transmission wave and a reception wave to generate a beat signal. The A/D converter 587 converts the beat signal, which is an analog signal, into several hundred pieces of digital data (sampling data), for example.

Using the sampling data, the reception intensity calculation section 532 performs FFT computation. Through the FFT computation, frequency spectrum information of reception signals is obtained for the respective transmission frequencies f1, f2 and f3.

Thereafter, the reception intensity calculation section 532 separates peak values from the frequency spectrum information of the reception signals. The frequency of any peak value which is predetermined or greater is in proportion to a relative velocity with respect to a target. Separating a peak value(s) from the frequency spectrum information of reception signals is synonymous with separating one or plural targets with different relative velocities.

Next, with respect to each of the transmission frequencies f1 to f3, the reception intensity calculation section 532 measures spectrum information of peak values of the same relative velocity or relative velocities within a predefined range.

Now, consider a scenario where two targets A and B exist which have about the same relative velocity but are at respectively different distances. A transmission signal of the frequency f1 will be reflected from both of targets A and B to result in reception signals being obtained. The reflected waves from targets A and B will result in substantially the same beat signal frequency. Therefore, the power spectra at the Doppler frequencies of the reception signals, corresponding to their relative velocities, are obtained as a synthetic spectrum F1 into which the power spectra of two targets A and B have been merged.

Similarly, for each of the frequencies f2 and f3, the power spectra at the Doppler frequencies of the reception signals, corresponding to their relative velocities, are obtained as a synthetic spectrum F1 into which the power spectra of two targets A and B have been merged.

FIG. 36 shows a relationship between synthetic spectra F1 to F3 on a complex plane. In the directions of the two vectors composing each of the synthetic spectra F1 to F3, the right vector corresponds to the power spectrum of a reflected wave from target A; i.e., vectors f1A, f2A and f3A, in FIG. 36. On the other hand, in the directions of the two vectors composing each of the synthetic spectra F1 to F3, the left vector corresponds to the power spectrum of a reflected wave from target B; i.e., vectors f1B, f2B and f3B in FIG. 36.

Under a constant difference Δf between the transmission frequencies, the phase difference between the reception signals corresponding to the respective transmission signals of the frequencies f1 and f2 is in proportion to the distance to a target. Therefore, the phase difference between the vectors f1A and f2A and the phase difference between the vectors f2A and f3A are of the same value θA, this phase difference θA being in proportion to the distance to target A. Similarly, the phase difference between the vectors f1B and f2B and the phase difference between the vectors f2B and f3B are of the same value θB, this phase difference θB being in proportion to the distance to target B.

By using a well-known method, the respective distances to targets A and B can be determined from the synthetic spectra F1 to F3 and the difference Δf between the transmission frequencies. This technique is disclosed in U.S. Pat. No. 6,703,967, for example. The entire disclosure of this publication is incorporated herein by reference.

Similar processing is also applicable when the transmitted signals have four or more frequencies.

Note that, before transmitting continuous wave CWs at N different frequencies, a process of determining the distance to and relative velocity of each target may be performed by the 2 frequency CW method. Then, under predetermined conditions, this process may be switched to a process of transmitting continuous waves CW at N different frequencies. For example, FFT computation may be performed by using the respective beat signals at the two frequencies, and if the power spectrum of each transmission frequency undergoes a change over time of 30% or more, the process may be switched. The amplitude of a reflected wave from each target undergoes a large change over time due to multipath influences and the like. When there exists a change of a predetermined magnitude or greater, it may be considered that plural targets may exist.

Moreover, the CW method is known to be unable to detect a target when the relative velocity between the radar system and the target is zero, i.e., when the Doppler frequency is zero. However, when a pseudo Doppler signal is determined by the following methods, for example, it is possible to detect a target by using that frequency.

(Method 1) A mixer that causes a certain frequency shift in the output of a receiving antenna is added. By using a transmission signal and a reception signal with a shifted frequency, a pseudo Doppler signal can be obtained.

(Method 2) A variable phase shifter to introduce phase changes continuously over time is inserted between the output of a receiving antenna and a mixer, thus adding a pseudo phase difference to the reception signal. By using a transmission signal and a reception signal with an added phase difference, a pseudo Doppler signal can be obtained.

An example of specific construction and operation of inserting a variable phase shifter to generate a pseudo Doppler signal under Method 2 is disclosed in Japanese Laid-Open Patent Publication No. 2004-257848. The entire disclosure of this publication is incorporated herein by reference.

When targets with zero or very little relative velocity need to be detected, the aforementioned processes of generating a pseudo Doppler signal may be adopted, or the process may be switched to a target detection process under the FMCW method.

Next, with reference to FIG. 37, a procedure of processing to be performed by the object detection apparatus 570 of the onboard radar system 510 will be described.

The example below will illustrate a case where continuous waves CW are transmitted at two different frequencies fp1 and fp2 (fp1<fp2), and the phase information of each reflected wave is utilized to respectively detect a distance with respect to a target.

FIG. 37 is a flowchart showing the procedure of a process of determining relative velocity and distance according to this variant.

At step S41, the triangular wave/CW wave generation circuit 581 generates two continuous waves CW of frequencies which are slightly apart, i.e., frequencies fp1 and fp2.

At step S42, the transmission antenna Tx and the reception antennas Rx perform transmission/reception of the generated series of continuous waves CW. Note that the process of step S41 and the process of step S42 are to be performed in parallel fashion respectively by the triangular wave/CW wave generation circuit 581 and the transmission antenna element Tx/reception antenna Rx, rather than step S42 following only after completion of step S41.

At step S43, each mixer 584 generates a difference signal by utilizing each transmission wave and each reception wave, whereby two difference signals are obtained. Each reception wave is inclusive of a reception wave emanating from a still object and a reception wave emanating from a target. Therefore, next, a process of identifying frequencies to be utilized as the beat signals is performed. Note that the process of step S41, the process of step S42, and the process of step S43 are to be performed in parallel fashion by the triangular wave/CW wave generation circuit 581, the transmission antenna Tx/reception antenna Rx, and the mixers 584, rather than step S42 following only after completion of step S41, or step S43 following only after completion of step S42.

At step S44, for each of the two difference signals, the object detection apparatus 570 identifies certain peak frequencies to be frequencies fb1 and fb2 of beat signals, such that these frequencies are equal to or smaller than a frequency which is predefined as a threshold value and yet they have amplitude values which are equal to or greater than a predetermined amplitude value, and that the difference between the two frequencies is equal to or smaller than a predetermined value.

At step S45, based on one of the two beat signal frequencies identified, the reception intensity calculation section 532 detects a relative velocity. The reception intensity calculation section 532 calculates the relative velocity according to Vr=fb1·c/2·fp1, for example. Note that a relative velocity may be calculated by utilizing each of the two beat signal frequencies, which will allow the reception intensity calculation section 532 to verify whether they match or not, thus enhancing the precision of relative velocity calculation.

At step S46, the reception intensity calculation section 532 determines a phase difference $\Delta\varphi$ between two beat signals 1 and 2, and determines a distance R=c·$\Delta\varphi$/4π(fp2−fp1) to the target.

Through the above processes, the relative velocity and distance to a target can be detected.

Note that continuous waves CW may be transmitted at N different frequencies (where N is 3 or more), and by utilizing phase information of the respective reflected wave, distances to plural targets which are of the same relative velocity but at different positions may be detected.

In addition to the radar system 510, the vehicle 500 described above may further include another radar system. For example, the vehicle 500 may further include a radar system having a detection range toward the rear or the sides of the vehicle body. In the case of incorporating a radar system having a detection range toward the rear of the vehicle body, the radar system may monitor the rear, and if there is any danger of having another vehicle bump into the rear, make a response by issuing an alarm, for example. In the case of incorporating a radar system having a detection range toward the sides of the vehicle body, the radar system may monitor an adjacent lane when the driver's vehicle changes its lane, etc., and make a response by issuing an alarm or the like as necessary.

The applications of the above-described radar system 510 are not limited to onboard use only. Rather, the radar system 510 may be used as sensors for various purposes. For example, it may be used as a radar for monitoring the surroundings of a house or any other building. Alternatively, it may be used as a sensor for detecting the presence or absence of a person at a specific indoor place, or whether or not such a person is undergoing any motion, etc., without utilizing any optical images.

[Supplementary Details of Processing]

Other embodiments will be described in connection with the 2 frequency CW or FMCW techniques for array antennas as described above. As described earlier, in the example of FIG. 31, the reception intensity calculation section 532 applies a Fourier transform to the respective beat signals for the channels $Ch_1$ to $Ch_M$ (lower graph in FIG. 32) stored in the memory 531. These beat signals are complex signals, in order that the phase of the signal of computational interest be identified. This allows the direction of an arriving wave to be accurately identified. In this case, however, the computational load for Fourier transform increases, thus calling for a larger-scaled circuit.

In order to solve this problem, a scalar signal may be generated as a beat signal. For each of a plurality of beat signals that have been generated, two complex Fourier transforms may be performed with respect to the spatial axis direction, which conforms to the antenna array, and to the time axis direction, which conforms to the lapse of time, thus to obtain results of frequency analysis. As a result, with only a small amount of computation, beam formation can eventually be achieved so that directions of arrival of reflected waves can be identified, whereby results of frequency analysis can be obtained for the respective beams. As a patent document related to the present disclosure, the entire disclosure of the specification of U.S. Pat. No. 6,339,395 is incorporated herein by reference.

[Optical Sensor, e.g., Camera, and Millimeter Wave Radar]

Next, a comparison between the above-described array antenna and conventional antennas, as well as an exemplary application in which both of the present array antenna and an optical sensor (e.g., a camera) are utilized, will be described. Note that LIDAR or the like may be employed as the optical sensor.

A millimeter wave radar is able to directly detect a distance (range) to a target and a relative velocity thereof. Another characteristic is that its detection performance is not much deteriorated in the nighttime (including dusk), or in bad weather, e.g., rainfall, fog, or snowfall. On the other hand, it is believed that it is not just as easy for a millimeter wave radar to take a two-dimensional grasp of a target as it is for a camera. On the other hand, it is relatively easy for a camera to take a two-dimensional grasp of a target and recognize its shape. However, a camera may not be able to image a target in nighttime or bad weather, which presents a considerable problem. This problem is particularly outstanding when droplets of water have adhered to the portion through which to ensure lighting, or the eyesight is narrowed by a fog. This problem similarly exists for LIDAR or the like, which also pertains to the realm of optical sensors.

In these years, in answer to increasing demand for safer vehicle operation, driver assist systems for preventing collisions or the like are being developed. A driver assist system acquires an image in the direction of vehicle travel with a sensor such as a camera or a millimeter wave radar, and when any obstacle is recognized that is predicted to hinder vehicle travel, brakes or the like are automatically applied to prevent collisions or the like. Such a function of collision avoidance is expected to operate normally, even in nighttime or bad weather.

Hence, driver assist systems of a so-called fusion construction are gaining prevalence, where, in addition to a conventional optical sensor such as a camera, a millimeter wave radar is mounted as a sensor, thus realizing a recognition process that takes advantage of both. Such a driver assist system will be discussed later.

On the other hand, higher and higher functions are being required of the millimeter wave radar itself. A millimeter wave radar for onboard use mainly uses electromagnetic waves of the 76 GHz band. The antenna power of its antenna is restricted to below a certain level under each country's law or the like. For example, it is restricted to 0.01 W or below in Japan. Under such restrictions, a millimeter wave radar for onboard use is expected to satisfy the required performance that, for example, its detection range is 200 m or more; the antenna size is 60 mm×60 mm or less; its horizontal detection angle is 90 degrees or more; its range resolution is 20 cm or less; it is capable of short-range detection within 10 m; and so on. Conventional millimeter wave radars have used microstrip lines as waveguides, and patch antennas as antennas (hereinafter, these will both be referred to as "patch antennas"). However, with a patch antenna, it has been difficult to attain the aforementioned performance.

By using a slot array antenna to which the technique of the present disclosure is applied, the inventors have successfully achieved the aforementioned performance. As a result, a millimeter wave radar has been realized which is smaller in size, more efficient, and higher-performance than are conventional patch antennas and the like. In addition, by combining this millimeter wave radar and an optical sensor such as a camera, a small-sized, highly efficient, and high-performance fusion apparatus has been realized which has existed never before. This will be described in detail below.

FIG. 38 is a diagram concerning a fusion apparatus in a vehicle 500, the fusion apparatus including an onboard camera system 700 and a radar system 510 (hereinafter referred to also as the millimeter wave radar 510) having a slot array antenna to which the technique of the present disclosure is applied. With reference to this figure, various embodiments will be described below.

[Installment of Millimeter Wave Radar within Vehicle Room]

A conventional patch antenna-based millimeter wave radar 510' is placed behind and inward of a grill 512 which is at the front nose of a vehicle. An electromagnetic wave that is radiated from an antenna goes through the apertures in the grill 512, and is radiated ahead of the vehicle 500. In this case, no dielectric layer, e.g., glass, exists that decays or reflects electromagnetic wave energy, in the region through which the electromagnetic wave passes. As a result, an electromagnetic wave that is radiated from the patch antenna-based millimeter wave radar 510' reaches over a long range, e.g., to a target which is 150 m or farther away. By receiving with the antenna the electromagnetic wave reflected therefrom, the millimeter wave radar 510' is able to detect a target. In this case, however, since the antenna is placed behind and inward of the grill 512 of the vehicle, the radar may be broken when the vehicle collides into an obstacle. Moreover, it may be soiled with mud or the like in rain, etc., and the soil that has adhered to the antenna may hinder radiation and reception of electromagnetic waves.

Similarly to the conventional manner, the millimeter wave radar 510 incorporating a slot array antenna according to an embodiment of the present disclosure may be placed behind the grill 512, which is located at the front nose of the vehicle (not shown). This allows the energy of the electromagnetic wave to be radiated from the antenna to be utilized by 100%, thus enabling long-range detection beyond the conventional level, e.g., detection of a target which is at a distance of 250 m or more.

Furthermore, the millimeter wave radar 510 according to an embodiment of the present disclosure can also be placed within the vehicle room, i.e., inside the vehicle. In that case, the millimeter wave radar 510 is placed inward of the windshield 511 of the vehicle, to fit in a space between the windshield 511 and a face of the rearview mirror (not shown) that is opposite to its specular surface. On the other hand, the conventional patch antenna-based millimeter wave radar 510' cannot be placed inside the vehicle room mainly for the two following reasons. A first reason is its large size, which prevents itself from being accommodated within the space between the windshield 511 and the rearview mirror. A second reason is that an electromagnetic wave that is radiated ahead reflects off the windshield 511 and decays due to dielectric loss, thus becoming unable to travel the desired distance. As a result, if a conventional patch antenna-based millimeter wave radar is placed within the vehicle room, only targets which are 100 m ahead or less can be detected, for example. On the other hand, a millimeter wave radar according to an embodiment of the present disclosure is able to detect a target which is at a distance of 200 m or more, despite reflection or decay at the windshield 511. This performance is equivalent to, or even greater than, the case where a conventional patch antenna-based millimeter wave radar is placed outside the vehicle room.

[Fusion Construction Based on Millimeter Wave Radar and Camera, Etc., being Placed within Vehicle Room]

Currently, an optical imaging device such as a CCD camera is used as the main sensor in many a driver assist system (Driver Assist System). Usually, a camera or the like is placed within the vehicle room, inward of the windshield 511, in order to account for unfavorable influences of the external environment, etc. In this context, in order to minimize the optical effect of raindrops and the like, the camera or the like is placed in a region which is swept by the wipers (not shown) but is inward of the windshield 511.

In recent years, due to needs for improved performance of a vehicle in terms of e.g. automatic braking, there has been a desire for automatic braking or the like that is guaranteed to work regardless of whatever external environment may exist. In this case, if the only sensor in the driver assist system is an optical device such as a camera, a problem exists in that reliable operation is not guaranteed in nighttime or bad weather. This has led to the need for a driver assist system that incorporates not only an optical sensor (such as a camera) but also a millimeter wave radar, these being used for cooperative processing, so that reliable operation is achieved even in nighttime or bad weather.

As described earlier, a millimeter wave radar incorporating the present slot array antenna permits itself to be placed within the vehicle room, due to downsizing and remarkable enhancement in the efficiency of the radiated electromagnetic wave over that of a conventional patch antenna. By taking advantage of these properties, as shown in FIG. 38, the millimeter wave radar 510, which incorporates not only an optical sensor (onboard camera system) 700 such as a camera but also a slot array antenna according to the present disclosure, allows both to be placed inward of the windshield 511 of the vehicle 500. This has created the following novel effects.

(1) It is easier to install the driver assist system on the vehicle 500. The conventional patch antenna-based millimeter wave radar 510' has required a space behind the grill 512, which is at the front nose, in order to accommodate the radar. Since this space may include some sites that affect the structural design of the vehicle, if the size of the radar is changed, it may have been necessary to reconsider the structural design. This inconvenience is avoided by placing the millimeter wave radar within the vehicle room.

(2) Free from the influences of rain, nighttime, or other external environment factors to the vehicle, more reliable operation can be achieved. Especially, as shown in FIG. 39, by placing the millimeter wave radar (onboard camera system) 510 and the onboard camera system 700 at substantially the same position within the vehicle room, they can attain an identical field of view and line of sight, thus facilitating the "matching process" which will be described later, i.e., a process through which to establish that respective pieces of target information captured by them actually come from an identical object. On the other hand, if the millimeter wave radar 510' were placed behind the grill 512, which is at the front nose outside the vehicle room, its radar line of sight L would differ from a radar line of sight M of the case where it was placed within the vehicle room, thus resulting in a large offset with the image to be acquired by the onboard camera system 700.

(3) Reliability of the millimeter wave radar is improved. As described above, since the conventional patch antenna-based millimeter wave radar 510' is placed behind the grill 512, which is at the front nose, it is likely to gather soil, and may be broken even in a minor collision accident or the like. For these reasons, cleaning and functionality checks are always needed. Moreover, as will be described below, if the position or direction of attachment of the millimeter wave radar becomes shifted due to an accident or the like, it is necessary to reestablish alignment with respect to the camera. The chances of such occurrences are reduced by placing the millimeter wave radar within the vehicle room, whereby the aforementioned inconveniences are avoided.

In a driver assist system of such fusion construction, the optical sensor, e.g., a camera, and the millimeter wave radar 510 incorporating the present slot array antenna may have an integrated construction, i.e., being in fixed position with respect to each other. In that case, certain relative positioning should be kept between the optical axis of the optical sensor such as a camera and the directivity of the antenna of the millimeter wave radar, as will be described later. When this driver assist system having an integrated construction is fixed within the vehicle room of the vehicle 500, the optical axis of the camera, etc., should be adjusted so as to be oriented in a certain direction ahead of the vehicle. For these matters, see the specification of US Patent Application Publication No. 2015/0264230, the specification of US Patent Application Publication No. 2016/0264065, U.S. patent application Ser. No. 15/248,141, U.S. patent application Ser. No. 15/248,149, and U.S. patent application Ser. No. 15/248,156, which are incorporated herein by reference. Related techniques concerning the camera are described in the specification of U.S. Pat. No. 7,355,524, and the specification of U.S. Pat. No. 7,420,159, the entire disclosure of each which is incorporated herein by reference.

Regarding placement of an optical sensor such as a camera and a millimeter wave radar within the vehicle room, see, for example, the specification of U.S. Pat. No. 8,604,968, the specification of U.S. Pat. No. 8,614,640, and the specification of U.S. Pat. No. 7,978,122, the entire disclosure of each which is incorporated herein by reference. However, at the time when these patents were filed for, only conventional antennas with patch antennas were the known millimeter wave radars, and thus observation was not possible over sufficient distances. For example, the distance that is observable with a conventional millimeter wave radar is considered to be at most 100 m to 150 m. Moreover, when a millimeter wave radar is placed inward of the windshield, the large radar size inconveniently blocks the driver's field of view, thus hindering safe driving. On the other hand, a millimeter wave radar incorporating a slot array antenna according to an embodiment of the present disclosure is capable of being placed within the vehicle room because of its small size and remarkable enhancement in the efficiency of the radiated electromagnetic wave over that of a conventional patch antenna. This enables a long-range observation over 200 m, while not blocking the driver's field of view.

[Adjustment of Position of Attachment between Millimeter Wave Radar and Camera, etc.,]

In the processing under fusion construction (which hereinafter may be referred to as a "fusion process"), it is desired that an image which is obtained with a camera or the like and the radar information which is obtained with the millimeter wave radar map onto the same coordinate system because, if they differ as to position and target size, cooperative processing between both will be hindered.

This involves adjustment from the following three standpoints.

(1) The optical axis of the camera or the like and the antenna directivity of the millimeter wave radar must have a certain fixed relationship.

It is required that the optical axis of the camera or the like and the antenna directivity of the millimeter wave radar are matched. Alternatively, a millimeter wave radar may include two or more transmission antennas and two or more reception antennas, the directivities of these antennas being intentionally made different. Therefore, it is necessary to guarantee that at least a certain known relationship exists between the optical axis of the camera or the like and the directivities of these antennas.

In the case where the camera or the like and the millimeter wave radar have the aforementioned integrated construction, i.e., being in fixed position to each other, the relative positioning between the camera or the like and the millimeter wave radar stays fixed. Therefore, the aforementioned requirements are satisfied with respect to such an integrated construction. On the other hand, in a conventional patch antenna or the like, where the millimeter wave radar is placed behind the grill 512 of the vehicle 500, the relative positioning between them is usually to be adjusted according to (2) below.

(2) A certain fixed relationship exists between an image acquired with the camera or the like and radar information of the millimeter wave radar in an initial state (e.g., upon shipment) of having been attached to the vehicle.

The positions of attachment of the optical sensor such as a camera and the millimeter wave radar 510 or 510' on the vehicle 500 will finally be determined in the following manner. At a predetermined position 800 ahead of the vehicle 500, a chart to serve as a reference or a target which is subject to observation by the radar (which will hereinafter be referred to as, respectively, a "reference chart" and a "reference target", and collectively as the "benchmark") is accurately positioned. This is observed with an optical sensor such as a camera or with the millimeter wave radar 510. The observation information regarding the observed benchmark is compared against previously-stored shape information or the like of the benchmark, and the current offset information is quantitated. Based on this offset information, by at least one of the following means, the positions of attachment of an optical sensor such as a camera and the millimeter wave radar 510 or 510' are adjusted or corrected. Any other means may also be employed that can provide similar results.

(i) Adjust the positions of attachment of the camera and the millimeter wave radar so that the benchmark will come at a midpoint between the camera and the millimeter wave radar. This adjustment may be done by using a jig or tool, etc., which is separately provided.

(ii) Determine an offset amounts of the camera and the axis/directivity of the millimeter wave radar relative to the benchmark, and through image processing of the camera image and radar processing, correct for these offset amounts in the axis/directivity.

What is to be noted is that, in the case where the optical sensor such as a camera and the millimeter wave radar 510 incorporating a slot array antenna according to an embodiment of the present disclosure have an integrated construction, i.e., being in fixed position to each other, adjusting an offset of either the camera or the radar with respect to the benchmark will make the offset amount known for the other as well, thus making it unnecessary to check for the other's offset with respect to the benchmark.

Specifically, with respect to the onboard camera system 700, a reference chart may be placed at a predetermined position 750, and an image taken by the camera is compared against advance information indicating where in the field of view of the camera the reference chart image is supposed to be located, thereby detecting an offset amount. Based on this, the camera is adjusted by at least one of the above means (i) and (ii). Next, the offset amount which has been ascertained for the camera is translated into an offset amount of the millimeter wave radar. Thereafter, an offset amount adjustment is made with respect to the radar information, by at least one of the above means (i) and (ii).

Alternatively, this may be performed on the basis of the millimeter wave radar 510. In other words, with respect to the millimeter wave radar 510, a reference target may be placed at a predetermined position 800, and the radar information thereof is compared against advance information indicating where in the field of view of the millimeter wave radar 510 the reference target is supposed to be located, thereby detecting an offset amount. Based on this, the millimeter wave radar 510 is adjusted by at least one of the above means (i) and (ii). Next, the offset amount which has been ascertained for the millimeter wave radar is translated into an offset amount of the camera. Thereafter, an offset amount adjustment is made with respect to the image information obtained by the camera, by at least one of the above means (i) and (ii).

(3) Even after an initial state of the vehicle, a certain relationship is maintained between an image acquired with the camera or the like and radar information of the millimeter wave radar.

Usually, an image acquired with the camera or the like and radar information of the millimeter wave radar are supposed to be fixed in the initial state, and hardly vary unless in an accident of the vehicle or the like. However, if an offset in fact occurs between these, an adjustment is possible by the following means.

The camera is attached in such a manner that portions 513 and 514 (characteristic points) that are characteristic of the driver's vehicle fit within its field of view, for example. The positions at which these characteristic points are actually imaged by the camera are compared against the information of the positions to be assumed by these characteristic points when the camera is attached accurately in place, and an offset amount(s) is detected therebetween. Based on this detected offset amount(s), the position of any image that is taken thereafter may be corrected, whereby an offset of the physical position of attachment of the camera can be corrected for. If this correction sufficiently embodies the performance that is required of the vehicle, then the adjustment per the above (2) may not be needed. By regularly performing this adjustment during startup or operation of the vehicle 500, even if an offset of the camera or the like occurs anew, it is possible to correct for the offset amount, thus helping safe travel.

However, this means is generally considered to result in poorer accuracy of adjustment than with the above means (2). When making an adjustment based on an image which is obtained by imaging a benchmark with the camera, the azimuth of the benchmark can be determined with a high precision, whereby a high accuracy of adjustment can be easily achieved. However, since this means utilizes a part of the vehicle body for the adjustment instead of a benchmark, it is rather difficult to enhance the accuracy of azimuth determination. Thus, the resultant accuracy of adjustment will be somewhat inferior. However, it may still be effective as a means of correction when the position of attachment of the camera or the like is considerably altered for reasons such as an accident or a large external force being applied to the camera or the like within the vehicle room, etc.

[Mapping of Target as Detected by Millimeter Wave Radar and Camera or the like: Matching Process]

In a fusion process, for a given target, it needs to be established that an image thereof which is acquired with a camera or the like and radar information which is acquired with the millimeter wave radar pertain to "the same target". For example, suppose that two obstacles (first and second obstacles), e.g., two bicycles, have appeared ahead of the vehicle 500. These two obstacles will be captured as camera images, and detected as radar information of the millimeter wave radar. At this time, the camera image and the radar information with respect to the first obstacle need to be mapped to each other so that they are both directed to the same target. Similarly, the camera image and the radar information with respect to the second obstacle need to be mapped to each other so that they are both directed to the same target. If the camera image of the first obstacle and the radar information of the second obstacle are mistakenly recognized to pertain to an identical object, a considerable accident may occur. Hereinafter, in the present specification, such a process of determining whether a target in the camera image and a target in the radar image pertain to the same target may be referred to as a "matching process".

This matching process may be implemented by various detection devices (or methods) described below. Hereinafter, these will be specifically described. Note that the each of the following detection devices is to be installed in the vehicle, and at least includes a millimeter wave radar detection section, an image detection section (e.g., a camera) which is oriented in a direction overlapping the direction of detection by the millimeter wave radar detection section, and a matching section. Herein, the millimeter wave radar detection section includes a slot array antenna according to any of the embodiments of the present disclosure, and at least acquires radar information in its own field of view. The image acquisition section at least acquires image information in its own field of view. The matching section includes a processing circuit which matches a result of detection by the millimeter wave radar detection section against a result of detection by the image detection section to determine whether or not the same target is being detected by the two detection sections. Herein, the image detection section may be composed of a selected one of, or selected two or more of, an optical camera, LIDAR, an infrared radar, and an ultrasonic radar. The following detection devices differ from one another in terms of the detection process at their respective matching section.

In a first detection device, the matching section performs two matches as follows. A first match involves, for a target of interest that has been detected by the millimeter wave radar detection section, obtaining distance information and lateral position information thereof, and also finding a target that is the closest to the target of interest among a target or two or more targets detected by the image detection section, and detecting a combination(s) thereof. A second match involves, for a target of interest that has been detected by the image detection section, obtaining distance information and lateral position information thereof, and also finding a target that is the closest to the target of interest among a target or two or more targets detected by the millimeter wave radar detection section, and detecting a combination(s) thereof. Furthermore, this matching section determines whether there is any matching combination between the combination(s) of such targets as detected by the millimeter wave radar detection section and the combination(s) of such targets as detected by the image detection section. Then, if there is any matching combination, it is determined that the same object is being detected by the two detection sections. In this manner, a match is attained between the respective targets that have been detected by the millimeter wave radar detection section and the image detection section.

A related technique is described in the specification of U.S. Pat. No. 7,358,889, the entire disclosure of which is incorporated herein by reference. In this publication, the image detection section is illustrated by way of a so-called stereo camera that includes two cameras. However, this technique is not limited thereto. In the case where the image detection section includes a single camera, detected targets may be subjected to an image recognition process or the like as appropriate, in order to obtain distance information and lateral position information of the targets. Similarly, a laser sensor such as a laser scanner may be used as the image detection section.

In a second detection device, the matching section matches a result of detection by the millimeter wave radar detection section and a result of detection by the image detection section every predetermined period of time. If the matching section determines that the same target was being detected by the two detection sections in the previous result of matching, it performs a match by using this previous result of matching. Specifically, the matching section matches a target which is currently detected by the millimeter wave radar detection section and a target which is currently detected by the image detection section, against the target which was determined in the previous result of matching to be being detected by the two detection sections. Then, based on the result of matching for the target which is currently detected by the millimeter wave radar detection section and the result of matching for the target which is currently detected by the image detection section, the matching section determines whether or not the same target is being detected by the two detection sections. Thus, rather than directly matching the results of detection by the two detection sections, this detection device performs a chronological match between the two results of detection and a previous result of matching. Therefore, the accuracy of detection is improved over the case of only performing a momentary match, whereby stable matching is realized. In particular, even if the accuracy of the detection section drops momentarily, matching is still possible because of utilizing past results of matching. Moreover, by utilizing the previous result of matching, this detection device is able to easily perform a match between the two detection sections.

In the current match which utilizes the previous result of matching, if the matching section of this detection device determines that the same object is being detected by the two detection sections, then the matching section of this detection device excludes this determined object in performing matching between objects which are currently detected by the millimeter wave radar detection section and objects which are currently detected by the image detection section. Then, this matching section determines whether there exists any identical object that is currently detected by the two detection sections. Thus, while taking into account the result of chronological matching, the detection device also makes a momentary match based on two results of detection that are obtained from moment to moment. As a result, the detection device is able to surely perform a match for any object that is detected during the current detection.

A related technique is described in the specification of U.S. Pat. No. 7,417,580, the entire disclosure of which is incorporated herein by reference. In this publication, the image detection section is illustrated by way of a so-called stereo camera that includes two cameras. However, this technique is not limited thereto. In the case where the image detection section includes a single camera, detected targets may be subjected to an image recognition process or the like as appropriate, in order to obtain distance information and lateral position information of the targets. Similarly, a laser sensor such as a laser scanner may be used as the image detection section.

In a third detection device, the two detection sections and matching section perform detection of targets and performs matches therebetween at predetermined time intervals, and the results of such detection and the results of such matching are chronologically stored to a storage medium, e.g., memory. Then, based on a rate of change in the size of a target in the image as detected by the image detection section, and on a distance to a target from the driver's vehicle and its rate of change (relative velocity with respect to the driver's vehicle) as detected by the millimeter wave radar detection section, the matching section determines whether the target which has been detected by the image detection section and the target which has been detected by the millimeter wave radar detection section are an identical object.

When determining that these targets are an identical object, based on the position of the target in the image as detected by the image detection section, and on the distance to the target from the driver's vehicle and/or its rate of change as detected by the millimeter wave radar detection section, the matching section predicts a possibility of collision with the vehicle.

A related technique is described in the specification of U.S. Pat. No. 6,903,677, the entire disclosure of which is incorporated herein by reference.

As described above, in a fusion process of a millimeter wave radar and an imaging device such as a camera, an image which is obtained with the camera or the like and radar information which is obtained with the millimeter wave radar are matched against each other. A millimeter wave radar incorporating the aforementioned array antenna according to an embodiment of the present disclosure can be constructed so as to have a small size and high performance. Therefore, high performance and downsizing, etc., can be achieved for the entire fusion process including the aforementioned matching process. This improves the accuracy of target recognition, and enables safer travel control for the vehicle.

[Other Fusion Processes]

In a fusion process, various functions are realized based on a matching process between an image which is obtained with a camera or the like and radar information which is obtained with the millimeter wave radar detection section. Examples of processing apparatuses that realize representative functions of a fusion process will be described below.

Each of the following processing apparatuses is to be installed in a vehicle, and at least includes: a millimeter wave radar detection section to transmit or receive electromagnetic waves in a predetermined direction; an image acquisition section, such as a monocular camera, that has a field of view overlapping the field of view of the millimeter wave radar detection section; and a processing section which obtains information therefrom to perform target detection and the like. The millimeter wave radar detection section acquires radar information in its own field of view. The image acquisition section acquires image information in its own field of view. A selected one, or selected two or more of, an optical camera, LIDAR, an infrared radar, and an ultrasonic radar may be used as the image acquisition section. The processing section can be implemented by a processing circuit which is connected to the millimeter wave radar detection section and the image acquisition section. The following processing apparatuses differ from one another with respect to the content of processing by this processing section.

In a first processing apparatus, the processing section extracts, from an image which is captured by the image acquisition section, a target which is recognized to be the same as the target which is detected by the millimeter wave radar detection section. In other words, a matching process according to the aforementioned detection device is performed. Then, it acquires information of a right edge and a left edge of the extracted target image, and derives locus approximation lines, which are straight lines or predetermined curved lines for approximating loci of the acquired right edge and the left edge, are derived for both edges. The edge which has a larger number of edges existing on the locus approximation line is selected as a true edge of the target. The lateral position of the target is derived on the basis of the position of the edge that has been selected as a true edge. This permits a further improvement on the accuracy of detection of a lateral position of the target.

A related technique is described in the specification of U.S. Pat. No. 8,610,620, the entire disclosure of which is incorporated herein by reference.

In a second processing apparatus, in determining the presence of a target, the processing section alters a determination threshold to be used in checking for a target presence in radar information, on the basis of image information. Thus, if a target image that may be an obstacle to vehicle travel has been confirmed with a camera or the like, or if the presence of a target has been estimated, etc., for example, the determination threshold for the target detection by the millimeter wave radar detection section can be optimized so that more accurate target information can be obtained. In other words, if the possibility of the presence of an obstacle is high, the determination threshold is altered so that this processing apparatus will surely be activated. On the other hand, if the possibility of the presence of an obstacle is low, the determination threshold is altered so that unwanted activation of this processing apparatus is prevented. This permits appropriate activation of the system.

Furthermore in this case, based on radar information, the processing section may designate a region of detection for the image information, and estimate a possibility of the presence of an obstacle on the basis of image information within this region. This makes for a more efficient detection process.

A related technique is described in the specification of U.S. Pat. No. 7,570,198, the entire disclosure of which is incorporated herein by reference.

In a third processing apparatus, the processing section performs combined displaying where images obtained from a plurality of different imaging devices and a millimeter wave radar detection section and an image signal based on radar information are displayed on at least one display device. In this displaying process, horizontal and vertical synchronizing signals are synchronized between the plurality of imaging devices and the millimeter wave radar detection section, and among the image signals from these devices, selective switching to a desired image signal is possible within one horizontal scanning period or one vertical scanning period. This allows, on the basis of the horizontal and vertical synchronizing signals, images of a plurality of selected image signals to be displayed side by side; and, from the display device, a control signal for setting a control operation in the desired imaging device and the millimeter wave radar detection section is sent.

When a plurality of different display devices display respective images or the like, it is difficult to compare the respective images against one another. Moreover, when display devices are provided separately from the third processing apparatus itself, there is poor operability for the device. The third processing apparatus would overcome such shortcomings.

A related technique is described in the specification of U.S. Pat. No. 6,628,299 and the specification of U.S. Pat. No. 7,161,561, the entire disclosure of each of which is incorporated herein by reference.

In a fourth processing apparatus, with respect to a target which is ahead of a vehicle, the processing section instructs an image acquisition section and a millimeter wave radar detection section to acquire an image and radar information containing that target. From within such image information, the processing section determines a region in which the target is contained. Furthermore, the processing section extracts radar information within this region, and detects a distance from the vehicle to the target and a relative velocity between the vehicle and the target. Based on such information, the processing section determines a possibility that the target will collide against the vehicle. This enables an early detection of a possible collision with a target.

A related technique is described in the specification of U.S. Pat. No. 8,068,134, the entire disclosure of which is incorporated herein by reference.

In a fifth processing apparatus, based on radar information or through a fusion process which is based on radar information and image information, the processing section recognizes a target or two or more targets ahead of the vehicle. The "target" encompasses any moving entity such as other vehicles or pedestrians, traveling lanes indicated by white lines on the road, road shoulders and any still objects (including gutters, obstacles, etc.), traffic lights, pedestrian crossings, and the like that may be there. The processing section may encompass a GPS (Global Positioning System) antenna. By using a GPS antenna, the position of the driver's vehicle may be detected, and based on this position, a storage device (referred to as a map information database device) that stores road map information may be searched in order to ascertain a current position on the map. This current position on the map may be compared against a target or two or more targets that have been recognized based on radar information or the like, whereby the traveling environment may be recognized. On this basis, the processing section may extract any target that is estimated to hinder vehicle travel, find safer traveling information, and display it on a display device, as necessary, to inform the driver.

A related technique is described in the specification of U.S. Pat. No. 6,191,704, the entire disclosure of which is incorporated herein by reference.

The fifth processing apparatus may further include a data communication device (having communication circuitry) that communicates with a map information database device which is external to the vehicle. The data communication device may access the map information database device, with a period of e.g. once a week or once a month, to download the latest map information therefrom. This allows the aforementioned processing to be performed with the latest map information.

Furthermore, the fifth processing apparatus may compare between the latest map information that was acquired during the aforementioned vehicle travel and information that is recognized of a target or two or more targets based on radar information, etc., in order to extract target information (hereinafter referred to as "map update information") that is not included in the map information. Then, this map update information may be transmitted to the map information database device via the data communication device. The map information database device may store this map update information in association with the map information that is within the database, and update the current map information itself, if necessary. In performing the update, respective pieces of map update information that are obtained from a plurality of vehicles may be compared against one another to check certainty of the update.

Note that this map update information may contain more detailed information than the map information which is carried by any currently available map information database device. For example, schematic shapes of roads may be known from commonly-available map information, but it typically does not contain information such as the width of the road shoulder, the width of the gutter that may be there, any newly occurring bumps or dents, shapes of buildings, and so on. Neither does it contain heights of the roadway and the sidewalk, how a slope may connect to the sidewalk, etc. Based on conditions which are separately set, the map information database device may store such detailed information (hereinafter referred to as "map update details information") in association with the map information. Such map update details information provides a vehicle (including the driver's vehicle) with information which is more detailed than the original map information, thereby rending itself available for not only the purpose of ensuring safe vehicle travel but also some other purposes. As used herein, a "vehicle (including the driver's vehicle)" may be e.g. an automobile, a motorcycle, a bicycle, or any autonomous vehicle to become available in the future, e.g., an electric wheelchair. The map update details information is to be used when any such vehicle may travel.

(Recognition Via Neural Network)

Each of the first to fifth processing apparatuses may further include a sophisticated apparatus of recognition. The sophisticated apparatus of recognition may be provided external to the vehicle. In that case, the vehicle may include a high-speed data communication device that communicates with the sophisticated apparatus of recognition. The sophisticated apparatus of recognition may be constructed from a neural network, which may encompass so-called deep learning and the like. This neural network may include a convolutional neural network (hereinafter referred to as "CNN"), for example. A CNN, a neural network that has proven successful in image recognition, is characterized by possessing one or more sets of two layers, namely, a convolutional layer and a pooling layer.

There exists at least three kinds of information as follows, any of which may be input to a convolutional layer in the processing apparatus:

(1) information that is based on radar information which is acquired by the millimeter wave radar detection section;
(2) information that is based on specific image information which is acquired, based on radar information, by the image acquisition section; or
(3) fusion information that is based on radar information and image information which is acquired by the image acquisition section, or information that is obtained based on such fusion information.

Based on information of any of the above kinds, or information based on a combination thereof, product-sum operations corresponding to a convolutional layer are performed. The results are input to the subsequent pooling layer, where data is selected according to a predetermined rule. In the case of max pooling where a maximum value among pixel values is chosen, for example, the rule may dictate that a maximum value be chosen for each split region in the convolutional layer, this maximum value being regarded as the value of the corresponding position in the pooling layer.

A sophisticated apparatus of recognition that is composed of a CNN may include a single set of a convolutional layer and a pooling layer, or a plurality of such sets which are cascaded in series. This enables accurate recognition of a target, which is contained in the radar information and the image information, that may be around a vehicle.

Related techniques are described in the U.S. Pat. No. 8,861,842, the specification of U.S. Pat. No. 9,286,524, and the specification of US Patent Application Publication No. 2016/0140424, the entire disclosure of each of which is incorporated herein by reference.

In a sixth processing apparatus, the processing section performs processing that is related to headlamp control of a vehicle. When a vehicle travels in nighttime, the driver may check whether another vehicle or a pedestrian exists ahead of the driver's vehicle, and control a beam(s) from the headlamp(s) of the driver's vehicle to prevent the driver of the other vehicle or the pedestrian from being dazzled by the headlamp(s) of the driver's vehicle. This sixth processing apparatus automatically controls the headlamp(s) of the driver's vehicle by using radar information, or a combination of radar information and an image taken by a camera or the like.

Based on radar information, or through a fusion process based on radar information and image information, the processing section detects a target that corresponds to a vehicle or pedestrian ahead of the vehicle. In this case, a vehicle ahead of a vehicle may encompass a preceding vehicle that is ahead, a vehicle or a motorcycle in the oncoming lane, and so on. When detecting any such target, the processing section issues a command to lower the beam(s) of the headlamp(s). Upon receiving this command, the control section (control circuit) which is internal to the vehicle may control the headlamp(s) to lower the beam(s) therefrom.

Related techniques are described in the specification of U.S. Pat. No. 6,403,942, the specification of U.S. Pat. No. 6,611,610, the specification of U.S. Pat. No. 8,543,277, the specification of U.S. Pat. No. 8,593,521, and the specification of U.S. Pat. No. 8,636,393, the entire disclosure of each of which is incorporated herein by reference.

According to the above-described processing by the millimeter wave radar detection section, and the above-described fusion process by the millimeter wave radar detection section and an imaging device such as a camera, the millimeter wave radar can be constructed so as to have a small size and high performance, whereby high performance and downsizing, etc., can be achieved for the radar processing or the entire fusion process. This improves the accuracy of target recognition, and enables safer travel control for the vehicle.

Application Example 2: Various Monitoring Systems (Natural Elements, Buildings, Roads, Watch, Security)

A millimeter wave radar (radar system) incorporating an array antenna according to an embodiment of the present disclosure also has a wide range of applications in the fields of monitoring, which may encompass natural elements, weather, buildings, security, nursing care, and the like. In a monitoring system in this context, a monitoring apparatus that includes the millimeter wave radar may be installed e.g. at a fixed position, in order to perpetually monitor a subject(s) of monitoring. Regarding the given subject(s) of monitoring, the millimeter wave radar has its resolution of detection adjusted and set to an optimum value.

A millimeter wave radar incorporating an array antenna according to an embodiment of the present disclosure is capable of detection with a radio frequency electromagnetic wave exceeding e.g. 100 GHz. As for the modulation band in those schemes which are used in radar recognition, e.g., the FMCW method, the millimeter wave radar currently achieves a wide band exceeding 4 GHz, which supports the aforementioned Ultra Wide Band (UWB). Note that the modulation band is related to the range resolution. In a conventional patch antenna, the modulation band was up to about 600 MHz, thus resulting in a range resolution of 25 cm. On the other hand, a millimeter wave radar associated with the present array antenna has a range resolution of 3.75 cm, indicative of a performance which rivals the range resolution of conventional LIDAR. Whereas an optical sensor such as LIDAR is unable to detect a target in nighttime or bad weather as mentioned above, a millimeter wave radar is always capable of detection, regardless of daytime or nighttime and irrespective of weather. As a result, a millimeter wave radar associated with the present array antenna is available for a variety of applications which were not possible with a millimeter wave radar incorporating any conventional patch antenna.

FIG. 40 is a diagram showing an exemplary construction for a monitoring system 1500 based on millimeter wave radar. The monitoring system 1500 based on millimeter wave radar at least includes a sensor section 1010 and a main section 1100. The sensor section 1010 at least includes an antenna 1011 which is aimed at the subject of monitoring 1015, a millimeter wave radar detection section 1012 which detects a target based on a transmitted or received electromagnetic wave, and a communication section (communication circuit) 1013 which transmits detected radar information. The main section 1100 at least includes a communication section (communication circuit) 1103 which receives radar information, a processing section (processing circuit) 1101 which performs predetermined processing based on the received radar information, and a data storage section (storage medium) 1102 in which past radar information and other information that is needed for the predetermined processing, etc., are stored. Telecommunication lines 1300 exist between the sensor section 1010 and the main section 1100, via which transmission and reception of information and commands occur between them. As used herein, the telecommunication lines may encompass any of a general-purpose communications network such as the Internet, a mobile communications network, dedicated telecommunication lines, and so on, for example. Note that the present monitoring system 1500 may be arranged so that the sensor section 1010 and the main section 1100 are directly connected, rather than via telecommunication lines. In addition to the millimeter wave radar, the sensor section 1010 may also include an optical sensor such as a camera. This will permit target recognition through a fusion process which is based on radar information and image information from the camera or the like, thus enabling a more sophisticated detection of the subject of monitoring 1015 or the like.

Hereinafter, examples of monitoring systems embodying these applications will be specifically described.

[Natural Element Monitoring System]

A first monitoring system is a system that monitors natural elements (hereinafter referred to as a "natural element monitoring system"). With reference to FIG. 40, this natural element monitoring system will be described. Subjects of monitoring 1015 of the natural element monitoring system 1500 may be, for example, a river, the sea surface, a mountain, a volcano, the ground surface, or the like. For example, when a river is the subject of monitoring 1015, the sensor section 1010 being secured to a fixed position perpetually monitors the water surface of the river 1015. This water surface information is perpetually transmitted to a processing section 1101 in the main section 1100. Then, if the water surface reaches a certain height or above, the processing section 1101 informs a distinct system 1200 which separately exists from the monitoring system (e.g., a weather observation monitoring system), via the telecommunication lines 1300. Alternatively, the processing section 1101 may send information to a system (not shown) which manages the water gate, whereby the system if instructed to automatically close a water gate, etc. (not shown) which is provided at the river 1015.

The natural element monitoring system 1500 is able to monitor a plurality of sensor sections 1010, 1020, etc., with the single main section 1100. When the plurality of sensor sections are distributed over a certain area, the water levels of rivers in that area can be grasped simultaneously. This allows to make an assessment as to how the rainfall in this area may affect the water levels of the rivers, possibly leading to disasters such as floods. Information concerning this can be conveyed to the distinct system 1200 (e.g., a weather observation monitoring system) via the telecommunication lines 1300. Thus, the distinct system 1200 (e.g., a weather observation monitoring system) is able to utilize the conveyed information for weather observation or disaster prediction in a wider area.

The natural element monitoring system 1500 is also similarly applicable to any natural element other than a river. For example, the subject of monitoring of a monitoring system that monitors tsunamis or storm surges is the sea surface level. It is also possible to automatically open or close the water gate of a seawall in response to a rise in the sea surface level. Alternatively, the subject of monitoring of a monitoring system that monitors landslides to be caused by rainfall, earthquakes, or the like may be the ground surface of a mountainous area, etc.

[Traffic Monitoring System]

A second monitoring system is a system that monitors traffic (hereinafter referred to as a "traffic monitoring system"). The subject of monitoring of this traffic monitoring system may be, for example, a railroad crossing, a specific railroad, an airport runway, a road intersection, a specific road, a parking lot, etc.

For example, when the subject of monitoring is a railroad crossing, the sensor section 1010 is placed at a position where the inside of the crossing can be monitored. In this case, in addition to the millimeter wave radar, the sensor section 1010 may also include an optical sensor such as a camera, which will allow a target (subject of monitoring) to be detected from more perspectives, through a fusion process based on radar information and image information. The target information which is obtained with the sensor section 1010 is sent to the main section 1100 via the telecommunication lines 1300. The main section 1100 collects other information (e.g., train schedule information) that may be needed in a more sophisticated recognition process or control, and issues necessary control instructions or the like based thereon. As used herein, a necessary control instruction may be, for example, an instruction to stop a train when a person, a vehicle, etc. is found inside the crossing when it is closed.

If the subject of monitoring is a runway at an airport, for example, a plurality of sensor sections 1010, 1020, etc., may be placed along the runway so as to set the runway to a predetermined resolution, e.g., a resolution that allows any foreign object on the runway that is 5 cm by 5 cm or larger to be detected. The monitoring system 1500 perpetually monitors the runway, regardless of daytime or nighttime and irrespective of weather. This function is enabled by the very ability of the millimeter wave radar according to an embodiment of the present disclosure to support UWB. Moreover, since the present millimeter wave radar can be embodied with a small size, a high resolution, and a low cost, it provides a realistic solution for covering the entire runway surface from end to end. In this case, the main section 1100 keeps the plurality of sensor sections 1010, 1020, etc., under integrated management. If a foreign object is found on the runway, the main section 1100 transmits information concerning the position and size of the foreign object to an air-traffic control system (not shown). Upon receiving this, the air-traffic control system temporarily prohibits takeoff and landing on that runway. In the meantime, the main section 1100 transmits information concerning the position and size of the foreign object to a separately-provided vehicle, which automatically cleans the runway surface, etc., for example. Upon receive this, the cleaning vehicle may autonomously move to the position where the foreign object exists, and automatically remove the foreign object. Once removal of the foreign object is completed, the cleaning vehicle transmits information of the completion to the main section 1100. Then, the main section 1100 again confirms that the sensor section 1010 or the like which has detected the foreign object now reports that "no foreign object exists" and that it is safe now, and informs the air-traffic control system of this. Upon receiving this, the air-traffic control system may lift the prohibition of takeoff and landing from the runway.

Furthermore, in the case where the subject of monitoring is a parking lot, for example, it may be possible to automatically recognize which position in the parking lot is currently vacant. A related technique is described in the specification of U.S. Pat. No. 6,943,726, the entire disclosure of which is incorporated herein by reference.

[Security Monitoring System]

A third monitoring system is a system that monitors a trespasser into a piece of private land or a house (hereinafter referred to as a "security monitoring system"). The subject of monitoring of this security monitoring system may be, for example, a specific region within a piece of private land or a house, etc.

For example, if the subject of monitoring is a piece of private land, the sensor section(s) 1010 may be placed at one position, or two or more positions where the sensor section(s) 1010 is able to monitor it. In this case, in addition to the millimeter wave radar, the sensor section(s) 1010 may also include an optical sensor such as a camera, which will allow a target (subject of monitoring) to be detected from more perspectives, through a fusion process based on radar information and image information. The target information which was obtained by the sensor section 1010($s$) is sent to the main section 1100 via the telecommunication lines 1300. The main section 1100 collects other information (e.g., reference data or the like needed to accurately recognize whether the trespasser is a person or an animal such as a dog or a bird) that may be needed in a more sophisticated recognition process or control, and issues necessary control instructions or the like based thereon. As used herein, a necessary control instruction may be, for example, an instruction to sound an alarm or activate lighting that is installed in the premises, and also an instruction to directly report to a person in charge of the premises via mobile telecommunication lines or the like, etc. The processing section 1101 in the main section 1100 may allow an internalized, sophisticated apparatus of recognition (that adopts deep learning or a like technique) to recognize the detected target. Alternatively, such a sophisticated apparatus of recognition may be provided externally, in which case the sophisticated apparatus of recognition may be connected via the telecommunication lines 1300.

A related technique is described in the specification of U.S. Pat. No. 7,425,983, the entire disclosure of which is incorporated herein by reference.

Another embodiment of such a security monitoring system may be a human monitoring system to be installed at a boarding gate at an airport, a station wicket, an entrance of a building, or the like. The subject of monitoring of such a human monitoring system may be, for example, a boarding gate at an airport, a station wicket, an entrance of a building, or the like.

If the subject of monitoring is a boarding gate at an airport, the sensor section(s) 1010 may be installed in a machine for checking personal belongings at the boarding gate, for example. In this case, there may be two checking methods as follows. In a first method, the millimeter wave radar transmits an electromagnetic wave, and receives the electromagnetic wave as it reflects off a passenger (which is the subject of monitoring), thereby checking personal belongings or the like of the passenger. In a second method, a weak millimeter wave which is radiated from the passenger's own body is received by the antenna, thus checking for any foreign object that the passenger may be hiding. In the latter method, the millimeter wave radar preferably has a function of scanning the received millimeter wave. This scanning function may be implemented by using digital beam forming, or through a mechanical scanning operation. Note that the processing by the main section 1100 may utilize a communication process and a recognition process similar to those in the above-described examples.

[Building Inspection System (Non-Destructive Inspection)]

A fourth monitoring system is a system that monitors or checks the concrete material of a road, a railroad overpass, a building, etc., or the interior of a road or the ground, etc., (hereinafter referred to as a "building inspection system"). The subject of monitoring of this building inspection system may be, for example, the interior of the concrete material of an overpass or a building, etc., or the interior of a road or the ground, etc.

For example, if the subject of monitoring is the interior of a concrete building, the sensor section 1010 is structured so that the antenna 1011 can make scan motions along the surface of a concrete building. As used herein, "scan motions" may be implemented manually, or a stationary rail for the scan motion may be separately provided, upon which to cause the movement by using driving power from an electric motor or the like. In the case where the subject of monitoring is a road or the ground, the antenna 1011 may be installed face-down on a vehicle or the like, and the vehicle may be allowed to travel at a constant velocity, thus creating a "scan motion". The electromagnetic wave to be used by the sensor section 1010 may be a millimeter wave in e.g. the so-called terahertz region, exceeding 100 GHz. As described earlier, even with an electromagnetic wave over e.g. 100 GHz, an array antenna according to an embodiment of the present disclosure can be adapted to have smaller losses than do conventional patch antennas or the like. An electromagnetic wave of a higher frequency is able to permeate deeper into the subject of checking, such as concrete, thereby realizing a more accurate non-destructive inspection. Note that the processing by the main section 1100 may also utilize a communication process and a recognition process similar to those in the other monitoring systems described above.

A related technique is described in the specification of U.S. Pat. No. 6,661,367, the entire disclosure of which is incorporated herein by reference.

[Human Monitoring System]

A fifth monitoring system is a system that watches over a person who is subject to nursing care (hereinafter referred to as a "human watch system"). The subject of monitoring of this human watch system may be, for example, a person under nursing care or a patient in a hospital, etc.

For example, if the subject of monitoring is a person under nursing care within a room of a nursing care facility, the sensor section(s) 1010 is placed at one position, or two or more positions inside the room where the sensor section(s) 1010 is able to monitor the entirety of the inside of the room. In this case, in addition to the millimeter wave radar, the sensor section 1010 may also include an optical sensor such as a camera. In this case, the subject of monitoring can be monitored from more perspectives, through a fusion process based on radar information and image information. On the other hand, when the subject of monitoring is a person, from the standpoint of privacy protection, monitoring with a camera or the like may not be appropriate. Therefore, sensor selections must be made while taking this aspect into consideration. Note that target detection by the millimeter wave radar will allow a person, who is the subject of monitoring, to be captured not by his or her image, but by a signal (which is, as it were, a shadow of the person). Therefore, the millimeter wave radar may be considered as a desirable sensor from the standpoint of privacy protection.

Information of the person under nursing care which has been obtained by the sensor section(s) 1010 is sent to the main section 1100 via the telecommunication lines 1300. The main section 1100 collects other information (e.g., reference data or the like needed to accurately recognize target information of the person under nursing care) that may be needed in a more sophisticated recognition process or control, and issues necessary control instructions or the like based thereon. As used herein, a necessary control instruction may be, for example, an instruction to directly report a person in charge based on the result of detection, etc. The processing section 1101 in the main section 1100 may allow an internalized, sophisticated apparatus of recognition (that adopts deep learning or a like technique) to recognize the detected target. Alternatively, such a sophisticated apparatus of recognition may be provided externally, in which case the sophisticated apparatus of recognition may be connected via the telecommunication lines 1300.

In the case where a person is the subject of monitoring of the millimeter wave radar, at least the two following functions may be added.

A first function is a function of monitoring the heart rate and/or the respiratory rate. In the case of a millimeter wave radar, an electromagnetic wave is able to see through the clothes to detect the position and motions of the skin surface of a person's body. First, the processing section 1101 detects a person who is the subject of monitoring and an outer shape thereof. Next, in the case of detecting a heart rate, for example, a position on the body surface where the heartbeat motions are easy to detect may be identified, and the motions there may be chronologically detected. This allows a heart rate per minute to be detected, for example. The same is also true when detecting a respiratory rate. By using this function, the health status of a person under nursing care can be perpetually checked, thus enabling a higher-quality watch over a person under nursing care.

A second function is a function of fall detection. A person under nursing care such as an elderly person may fall from time to time, due to weakened legs and feet. When a person falls, the velocity or acceleration of a specific site of the person's body, e.g., the head, will reach a certain level or greater. When the subject of monitoring of the millimeter wave radar is a person, the relative velocity or acceleration of the target of interest can be perpetually detected. Therefore, by identifying the head as the subject of monitoring, for example, and chronologically detecting its relative velocity or acceleration, a fall can be recognized when a velocity of a certain value or greater is detected. When recognizing a fall, the processing section 1101 can issue an instruction or the like corresponding to pertinent nursing care assistance, for example.

Note that the sensor section(s) 1010 is secured to a fixed position(s) in the above-described monitoring system or the like. However, the sensor section(s) 1010 can also be installed on a moving entity, e.g., a robot, a vehicle, a flying object such as a drone. As used herein, the vehicle or the like may encompass not only an automobile, but also a smaller sized moving entity such as an electric wheelchair, for example. In this case, this moving entity may include an internal GPS unit which allows its own current position to be always confirmed. In addition, this moving entity may also have a function of further improving the accuracy of its own current position by using map information and the map update information which has been described with respect to the aforementioned fifth processing apparatus.

Furthermore, in any device or system that is similar to the above-described first to third detection devices, first to sixth processing apparatuses, first to fifth monitoring systems, etc., a like construction may be adopted to utilize an array antenna or a millimeter wave radar according to an embodiment of the present disclosure.

Application Example 3: Communication System

[First example of Communication System]

The waveguide device and antenna device (array antenna) according to the present disclosure can be used for the transmitter and/or receiver with which a communication system (telecommunication system) is constructed. The waveguide device and antenna device according to the present disclosure are composed of layered conductive members, and therefore are able to keep the transmitter and/or receiver size smaller than in the case of using a hollow waveguide. Moreover, there is no need for dielectric, and thus the dielectric loss of electromagnetic waves can be kept smaller than in the case of using a microstrip line. Therefore, a communication system including a small and highly efficient transmitter and/or receiver can be constructed.

Such a communication system may be an analog type communication system which transmits or receives an analog signal that is directly modulated. However, a digital communication system may be adopted in order to construct a more flexible and higher-performance communication system.

Hereinafter, with reference to FIG. 41, a digital communication system 800A in which a waveguide device and an antenna device according to an embodiment of the present disclosure are used will be described.

FIG. 41 is a block diagram showing a construction for the digital communication system 800A. The communication system 800A includes a transmitter 810A and a receiver 820A. The transmitter 810A includes an analog to digital (A/D) converter 812, an encoder 813, a modulator 814, and a transmission antenna 815. The receiver 820A includes a reception antenna 825, a demodulator 824, a decoder 823, and a digital to analog (D/A) converter 822. The at least one of the transmission antenna 815 and the reception antenna 825 may be implemented by using an array antenna according to an embodiment of the present disclosure. In this exemplary application, the circuitry including the modulator 814, the encoder 813, the A/D converter 812, and so on, which are connected to the transmission antenna 815, is referred to as the transmission circuit. The circuitry including the demodulator 824, the decoder 823, the D/A converter 822, and so on, which are connected to the reception antenna 825, is referred to as the reception circuit. The transmission circuit and the reception circuit may be collectively referred to as the communication circuit.

With the analog to digital (A/D) converter 812, the transmitter 810A converts an analog signal which is received from the signal source 811 to a digital signal. Next, the digital signal is encoded by the encoder 813. As used herein, "encoding" means altering the digital signal to be transmitted into a format which is suitable for communication. Examples of such encoding include CDM (Code-Division Multiplexing) and the like. Moreover, any conversion for effecting TDM (Time-Division Multiplexing) or FDM (Frequency Division Multiplexing), or OFDM (Orthogonal Frequency Division Multiplexing) is also an example of encoding. The encoded signal is converted by the modulator 814 into a radio frequency signal, so as to be transmitted from the transmission antenna 815.

In the field of communications, a wave representing a signal to be superposed on a carrier wave may be referred to as a "signal wave"; however, the term "signal wave" as used in the present specification does not carry that definition. A "signal wave" as referred to in the present specification is broadly meant to be any electromagnetic wave to propagate in a waveguide, or any electromagnetic wave for transmission/reception via an antenna element.

The receiver 820A restores the radio frequency signal that has been received by the reception antenna 825 to a low-frequency signal at the demodulator 824, and to a digital signal at the decoder 823. The decoded digital signal is restored to an analog signal by the digital to analog (D/A) converter 822, and is sent to a data sink (data receiver) 821. Through the above processes, a sequence of transmission and reception processes is completed.

When the communicating agent is a digital appliance such as a computer, analog to digital conversion of the transmission signal and digital to analog conversion of the reception signal are not needed in the aforementioned processes. Thus, the analog to digital converter 812 and the digital to analog converter 822 in FIG. 41 may be omitted. A system of such construction is also encompassed within a digital communication system.

In a digital communication system, in order to ensure signal intensity or expand channel capacity, various methods may be adopted. Many such methods are also effective in a communication system which utilizes radio waves of the millimeter wave band or the terahertz band.

Radio waves in the millimeter wave band or the terahertz band have higher straightness than do radio waves of lower frequencies, and undergoes less diffraction, i.e., bending around into the shadow side of an obstacle. Therefore, it is not uncommon for a receiver to fail to directly receive a radio wave that has been transmitted from a transmitter. Even in such situations, reflected waves may often be received, but a reflected wave of a radio wave signal is often poorer in quality than is the direct wave, thus making stable reception more difficult. Furthermore, a plurality of reflected waves may arrive through different paths. In that case, the reception waves with different path lengths might differ in phase from one another, thus causing multi-path fading.

As a technique for improving such situations, a so-called antenna diversity technique may be used. In this technique, at least one of the transmitter and the receiver includes a plurality of antennas. If the plurality of antennas are parted by distances which differ from one another by at least about the wavelength, the resulting states of the reception waves will be different. Accordingly, the antenna that is capable of transmission/reception with the highest quality among all is selectively used, thereby enhancing the reliability of communication. Alternatively, signals which are obtained from more than one antenna may be merged for an improved signal quality.

In the communication system 800A shown in FIG. 41, for example, the receiver 820A may include a plurality of reception antennas 825. In this case, a switcher exists between the plurality of reception antennas 825 and the demodulator 824. Through the switcher, the receiver 820A connects the antenna that provides the highest-quality signal among the plurality of reception antennas 825 to the demodulator 824. In this case, the transmitter 810A may also include a plurality of transmission antennas 815.

[Second Example of Communication System]

FIG. 42 is a block diagram showing an example of a communication system 800B including a transmitter 810B which is capable of varying the radiation pattern of radio waves. In this exemplary application, the receiver is identical to the receiver 820A shown in FIG. 41; for this reason, the receiver is omitted from illustration in FIG. 42. In addition to the construction of the transmitter 810A, the transmitter 810B also includes an antenna array 815b, which includes a plurality of antenna elements 8151. The antenna array 815b may be an array antenna according to an embodiment of the present disclosure. The transmitter 810B further includes a plurality of phase shifters (PS) 816 which are respectively connected between the modulator 814 and the plurality of antenna elements 8151. In the transmitter 810B, an output of the modulator 814 is sent to the plurality of phase shifters 816, where phase differences are imparted and the resultant signals are led to the plurality of antenna elements 8151. In the case where the plurality of antenna elements 8151 are disposed at equal intervals, if a radio frequency signal whose phase differs by a certain amount with respect to an adjacent antenna element is fed to each antenna element 8151, a main lobe 817 of the antenna array 815b will be oriented in an azimuth which is inclined from the front, this inclination being in accordance with the phase difference. This method may be referred to as beam forming.

The azimuth of the main lobe 817 may be altered by allowing the respective phase shifters 816 to impart varying phase differences. This method may be referred to as beam steering. By finding phase differences that are conducive to the best transmission/reception state, the reliability of communication can be enhanced. Although the example here illustrates a case where the phase difference to be imparted by the phase shifters 816 is constant between any adjacent antenna elements 8151, this is not limiting. Moreover, phase differences may be imparted so that the radio wave will be radiated in an azimuth which allows not only the direct wave but also reflected waves to reach the receiver.

A method called null steering can also be used in the transmitter 810B. This is a method where phase differences are adjusted to create a state where the radio wave is radiated in no specific direction. By performing null steering, it becomes possible to restrain radio waves from being radiated toward any other receiver to which transmission of the radio wave is not intended. This can avoid interference. Although a very broad frequency band is available to digital communication utilizing millimeter waves or terahertz waves, it is nonetheless preferable to make as efficient a use of the bandwidth as possible. By using null steering, plural instances of transmission/reception can be performed within the same band, whereby efficiency of utility of the bandwidth can be enhanced. A method which enhances the efficiency of utility of the bandwidth by using techniques such as beam forming, beam steering, and null steering may sometimes be referred to as SDMA (Spatial Division Multiple Access).

[Third Example of Communication System]

In order to increase the channel capacity in a specific frequency band, a method called MIMO (Multiple-Input and Multiple-Output) may be adopted. Under MIMO, a plurality of transmission antennas and a plurality of reception antennas are used. A radio wave is radiated from each of the plurality of transmission antennas. In one example, respectively different signals may be superposed on the radio waves to be radiated. Each of the plurality of reception antennas receives all of the transmitted plurality of radio waves. However, since different reception antennas will receive radio waves that arrive through different paths, differences will occur among the phases of the received radio waves. By utilizing these differences, it is possible to, at the receiver side, separate the plurality of signals which were contained in the plurality of radio waves.

The waveguide device and antenna device according to the present disclosure can also be used in a communication system which utilizes MIMO. Hereinafter, an example such a communication system will be described.

FIG. 43 is a block diagram showing an example of a communication system 800C implementing a MIMO function. In the communication system 800C, a transmitter 830 includes an encoder 832, a TX-MIMO processor 833, and two transmission antennas 8351 and 8352. A receiver 840 includes two reception antennas 8451 and 8452, an RX-MIMO processor 843, and a decoder 842. Note that the number of transmission antennas and the number of reception antennas may each be greater than two. Herein, for ease of explanation, an example where there are two antennas of each kind will be illustrated. In general, the channel capacity of an MIMO communication system will increase in proportion to the number of whichever is the fewer between the transmission antennas and the reception antennas.

Having received a signal from the data signal source 831, the transmitter 830 encodes the signal at the encoder 832 so that the signal is ready for transmission. The encoded signal is distributed by the TX-MIMO processor 833 between the two transmission antennas 8351 and 8352.

In a processing method according to one example of the MIMO method, the TX-MIMO processor 833 splits a sequence of encoded signals into two, i.e., as many as there are transmission antennas 8352, and sends them in parallel to the transmission antennas 8351 and 8352. The transmission antennas 8351 and 8352 respectively radiate radio waves containing information of the split signal sequences.

When there are N transmission antennas, the signal sequence is split into N. The radiated radio waves are simultaneously received by the two reception antennas 8451 and 8452. In other words, in the radio waves which are received by each of the reception antennas 8451 and 8452, the two signals which were split at the time of transmission are mixedly contained. Separation between these mixed signals is achieved by the RX-MIMO processor 843.

The two mixed signals can be separated by paying attention to the phase differences between the radio waves, for example. A phase difference between two radio waves of the case where the radio waves which have arrived from the transmission antenna 8351 are received by the reception antennas 8451 and 8452 is different from a phase difference between two radio waves of the case where the radio waves which have arrived from the transmission antenna 8352 are received by the reception antennas 8451 and 8452. That is, the phase difference between reception antennas differs depending on the path of transmission/reception. Moreover, unless the spatial relationship between a transmission antenna and a reception antenna is changed, the phase difference therebetween remains unchanged. Therefore, based on correlation between reception signals received by the two reception antennas, as shifted by a phase difference which is determined by the path of transmission/reception, it is possible to extract any signal that is received through that path of transmission/reception. The RX-MIMO processor 843 may separate the two signal sequences from the reception signal e.g. by this method, thus restoring the signal sequence before the split. The restored signal sequence still remains encoded, and therefore is sent to the decoder 842 so as to be restored to the original signal there. The restored signal is sent to the data sink 841.

Although the MIMO communication system 800C in this example transmits or receives a digital signal, an MIMO communication system which transmits or receives an analog signal can also be realized. In that case, in addition to the construction of FIG. 43, an analog to digital converter and a digital to analog converter as have been described with reference to FIG. 41 are provided. Note that the information to be used in distinguishing between signals from different transmission antennas is not limited to phase difference information. Generally speaking, for a different combination of a transmission antenna and a reception antenna, the received radio wave may differ not only in terms of phase, but also in scatter, fading, and other conditions. These are collectively referred to as CSI (Channel State Information). CSI may be utilized in distinguishing between different paths of transmission/reception in a system utilizing MIMO.

Note that it is not an essential requirement that the plurality of transmission antennas radiate transmission waves containing respectively independent signals. So long as separation is possible at the reception antenna side, each transmission antenna may radiate a radio wave containing a plurality of signals. Moreover, beam forming may be performed at the transmission antenna side, while a transmission wave containing a single signal, as a synthetic wave of the radio waves from the respective transmission antennas, may be formed at the reception antenna. In this case, too, each transmission antenna is adapted so as to radiate a radio wave containing a plurality of signals.

In this third example, too, as in the first and second examples, various methods such as CDM, FDM, TDM, and OFDM may be used as a method of signal encoding.

In a communication system, a circuit board that implements an integrated circuit (referred to as a signal processing circuit or a communication circuit) for processing signals may be stacked as a layer on the waveguide device and antenna device according to an embodiment of the present disclosure. Since the waveguide device and antenna device according to an embodiment of the present disclosure is structured so that plate-like conductive members are layered therein, it is easy to further stack a circuit board thereupon. By adopting such an arrangement, a transmitter and a receiver which are smaller in volume than in the case where a hollow waveguide or the like is employed can be realized.

In the first to third examples of the communication system as described above, each element of a transmitter or a receiver, e.g., an analog to digital converter, a digital to analog converter, an encoder, a decoder, a modulator, a demodulator, a TX-MIMO processor, or an RX-MIMO processor, is illustrated as one independent element in FIGS. 41, 42, and 43; however, these do not need to be discrete. For example, all of these elements may be realized by a single integrated circuit. Alternatively, some of these elements may be combined so as to be realized by a single integrated circuit. Either case qualifies as an embodiment of the present invention so long as the functions which have been described in the present disclosure are realized thereby.

As described above, the present disclosure encompasses waveguide devices, antenna devices, radars, radar systems, and wireless communication systems as recited in the following Items.

[Item 1] A waveguide device for use in propagating an electromagnetic wave of a band having a shortest wavelength $\lambda m$ in free space, the waveguide device comprising:

a first electrically conductive member having an electrically conductive surface and a first throughhole;

a second electrically conductive member including a plurality of electrically conductive rods each having a leading end opposing the electrically conductive surface, the second electrically conductive member having a second throughhole which overlaps the first throughhole as viewed along an axial direction of the first throughhole; and an electrically-conductive waveguiding wall at least partially surrounding a space between the first throughhole and the second throughhole and being surrounded by the plurality of electrically conductive rods, the waveguiding wall allowing the electromagnetic wave to propagate between the first throughhole and the second throughhole, wherein, the waveguiding wall has a height which is less than $\lambda m/2$; and a distance between an electrically conductive rod among the plurality of electrically conductive rods that is adjacent to the waveguiding wall and an outer periphery of the waveguiding wall is less than $\lambda m/2$.

[Item 2] The waveguide device of item 1, wherein at least one of the first electrically conductive member and the second electrically conductive member, and the waveguiding wall, are portions of a single-piece body.

[Item 3] The waveguide device of item 2, wherein, a gap exists between the waveguiding wall and the first electrically conductive member or the second electrically conductive member; and a thickness of the waveguiding wall at a top surface thereof is less than $\lambda m/2$.

[Item 4] The waveguide device of any of items 1 to 3, wherein, the waveguiding wall and the second electrically conductive member are portions of a single-piece body;

a gap exists between the waveguiding wall and the first electrically conductive member; and a height of the waveguiding wall is equal to a height of the plurality of electrically conductive rods.

[Item 5] The waveguide device of any of items 1 to 4, wherein the waveguiding wall is split into a first portion that connects to the first electrically conductive member and a second portion that connects to the second electrically conductive member.

[Item 6] The waveguide device of any of items 1 to 4, wherein, the waveguiding wall is split into a first portion and a second portion;

the first electrically conductive member and the first portion are portions of a single-piece body; and the second electrically conductive member and the second portion are portions of another single-piece body.

[Item 7] The waveguide device of item 5 or 6, wherein, a gap exists between the first portion and the second portion;

a total of a height of the first portion, a height of the second portion, and a length of the gap is less than $\lambda m/2$;

a thickness of the first portion at a top surface thereof is less than $\lambda m/2$; and a thickness of the second portion at a top surface thereof is less than $\lambda m/2$.

[Item 8] The waveguide device of any of items 5 to 7, wherein a height of the second portion is equal to a height of the plurality of electrically conductive rods.

[Item 9] The waveguide device of any of items 1 to 8, wherein cross sections of the first throughhole, the second throughhole, and the waveguiding wall, as taken along the electrically conductive surface, each include a lateral portion extending in one direction.

[Item 10] The waveguide device of item 9, wherein the cross sections of the first throughhole, the second throughhole, and the waveguiding wall, as taken along the electrically conductive surface, each further include at least a pair of vertical portions extending in another direction intersecting the one direction, and the lateral portion interconnects the pair of vertical portions.

[Item 11] The waveguide device of item 10, inner wall surfaces of the first throughhole, the second throughhole, and the waveguiding wall each include at least one projection which projects inward; and the projection is interposed between the pair of vertical portions, and a leading end of the projection constitutes at least a part of the lateral portion.

[Item 12] The waveguide device of any of items 9 to 11, wherein a central wavelength of the band in free space is $\lambda o$, and a thickness of the waveguiding wall at a center of the lateral portion is not less than 0.8 times as large as $\lambda o/4$ and not more than 1.2 times as large as $\lambda o/4$.

[Item 13] The waveguide device of any of items 1 to 12, wherein, among the plurality of electrically conductive rods, the second electrically conductive member further includes a waveguide member having an electrically-conductive waveguide face opposing the electrically conductive surface.

[Item 14] The waveguide device of any of items 1 to 13, wherein, the electrically conductive surface is planar;

the first throughhole extends through the first electrically conductive member perpendicularly to the electrically conductive surface; and the second throughhole extends through the second electrically conductive member along the axial direction of the first throughhole.

[Item 15] The waveguide device of any of items 1 to 14, wherein, the second electrically conductive member has an electrically conductive surface on a side opposite from the plurality of electrically conductive rods;

the waveguide device further comprises a third electrically conductive member including a second plurality of electrically conductive rods each having a leading end opposing the electrically conductive surface of the second electrically conductive member, the third electrically conductive member having a third throughhole which overlaps the second throughhole as viewed along an axial direction of the second throughhole, and an electrically-conductive further waveguiding wall at least partially surrounding a space between the second throughhole and the third throughhole, the further waveguiding wall being surrounded by the second plurality of electrically conductive rods and allowing the electromagnetic wave to propagate between the second throughhole and the third throughhole;

a height of the further waveguiding wall is less than $\lambda m/2$; and a distance between an electrically conductive rod among the second plurality of electrically conductive rods that is adjacent to the further waveguiding wall and an outer periphery of the further waveguiding wall is less than $\lambda m/2$.

[Item 16] The waveguide device of item 15, wherein the further waveguiding wall connects to at least one of the second electrically conductive member and the third electrically conductive member.

[Item 17] The waveguide device of item 15, wherein at least one of the second electrically conductive member and the third electrically conductive member, and at least a portion of the further waveguiding wall, are portions of a single-piece body.

[Item 18] The waveguide device of item 16 or 17, wherein, a gap exists between the further waveguiding wall and the second electrically conductive member or the third electrically conductive member; and a thickness of the further waveguiding wall at a top surface thereof is less than $\lambda m/2$.

[Item 19] The waveguide device of any of items 1 to 14, wherein, the second electrically conductive member has an electrically conductive surface on a side opposite from the plurality of electrically conductive rods;

the waveguide device further comprises a third electrically conductive member;

the third electrically conductive member includes a waveguide member having an electrically-conductive waveguide face opposing the electrically conductive surface of the second electrically conductive member, and a second plurality of electrically conductive rods each having a leading end opposing the electrically conductive surface of the second electrically conductive member, the second plurality of electrically conductive rods being on both sides of the waveguide member; and the waveguide face opposes the second throughhole at a site on the waveguide face.

[Item 20] The waveguide device of any of items 1 to 14, wherein, the second electrically conductive member includes, on a side opposite from the plurality of electrically conductive rods, a second plurality of electrically conductive rods and a waveguide member having an electrically-conductive waveguide face;

the waveguide device further comprises a third electrically conductive member having an electrically conductive surface opposing leading ends of the second plurality of electrically conductive rods and the waveguide face; and the second throughhole is open at an end of the waveguide face of the waveguide member or another site.

[Item 21] The waveguide device of any of items 1 to 20, further comprising a further electrically conductive member on a side of the first electrically conductive member opposite from the second electrically conductive member, the further electrically conductive member having an electrically conductive surface, wherein, the first electrically conductive member includes a waveguide member having an electrically-conductive waveguide face opposing the electrically conductive surface of the further electrically conductive member, the waveguide member propagating the electromagnetic wave which propagates in the first throughhole, and a plurality of electrically conductive rods each having a leading end opposing the electrically conductive surface of the further electrically conductive member, the plurality of electrically conductive rods being on both sides of the waveguide member.

[Item 22] An antenna device comprising:

the waveguide device of any of items 1 to 21; and at least one antenna element that is connected to a waveguide in the waveguiding wall of the waveguide device, the at least one antenna element being used for at least one of transmission and reception.

[Item 23] A radar comprising:

the antenna device of item 22; and a microwave integrated circuit that is connected to the antenna device.

[Item 24] A radar system comprising:

the radar of item 23; and a signal processing circuit connected to the microwave integrated circuit of the radar.

[Item 25] A wireless communication system comprising:

the antenna device of item 22; and a communication circuit connected to the antenna device.

A waveguide device and an antenna device according to the present disclosure are usable in any technological field that makes use of an antenna. For example, they are available to various applications where transmission/reception of electromagnetic waves of the gigahertz band or the terahertz band is performed. In particular, they are suitably used in onboard radar systems, various types of monitoring systems, indoor positioning systems, and wireless communication systems where downsizing is desired.

What is claimed is:

1. A waveguide device for use in propagating an electromagnetic wave of a band having a shortest wavelength $\lambda m$ in free space, the waveguide device comprising:

a first electrically conductive member having an electrically conductive surface and a first throughhole;

a second electrically conductive member including a plurality of electrically conductive rods each having a leading end opposing the electrically conductive surface, the second electrically conductive member having a second throughhole which overlaps the first throughhole as viewed along an axial direction of the first throughhole; and an electrically-conductive waveguiding wall at least partially surrounding a space between the first throughhole and the second throughhole and being surrounded by the plurality of electrically conductive rods, the waveguiding wall allowing the electromagnetic wave to propagate between the first throughhole and the second throughhole, wherein, the waveguiding wall has a height which is less than $\lambda m/2$; and a distance between an electrically conductive rod among the plurality of electrically conductive rods that is adjacent to the waveguiding wall and an outer periphery of the waveguiding wall is less than $\lambda m/2$.

2. The waveguide device of claim 1, wherein at least one of the first electrically conductive member and the second electrically conductive member, and the waveguiding wall, are portions of a single-piece body.

3. The waveguide device of claim 2, wherein, a gap exists between the waveguiding wall and the first electrically conductive member or the second electrically conductive member; and a thickness of the waveguiding wall at a top surface thereof is less than $\lambda m/2$.

4. The waveguide device of claim 3, wherein, the waveguiding wall and the second electrically conductive member are portions of a single-piece body;

a gap exists between the waveguiding wall and the first electrically conductive member; and a height of the waveguiding wall is equal to a height of the plurality of electrically conductive rods.

5. The waveguide device of claim 1, wherein the waveguiding wall is split into a first portion that connects to the first electrically conductive member and a second portion that connects to the second electrically conductive member.

6. The waveguide device of claim 5, wherein, a gap exists between the first portion and the second portion;

a total of a height of the first portion, a height of the second portion, and a length of the gap is less than $\lambda m/2$;

a thickness of the first portion at a top surface thereof is less than $\lambda m/2$; and a thickness of the second portion at a top surface thereof is less than $\lambda m/2$.

7. The waveguide device of claim 5, wherein a height of the second portion is equal to a height of the plurality of electrically conductive rods.

8. The waveguide device of claim 5, wherein a height of the first portion is greater than that of the second portion.

9. The waveguide device of claim 5, wherein cross sections of the first throughhole, the second throughhole, and the waveguiding wall, as taken along the electrically conductive surface, each include a lateral portion extending in one direction.

10. The waveguide device of claim 9, wherein the cross sections of the first throughhole, the second throughhole, and the waveguiding wall, as taken along the electrically conductive surface, each further include at least a pair of vertical portions extending in another direction intersecting the one direction, and the lateral portion interconnects the pair of vertical portions;

inner wall surfaces of the first throughhole, the second throughhole, and the waveguiding wall each include at least one projection which projects inward; and the projection is interposed between the pair of vertical portions, and a leading end of the projection constitutes at least a part of the lateral portion.

11. The waveguide device of claim 9, wherein the cross sections of the first throughhole, the second throughhole, and the waveguiding wall, as taken along the electrically conductive surface, each further include at least a pair of vertical portions extending in another direction intersecting the one direction, and the lateral portion interconnects the pair of vertical portions; and when a central wavelength of the band in free space is $\lambda o$, a thickness of the waveguiding wall at a center of the lateral portion is not less than 0.8 times as large as $\lambda o/4$ and not more than 1.2 times as large as $\lambda o/4$.

12. The waveguide device of claim 9, wherein
inner wall surfaces of the first throughhole, the second throughhole, and the waveguiding wall each include at least one projection which projects inward;

the projection is interposed between the pair of vertical portions, and a leading end of the projection constitutes at least a part of the lateral portion;

the cross sections of the first throughhole, the second throughhole, and the waveguiding wall, as taken along the electrically conductive surface, each further include at least a pair of vertical portions extending in another direction intersecting the one direction, and the lateral portion interconnects the pair of vertical portions; and when a central wavelength of the band in free space is $\lambda o$, a thickness of the waveguiding wall at a center of the lateral portion is not less than 0.8 times as large as $\lambda o/4$ and not more than 1.2 times as large as $\lambda o/4$.

13. The waveguide device of claim 9, wherein,
the electrically conductive surface is planar;
the first throughhole extends through the first electrically conductive member perpendicularly to the electrically conductive surface; and
the second throughhole extends through the second electrically conductive member along the axial direction of the first throughhole.

14. The waveguide device of claim 5, wherein
cross sections of the first throughhole, the second throughhole, and the waveguiding wall, as taken along the electrically conductive surface, each include a lateral portion extending in one direction; and when a central wavelength of the band in free space is $\lambda o$, a thickness of the waveguiding wall at a center of the lateral portion is not less than 0.8 times as large as $\lambda o/4$ and not more than 1.2 times as large as $\lambda o/4$.

15. The waveguide device of claim 1, wherein,
the waveguiding wall is split into a first portion and a second portion;
the first electrically conductive member and the first portion are portions of a single-piece body; and
the second electrically conductive member and the second portion are portions of another single-piece body.

16. The waveguide device of claim 15, wherein a height of the first portion is greater than that of the second portion.

17. The waveguide device of claim 1, wherein
the waveguiding wall connects to the first electrically conductive member; and
there is a gap between the waveguiding wall and the second conductive member.

18. The waveguide device of claim 1, wherein
the waveguiding wall connects to the first electrically conductive member;
the first electrically conductive member and the waveguiding wall are portions of a single-piece body; and
there is a gap between the waveguiding wall and the second conductive member.

19. The waveguide device of claim 1, wherein cross sections of the first throughhole, the second throughhole, and the waveguiding wall, as taken along the electrically conductive surface, each include a lateral portion extending in one direction.

20. The waveguide device of claim 19, wherein,
the second electrically conductive member has an electrically conductive surface on a side opposite from the plurality of electrically conductive rods;
the waveguide device further comprises a third electrically conductive member;
the third electrically conductive member includes
a waveguide member having an electrically-conductive waveguide face opposing the electrically conductive surface of the second electrically conductive member, and
a second plurality of electrically conductive rods each having a leading end opposing the electrically conductive surface of the second electrically conductive member, the second plurality of electrically conductive rods being on both sides of the waveguide member; and
the waveguide face opposes the second throughhole at a site on the waveguide face.

21. The waveguide device of claim 19, wherein,
the second electrically conductive member includes, on a side opposite from the plurality of electrically conductive rods, a second plurality of electrically conductive rods and a waveguide member having an electrically-conductive waveguide face;
the waveguide device further comprises a third electrically conductive member having an electrically conductive surface opposing leading ends of the second plurality of electrically conductive rods and the waveguide face; and
the second throughhole is open at an end of the waveguide face of the waveguide member or another site.

22. The waveguide device of claim 19, further comprising a further electrically conductive member on a side of the first electrically conductive member opposite from the second electrically conductive member, the further electrically conductive member having an electrically conductive surface, wherein,
the first electrically conductive member includes
a waveguide member having an electrically-conductive waveguide face opposing the electrically conductive surface of the further electrically conductive member, the waveguide member propagating the electromagnetic wave which propagates in the first throughhole, and
a plurality of electrically conductive rods each having a leading end opposing the electrically conductive surface of the further electrically conductive member, the plurality of electrically conductive rods being on both sides of the waveguide member.

23. An antenna device comprising:
the waveguide device of claim 19; and
at least one antenna element that is connected to a waveguide in the waveguiding wall of the waveguide device, the at least one antenna element being used for at least one of transmission and reception.

24. A radar comprising:
the antenna device of claim 23; and
a microwave integrated circuit that is connected to the antenna device.

25. The waveguide device of claim 1, wherein
the waveguiding wall is split into a first portion and a second portion;
the first electrically conductive member and the first portion are portions of a single-piece body;
the second electrically conductive member and the second portion are portions of another single-piece body;

cross sections of the first throughhole, the second throughhole, and the waveguiding wall, as taken along the electrically conductive surface, each include a lateral portion extending in one direction and at least a pair of vertical portions extending in another direction intersecting the one direction, and the lateral portion interconnects the pair of vertical portions.

26. The waveguide device of claim 1, wherein, among the plurality of electrically conductive rods, the second electrically conductive member further includes a waveguide member having an electrically-conductive waveguide face opposing the electrically conductive surface.

27. The waveguide device of claim 1, wherein,
the waveguiding wall is split into a first portion that connects to the first electrically conductive member and a second portion that connects to the second electrically conductive member; and
among the plurality of electrically conductive rods, the second electrically conductive member further includes a waveguide member having an electrically-conductive waveguide face opposing the electrically conductive surface.

28. The waveguide device of claim 1, wherein,
cross sections of the first throughhole, the second throughhole, and the waveguiding wall, as taken along the electrically conductive surface, each include a lateral portion extending in one direction; and
among the plurality of electrically conductive rods, the second electrically conductive member further includes a waveguide member having an electrically-conductive waveguide face opposing the electrically conductive surface.

29. The waveguide device of claim 28, wherein the cross sections of the first throughhole, the second throughhole, and the waveguiding wall, as taken along the electrically conductive surface, each further include at least a pair of vertical portions extending in another direction intersecting the one direction, and the lateral portion interconnects the pair of vertical portions.

30. The waveguide device of claim 29,
among the plurality of electrically conductive rods, the second electrically conductive member further includes a waveguide member having an electrically-conductive waveguide face opposing the electrically conductive surface;
inner wall surfaces of the first throughhole, the second throughhole, and the waveguiding wall each include at least one projection which projects inward; and
the projection is interposed between the pair of vertical portions, and a leading end of the projection constitutes at least a part of the lateral portion.

31. The waveguide device of claim 28, wherein,
the cross sections of the first throughhole, the second throughhole, and the waveguiding wall, as taken along the electrically conductive surface, each further include at least a pair of vertical portions extending in another direction intersecting the one direction, and the lateral portion interconnects the pair of vertical portions;
a central wavelength of the band in free space is $\lambda o$, and a thickness of the waveguiding wall at a center of the lateral portion is not less than 0.8 times as large as $\lambda o/4$ and not more than 1.2 times as large as $\lambda o/4$;
the second electrically conductive member has an electrically conductive surface on a side opposite from the plurality of electrically conductive rods;

the waveguide device further comprises
a third electrically conductive member including a second plurality of electrically conductive rods each having a leading end opposing the electrically conductive surface of the second electrically conductive member, the third electrically conductive member having a third throughhole which overlaps the second throughhole as viewed along an axial direction of the second throughhole, and
an electrically-conductive further waveguiding wall at least partially surrounding a space between the second throughhole and the third throughhole, the further waveguiding wall being surrounded by the second plurality of electrically conductive rods and allowing the electromagnetic wave to propagate between the second throughhole and the third throughhole;
a height of the further waveguiding wall is less than $\lambda m/2$; and
a distance between an electrically conductive rod among the second plurality of electrically conductive rods that is adjacent to the further waveguiding wall and an outer periphery of the further waveguiding wall is less than $\lambda m/2$.

32. The waveguide device of claim 1, wherein,
cross sections of the first throughhole, the second throughhole, and the waveguiding wall, as taken along the electrically conductive surface, each include a lateral portion extending in one direction;
a height of the first portion is greater than that of the second portion; and
among the plurality of electrically conductive rods, the second electrically conductive member further includes a waveguide member having an electrically-conductive waveguide face opposing the electrically conductive surface.

33. The waveguide device of claim 1, wherein,
the waveguiding wall connects to the first electrically conductive member;
there is a gap between the waveguiding wall and the second conductive member; and
the waveguiding wall and the first conductive member are portions of a single-piece body.

34. The waveguide device of claim 1, wherein
among the plurality of electrically conductive rods, the second electrically conductive member further includes a waveguide member having an electrically-conductive waveguide face opposing the electrically conductive surface;
cross sections of the first throughhole, the second throughhole, and the waveguiding wall, as taken along the electrically conductive surface, each include a lateral portion extending in one direction and at least a pair of vertical portions extending in another direction intersecting the one direction;
the lateral portion interconnects the pair of vertical portions; and
a central wavelength of the band in free space is $\lambda o$, and a thickness of the waveguiding wall at a center of the lateral portion is not less than 0.8 times as large as $\lambda o/4$ and not more than 1.2 times as large as $\lambda o/4$.

35. The waveguide device of claim 1, wherein,
the second electrically conductive member has an electrically conductive surface on a side opposite from the plurality of electrically conductive rods;
the waveguide device further comprises
a third electrically conductive member including a second plurality of electrically conductive rods each having a leading end opposing the electrically conductive surface of the second electrically conductive member, the third electrically conductive member having a third throughhole which overlaps the second throughhole as viewed along an axial direction of the second throughhole, and
an electrically-conductive further waveguiding wall at least partially surrounding a space between the second throughhole and the third throughhole, the further waveguiding wall being surrounded by the second plurality of electrically conductive rods and allowing the electromagnetic wave to propagate between the second throughhole and the third throughhole;
a height of the further waveguiding wall is less than $\lambda_m/2$; and
a distance between an electrically conductive rod among the second plurality of electrically conductive rods that is adjacent to the further waveguiding wall and an outer periphery of the further waveguiding wall is less than $\lambda_m/2$.

36. The waveguide device of claim 35, wherein,
a gap exists between the further waveguiding wall and the second electrically conductive member or the third electrically conductive member; and
a thickness of the further waveguiding wall at a top surface thereof is less than $\lambda_m/2$.

37. The waveguide device of claim 35, wherein,
a gap exists between the further waveguiding wall and the second electrically conductive member or the third electrically conductive member;
a thickness of the further waveguiding wall at a top surface thereof is less than $\lambda_m/2$; and
at least one of the second electrically conductive member and the third electrically conductive member, and at least a portion of the further waveguiding wall, are portions of a single-piece body.

38. The waveguide device of claim 1, wherein
the second electrically conductive member has an electrically conductive surface on a side opposite from the plurality of electrically conductive rods;
the waveguide device further comprises
a third electrically conductive member including a second plurality of electrically conductive rods each having a leading end opposing the electrically conductive surface of the second electrically conductive member, the third electrically conductive member having a third throughhole which overlaps the second throughhole as viewed along an axial direction of the second throughhole, and
an electrically-conductive further waveguiding wall at least partially surrounding a space between the second throughhole and the third throughhole, the further waveguiding wall being surrounded by the second plurality of electrically conductive rods and allowing the electromagnetic wave to propagate between the second throughhole and the third throughhole;
a height of the further waveguiding wall is less than $\lambda_m/2$;
a distance between an electrically conductive rod among the second plurality of electrically conductive rods that is adjacent to the further waveguiding wall and an outer periphery of the further waveguiding wall is less than $\lambda_m/2$;
cross sections of the first throughhole, the second throughhole, and the waveguiding wall, as taken along the electrically conductive surface, each include a lateral portion extending in one direction; and
the further waveguiding wall connects to at least one of the second electrically conductive member and the third electrically conductive member.

39. The waveguide device of claim 1, wherein
the second electrically conductive member has an electrically conductive surface on a side opposite from the plurality of electrically conductive rods;
the waveguide device further comprises
a third electrically conductive member including a second plurality of electrically conductive rods each having a leading end opposing the electrically conductive surface of the second electrically conductive member, the third electrically conductive member having a third throughhole which overlaps the second throughhole as viewed along an axial direction of the second throughhole, and
an electrically-conductive further waveguiding wall at least partially surrounding a space between the second throughhole and the third throughhole, the further waveguiding wall being surrounded by the second plurality of electrically conductive rods and allowing the electromagnetic wave to propagate between the second throughhole and the third throughhole;
a height of the further waveguiding wall is less than $\lambda_m/2$;
a distance between an electrically conductive rod among the second plurality of electrically conductive rods that is adjacent to the further waveguiding wall and an outer periphery of the further waveguiding wall is less than $\lambda_m/2$;
cross sections of the first throughhole, the second throughhole, and the waveguiding wall, as taken along the electrically conductive surface, each include a lateral portion extending in one direction; and
at least one of the second electrically conductive member and the third electrically conductive member, and at least a portion of the further waveguiding wall, are portions of a single-piece body.

* * * * *

UNITED STATES PATENT AND TRADEMARK OFFICE
CERTIFICATE OF CORRECTION

PATENT NO. : 10,559,890 B2
APPLICATION NO. : 16/047060
DATED : February 11, 2020
INVENTOR(S) : Hideki Kirino et al.

Page 1 of 1

It is certified that error appears in the above-identified patent and that said Letters Patent is hereby corrected as shown below:

On the Title Page

Item (73), for the second Assignee, change "WGR CO., LTD., 8E10 ADV. SCI., TECH. & MGMT., Kyoto (JP)" to --WGR CO., LTD., Kyoto (JP)--

Signed and Sealed this
Twenty-ninth Day of September, 2020

Andrei Iancu
*Director of the United States Patent and Trademark Office*